(12) United States Patent
Talebi Fard et al.

(10) Patent No.: US 12,464,323 B2
(45) Date of Patent: Nov. 4, 2025

(54) WIRELESS DEVICE REQUEST FOR PROTOCOL DATA UNIT SESSION

(71) Applicant: Ofinno, LLC, Reston, VA (US)

(72) Inventors: Peyman Talebi Fard, Vienna, VA (US); Esmael Hejazi Dinan, McLean, VA (US); Kyungmin Park, Vienna, VA (US); Weihua Qiao, Herndon, VA (US); Jayshree Bharatia, Plano, TX (US); Jinsook Ryu, Oakton, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 18/650,069

(22) Filed: Apr. 29, 2024

(65) Prior Publication Data

US 2024/0284146 A1     Aug. 22, 2024

Related U.S. Application Data

(63) Continuation of application No. 17/727,211, filed on Apr. 22, 2022, now Pat. No. 11,979,798, which is a continuation of application No. 16/743,402, filed on Jan. 15, 2020, now Pat. No. 11,343,653.

(60) Provisional application No. 62/792,679, filed on Jan. 15, 2019.

(51) Int. Cl.
  *H04W 4/08* (2009.01)
  *H04W 84/04* (2009.01)

(52) U.S. Cl.
  CPC ............ *H04W 4/08* (2013.01); *H04W 84/042* (2013.01)

(58) Field of Classification Search
  CPC ............................. H04W 4/08; H04W 84/042
  See application file for complete search history.

(56) References Cited

U.S. PATENT DOCUMENTS

| | | |
|---|---|---|
| 10,798,618 B2 | 10/2020 | Kim et al. |
| 2018/0192289 A1 | 7/2018 | Dao |
| 2018/0192471 A1 | 7/2018 | Li et al. |
| 2018/0199398 A1 | 7/2018 | Dao et al. |
| 2018/0227873 A1 | 8/2018 | Vrzic et al. |
| 2018/0270778 A1 | 9/2018 | Bharatia |
| 2018/0376446 A1 | 12/2018 | Youn et al. |
| 2019/0158408 A1 | 5/2019 | Li et al. |
| 2019/0158985 A1 | 5/2019 | Dao et al. |
| 2019/0166467 A1 | 5/2019 | Livanos et al. |

(Continued)

OTHER PUBLICATIONS

ETSI TS 123.502 V15.2.0; 5G; Procedures for the 5G System (3GPP TS 23.502 version 15.2.0 Release 15), Jun. 2018, (Year: 2018), pp. 55-63.*

(Continued)

*Primary Examiner* — Ayaz R Sheikh
*Assistant Examiner* — Tarell A Hampton
(74) *Attorney, Agent, or Firm* — Peter Flanagan; Kavon Nasabzadeh; Jacob L. Mangan

(57) ABSTRACT

A method can include sending, by a wireless device to an access and mobility management function (AMF) a non-access stratum (NAS) message indicating a request to establish a packet data unit (PDU) session to join a group communication session. The NAS message can include an identifier of the group communication session, an identifier of a network slice, and a protocol configuration option information. The method can also include receiving, by the wireless device from the AMF, a response message indicating acceptance of the request.

20 Claims, 29 Drawing Sheets

(56) References Cited

U.S. PATENT DOCUMENTS

| | | | |
|---|---|---|---|
| 2019/0191467 | A1 | 6/2019 | Dao et al. |
| 2019/0223250 | A1 | 7/2019 | Dao et al. |
| 2019/0254083 | A1 | 8/2019 | Stammers et al. |
| 2019/0387401 | A1 | 12/2019 | Liao et al. |
| 2020/0045753 | A1 | 2/2020 | Dao et al. |
| 2020/0059761 | A1 | 2/2020 | Li et al. |
| 2020/0221540 | A1 | 7/2020 | Sun et al. |
| 2020/0260523 | A1 | 8/2020 | Sun |
| 2020/0305211 | A1 | 9/2020 | Foti et al. |
| 2020/0367297 | A1 | 11/2020 | Dao et al. |
| 2021/0099843 | A1 | 4/2021 | Yang et al. |
| 2021/0168584 | A1 | 6/2021 | Li et al. |
| 2021/0204336 | A1 | 7/2021 | Xu et al. |
| 2021/0219116 | A1 | 7/2021 | Perras et al. |
| 2021/0243587 | A1 | 8/2021 | Hoffmann |
| 2021/0274323 | A1 | 9/2021 | Xu et al. |
| 2021/0274571 | A1 | 9/2021 | Kawasaki et al. |
| 2021/0329725 | A1 | 10/2021 | Kawasaki et al. |
| 2021/0345113 | A1 | 11/2021 | Parron et al. |

OTHER PUBLICATIONS

3GPP TR 23.734 V1.0.0 (Dec. 2018); 3rd Generation Partnership Project; Technical Specification Group Services and System Aspects; Study on 5GS Enhanced support of Vertical and LAN Services (Release 16).

3GPP TR 23.734 V16.0.0 (Dec. 2018); 3rd Generation Partnership Project; Technical Specification Group Services and System Aspects; Study on enhancement of 5GS for Vertical and LAN Services (Release 16).

S2-187743; SA WG2 Meeting #128-BIS; Aug. 20-24, 2018, Sophia Antipolis, France; Source: Intel; Title: Solution for support of 5G LAN-type service and 5GLAN communication; Document for: Approval; Agenda Item: 6.15; Work Item / Release: FS_Vertical_LAN / Rel-16.

S2-187937; SA WG2 Meeting #128-bis; Aug. 20-24, 2018, Sophia Antipolis, France; Source: vivo; Title: Solution for how to support 5G LAN group communication; Document for: Approval; Agenda Item: 6.15; Work Item / Release: FS_Vertical_LAN / Rel-16.

S2-188008; SA WG2 Meeting #128-bis; Aug. 20-Aug. 24, 2018, Sophia Antipolis, France; Source: InterDigital Inc.; Title: Solution for 5GLAN Group Communication; Document for: Approval; Agenda Item: 6.15; Work Item / Release: FS_Vertical_Lan / Rel-16.

S2-188340; 3GPP TSG-SA WG2 Meeting #128bis; Sophia Antipolis, France, Aug. 20-Aug. 24, 2018; Source: Huawei, HiSilicon; Title: Solution for KI#4 and KI#5: Basic architecture for supporting dynamic 5G LAN-type service and 5GLAN; communication; Document for: Approval; Agenda Item: 6.15; Work Item / Release: FS_Vertical_LAN / Rel-16.

S2-188379; (revision of S2-187743); SA WG2 Meeting #128-BIS; Aug. 20-24, 2018, Sophia Antipolis, France; Source: Intel; Title: Solution for support of 5G LAN-type service and 5GLAN communication; Document for: Approval; Agenda Item: 6.15; Work Item / Release: FS_Vertical_LAN / Rel-16.

S2-188382; (revision of S2-188008); SA WG2 Meeting #128-bis; Aug. 20-Aug. 24, 2018, Sophia Antipolis, France; Source: InterDigital Inc.; Title: Solution for 5GLAN Group Communication; Document for: Approval; Agenda Item: 6.15; Work Item / Release: FS_Vertical_Lan / Rel-16.

S2-188383; (revision of S2-188383); 3GPP TSG-SA WG2 Meeting #128bis; Sophia Antipolis, France, Aug. 20-Aug. 24, 2018; Source: Huawei, HiSilicon; Title: Solution for KI#4 and KI#5: Basic architecture for supporting dynamic 5G LAN-type service and 5GLAN communication; Document for: Approval; Agenda Item: 6.15; Work Item / Release: FS_Vertical_LAN / Rel-16.

S2-188498; (revision of S2-188379); SA WG2 Meeting #128-BIS; Aug. 20-24, 2018, Sophia Antipolis, France; Source: Intel; Title: Solution for support of 5G LAN-type service and 5GLAN communication; Document for: Approval; Agenda Item: 6.15; Work Item / Release: FS_Vertical_LAN / Rel-16.

S2-188499; (revision of S2-188382); SA WG2 Meeting #128-bis; Aug. 20-Aug. 24, 2018, Sophia Antipolis, France; Source: InterDigital Inc.; Title: Solution for 5GLAN Group Communication; Document for: Approval; Agenda Item: 6.15; Work Item / Release: FS_Vertical_Lan / Rel-16.

S2-1811702; 3GPP TSG SA WG2 Meeting #129BIS; 7 Nov. 26-30, 2018, West Palm Beach, USA; Source: KDDI, KPN, ETRI; Title: Update of Solution#25: (Support of communication between Ethernet type 5GLAN and Ethernet network in data network); Document for: Approval; Agenda Item: 6.15.1; Work Item / Release: FS_Vertical_LAN/Rel-16.

S2-1811724; SA WG2 Meeting #129-BIS; Nov. 26-30, 2018, West Palm Beach, USA; Source: Ericsson, Qualcomm Incorporated, Nokia, Nokia Shanghai Bell; Title: Analysis and conclusions on 5G-LAN solutions; Document for: Approval; Agenda Item: 6.15.1; Work Item / Release: FS_Vertical_LAN / Rel-16.

S2-1811775; SA WG2 Meeting #129bis; Nov. 26-30, 2018, West Palm Beach, USA; Source: OPPO; Title: KI#5—Update to Solution 26: One to many communication for 5GLAN service within 5GLAN group; Document for: Approval; Agenda Item: 6.15.1; Work Item / Release: FS_Vertical_LAN / Rel-16.

S2-1811780; 3GPP TSG SA WG2 Meeting #129bis; Nov. 26-30, 2018, West Palm Beach, Florida, USA; Source: Samsung; Title: 5GLAN Solution #13 update; Document for: Approval; Agenda Item: 6.15; Work Item / Release: FS_Vertical_LAN / Rel-16.

S2-1812033; 3GPP TSG SA WG2 Meeting #129bis; Nov. 26-30, 2018, West Palm Beach, USA; Source: KDDI, ETRI; Title: Conclusion for Ethernet-type 5GLAN communication in key issue 5; Document for: Approval; Agenda Item: 6.15.1; Work Item / Release: FS_Vertical_LAN/Rel-16.

S2-1812063; SA WG2 Meeting #129bis; Nov. 26-30, 2018, West Palm Beach, USA; Source: Cisco Systems; Title: Vertical LAN UPF Selection for Ethernet Networks; Document for: Approval; Agenda Item: 6.15.1; Work Item / Release: FS_Vert_LAN/ Rel16.

S2-1812138; SA WG2 Meeting #129bis; Nov. 26-30, 2018, West Palm Beach, USA; Source: vivo; Title: Update of Solution #12: 5G LAN-type service and 5GLAN communications using principles in TS 29.561; Document for: Approval; Agenda Item: 6.15.1; Work Item / Release: FS_Vertical_LAN / Rel-16.

S2-181812217; SA WG2 Meeting #129bis; Nov. 26-30, 2018, West Palm Beach, USA; Source: Huawei, HiSilicon, OPPO; Title: Unified 5GLAN architecture; Document for: Approval; Agenda Item: 6.15.1; Work Item / Release: FS_Vertical_LAN / Rel-16.

S2-1812234; 3GPP TSG-SA WG2 Meeting #129bis; Nov. 26-30, 2018, West Palm Beach, FL, USA; Source: Huawei, HiSilicon; Title: Interworking between 5G LAN-VN and Ethernet LAN; Document for: Approval; Agenda Item: 6.15.1; Work Item / Release: FS_Vertical_LAN / Rel-16.

S2-1812235; 3GPP TSG-SA WG2 Meeting #129bis; Nov. 26-30, 2018, West Palm Beach, FL, USA; Source: Huawei, HiSilicon; Title: Update Solution 13; Document for: Approval; Agenda Item: 6.15.1; Work Item / Release: FS_Vertical_LAN / Rel-16.

S2-1812322; SA WG2 Meeting #129bis; Nov. 26-Nov. 30, 2018, West Palm Beach, USA; Source: ITRI; Title: TR 23.734: 5GLAN Group communication and routing in Solution 14; Document for: Approval; Agenda Item: 6.15.1; Work Item / Release: FS_Vertical-LAN.

S2-1812398; SA WG2 Meeting #129bis; Nov. 26-Nov. 30, 2018, West Palm Beach, FL; Source: InterDigital Inc.; Title: Update to Solution for 5GLAN Group Communication, to support mobility procedures within a 5GLAN; Document for: Approval; Agenda Item: 6.15; Work Item / Release: FS_Vertical_LAN/Rel-16.

S2-1812414; 3GPP TSG-SA WG2 Meeting #129Bis; West Palm Beach, USA, Nov. 26-Nov. 30, 2018; Source: Huawei, HiSilicon; Title: Update to Solution 15; Document for: Approval; Agenda Item: 6.15.1; Work Item / Release: FS_Vertical_LAN / Rel-16.

S2-1812426; SA WG2 Meeting #129bis; Nov. 26-Nov. 30, 2018, West Palm Beach, FL; Source: InterDigital Inc.; Title: Update to Solution for 5GLAN Group Communication, pathID based packet forwarding; Document for: Approval; Agenda Item: 6.15; Work Item / Release: FS_Vertical_Lan / Rel-16.

S2-1812458; SA WG2 Meeting #129-BIS; Nov. 26-30, 2018, West Palm Beach, USA; Source: Intel; Title: Conclusions on 5G-LAN

(56) References Cited

OTHER PUBLICATIONS solutions; Document for: Approval; Agenda Item: 6.15.1; Work Item / Release: FS_Vertical_LAN / Rel-16.
S2-1813038; 3GPP TSG SA WG2 Meeting #129bis; Nov. 26-30, 2018, West Palm Beach, Florida, USA; S2-1811781; Source: Samsung, Huawei, China Mobile, KDDI; Title: 5GLAN Conclusion for efficient delivery Ethernet frames; Document for: Approval; Agenda Item: 6.15.1; Work Item / Release: FS_Vertical_LAN / Rel-16.
S2-1813037; (revision of S2-1812479); SA WG2 Meeting #129bis; Nov. 26-30, 2018, West Palm Beach, USA; Source: Huawei, HiSilicon, OPPO, vivo, China Unicom, China Telecom, China Mobile, CAICT, KDDI, Samsung, InterDigital Inc.; Title: Unified 5GLAN architecture; Document for: Approval; Agenda Item: 6.15.1; Work Item / Release: FS_Vertical_LAN / Rel-16.
S2-1813338; (revision of S2-1813036); SA WG2 Meeting #129-BIS; Nov. 26-30, 2018, West Palm Beach, USA; Source: Intel , Samsung; Title: Conclusions on 5G-LAN solutions; Document for: Approval; Agenda Item: 6.15.1; Work Item / Release: FS_Vertical_LAN / Rel-16.
S2-1813339; 3GPP TSG SA WG2 Meeting #129bis; Nov. 26-30, 2018, West Palm Beach, Florida, USA; S2-1813038, S2-1811781; Source: Samsung, Huawei, China Mobile, KDDI; Title: 5GLAN Conclusion for efficient delivery Ethernet frames; Document for: Approval; Agenda Item: 6.15.1; Work Item / Release: FS_Vertical_LAN / Rel-16.
S2-1900205; SA WG2 Meeting #130; Jan. 21-25, 2019, Kochi, India; Source: OPPO; Title: Discussion paper for 5GLAN architecture and communication; Document for: Discussion and agreement; Agenda Item: 6.15.1; Work Item / Release: Vertical_LAN /Rel-16.
S2-1900240; 3GPP TSG SA WG2 Meeting #130; Jan. 21-25, 2019, Kochi, India; CR-Form-v11.2; Change Request; 23.501 CR 0787; rev –; Current version: 15.4.0; Title: 5G LAN Group Management; Source to WG: Samsung; Source to TSG: SA WG2; Work item code: Vertical_LAN Date: Jan. 15, 2019; Category: B Release: Rel-16.
S2-1900242; 3GPP TSG SA WG2 Meeting #130; Jan. 21-25, 2019, Kochi, India; CR-Form-v11.2; Change Request; 23.502 CR 0897; rev –; Current version: 15.4.1; Title: 5G LAN Group Management Procedure; Source to WG: Samsung; Source to TSG: SA WG2; Work item code: Vertical_LAN Date: Jan. 15, 2019; Category: B; Release: Rel-16.
S2-1900243; 3GPP TSG SA WG2 Meeting #130; Jan. 21-25, 2019, Kochi, India; CR-Form-v11.2; Change Request; 23.502 CR 0898; rev –; Current version: 15.4.1; Title: 5G LAN Group Subscription Data; Source to WG: Samsung; Source to TSG: SA WG2; Work item code: Vertical_LAN Date: Jan. 15, 2019; Category: B; Release: Rel-16.
S2-1900244; 3GPP TSG SA WG2 Meeting #130; Jan. 21-25, 2019, Kochi, India; CR-Form-v11.2; Change Request; 23.502 CR 0899; rev –; Current version: 15.4.1; Title: 5G LAN Group Management Procedure; Source to WG: Samsung; Source to TSG: SA WG2; Work item code: Vertical_LAN Date: Jan. 15, 2019; Category: B; Release: Rel-16.
S2-1900331; 3GPP TSG-SA WG2 Meeting #130; Jan. 21-25, 2019, Kochi, India; CR-Form-v11.2; Change Request; 23.501 CR 0816; rev –; Current version: 15.4.0; Title: 5GLAN communication for Ethernet; Source to WG: KDDI, ETRI; Source to TSG: S2; Work item code: Vertical_LAN Date: Jan. 12, 2019; Category: B; Release: Rel-16.
S2-1900357; SA WG2 Meeting #130; Jan. 21-25, 2019, Kochi, India; Source: KDDI; Title: Analysis of Unified Solution for 5GLAN communication; Document for: Discussion; Agenda Item: 6.15; Work Item / Release: Vertical_LAN / Rel-16.
S2-1900358; 3GPP TSG-SA WG2 Meeting #130; Jan. 21-25, 2019, Kochi, India; CR-Form-v11.2; Change Request; 23.503 CR 0199; rev –; Current version: 15.4.0; Title: N6-based traffic routing for 5GLAN communication; Source to WG: KDDI; Source to TSG: S2; Work item code: Vertical_LAN Date: Jan. 12, 2019; Category: B; Release: Rel-16.
S2-1900367; SA WG2 Meeting #130; Jan. 21-Jan. 25, 2019, Kochi; Source: InterDigital Inc.; Title: IP/MAC addresses update over a 5GLAN connection to support indirect communications mode; Document for: Discussion; Agenda Item: 6.15.1; Work Item / Release: Vertical_LAN/Rel-16.
S2-1900595; 3GPP TSG-SA WG2 Meeting #130; Jan. 21-25, 2019, Kochi, India; Source: Huawei, HiSilicon; Title: 5GLAN communication discussions; Document for: Discussion; Agenda Item: 6.15.1; Work Item / Release: Vertical_LAN / Rel-16.
S2-1900596; 3GPP TSG-SA WG2 Meeting #130; Jan. 21-25, 2019, Kochi, India; Title: Support one to many communication for 5GLAN; Source to WG: Huawei, HiSilicon; Source to TSG: SA2; Work item code: Vertical_LAN Date: Jan. 15, 2019; Category: B; Release: Rel-16.
S2-1900597; 3GPP TSG-SA WG2 Meeting #130; Jan. 21-25, 2019, Kochi, India; Title: Support one to many communication for 5GLAN; Source to WG: Huawei, HiSilicon; Source to TSG: SA2; Work item code: Vertical_LAN Date: Jan. 15, 2019; Category: B; Release: Rel-16.
S2-1900675; 3GPP TSG-SA WG2 Meeting #130; Jan. 21-25, 2019, Kochi, India; Source: Huawei, HiSilicon; Title: Discussion on 5GLAN group management remaining issues; Document for: Discussion; Agenda Item: 6.15.1; Work Item / Release: Vertical_LAN / Rel-16.
S2-1900674; 3GPP TSG-SA WG2 Meeting #130; Jan. 21-25, 2019, Kochi, India; Title: 5GLAN group management procedures; Source to WG: Huawei, HiSilicon; Source to TSG: SA2; Work item code: Vertical_LAN Date: Jan. 15, 2019; Category: B; Release: Rel-16.
S2-1900675; 3GPP TSG-SA WG2 Meeting #130; Jan. 21-25, 2019, Kochi, India; Title: Introduction of 5G LAN-type service; Source to WG: Huawei, HiSilicon; Source to TSG: SA2; Work item code: Vertical_LAN Date: Jan. 15, 2019; Category: B; Release: Rel-16.

* cited by examiner

CM State Transition in UE

CM State Transition in AMF

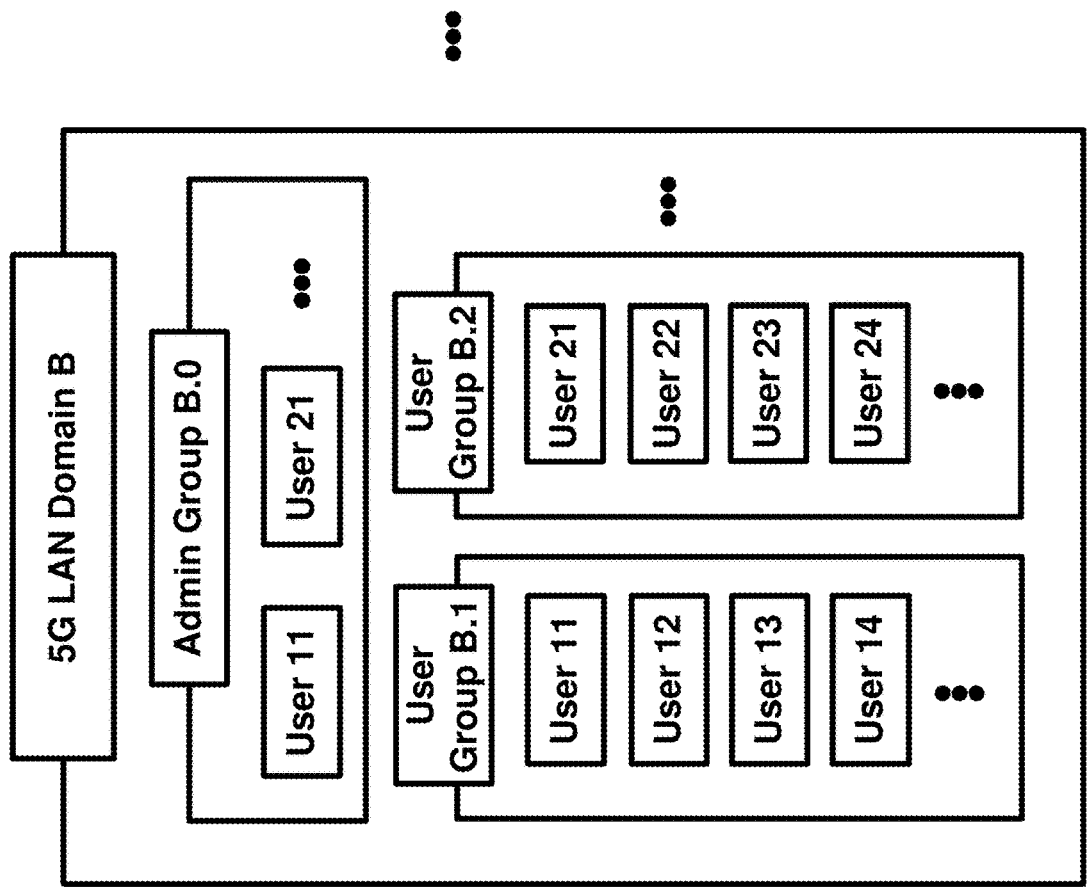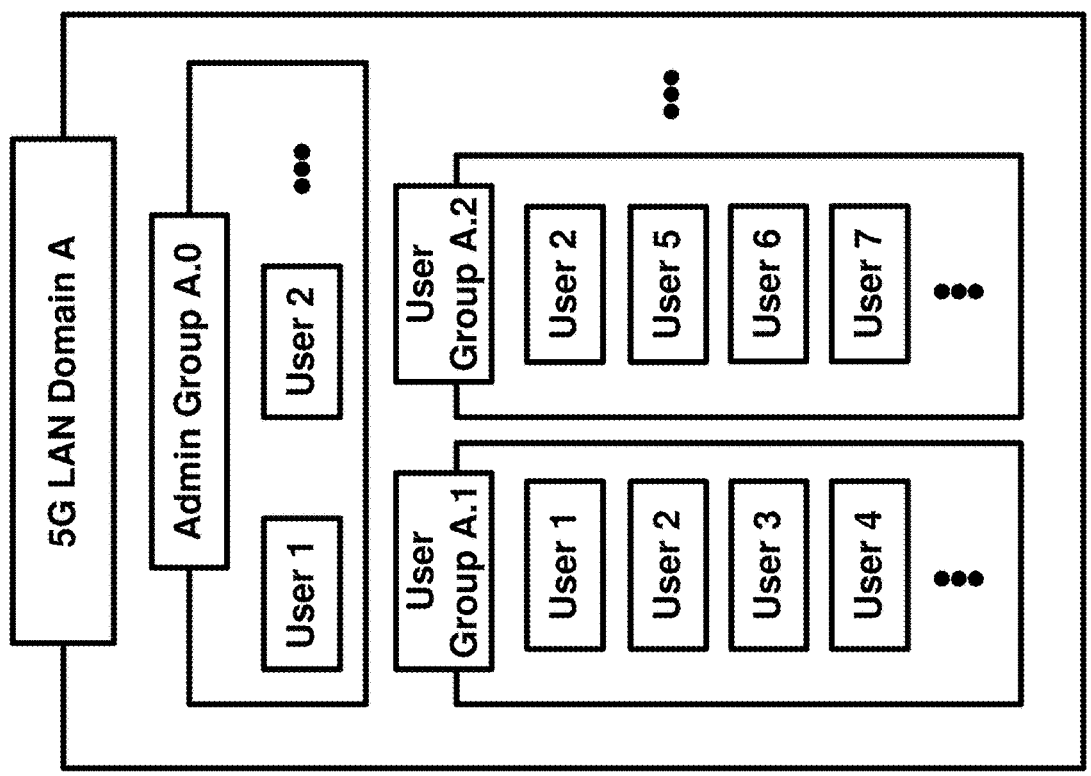
FIG. 15

| Information Name | | Description | Allocated/provided by |
|---|---|---|---|
| 5GLAN group ID | | Uniquely identify the 5GLAN group | GMF/UDR/UDM |
| Metadata | | Description about the 5GLAN group | Requesting entity |
| Type of traffic | | Type of traffic supported in 5GLAN communication (either Ethernet-type or IP-type) | Requesting entity |
| Group address | | Network address as destination address in traffic targeting the entire 5GLAN group | GMF/UDR/UDM or Requesting entity |
| SMF Information | | SMF that is used for the group | GMF/UDR/UDM or Requesting entity |
| UPF Information | | List of UPFs that are utilized for the group | GMF/UDR/UDM or Requesting entity |
| Service restriction | | Define spatial availability of 5G LAN-service for the 5GLAN group | Requesting entity |
| Information of member UEs | ID (i.e. GPSI) | Uniquely identify the member UE | Requesting entity |
| | Address | Network address identifying the member UE during 5GLAN communication within the 5GLAN group. | GMF/UDR/UDM |
| | Group credential | Authentication/authorization information used by the member UE for accessing 5G LAN-type service for the 5GLAN group | GMF/UDR/UDM |
| | Reachability | Indicate whether the member UE has an established PDU Session for 5GLAN communication within the 5GLAN group | GMF/UDR/UDM |

FIG. 22

UE Route Selection Policy Rule

| Information name | Description | Category | PCF permitted to modify in a UE context | Scope |
|---|---|---|---|---|
| Rule Precedence | Determines the order the URSP rule is enforced in the UE. | Mandatory | Yes | UE context |
| Traffic descriptor | *This part defines the traffic descriptors for the URSP rule.* | | | |
| Application descriptors | It consists of OSId and OSAppId(s). | Optional | Yes | UE context |
| IP descriptors | IP 3 tuple(s) (destination IP address or IPv6 network prefix, destination port number, protocol ID of the protocol above IP). | Optional | Yes | UE context |
| Non-IP descriptors | Descriptor(s) for non-IP traffic | Optional | Yes | UE context |
| DNN | This is the DNN information provided by the application. | Optional | Yes | UE context |
| Connection Capabilities | This is the information provided by a UE application when it requests a network connection with certain capabilities. | Optional | Yes | UE context |
| List of Route Selection Descriptors | A list of Route Selection Descriptors. | Mandatory | Yes | UE Context/Group Context |

FIG. 23

URSP Route Selection Descriptor

| Information name | Description | Category | PCF permitted to modify in URSP | Scope |
|---|---|---|---|---|
| Route Selection Descriptor Precedence | Determines the order in which the Route Selection Descriptors are to be applied. | Mandatory | Yes | UE context |
| Route selection components | *This part defines the route selection components* | Mandatory | | |
| SSC Mode Selection | One single value of SSC mode. | Optional | Yes | UE context |
| Network Slice Selection | Either a single value or a list of values of S-NSSAI(s). | Optional | Yes | UE context |
| Network Slice Selection | Either a single value or a list of values of S-NSSAI(s). | Mandatory/ Optional | Yes | Group Context |
| DNN Selection | Either a single value or a list of values of DNN(s). | Optional | Yes | UE context |
| PDU Session Type Selection | One single value of PDU Session Type | Optional | Yes | UE context |
| Non-seamless Offload indication | Indicates if the traffic of the matching application is to be offloaded to non-3GPP access outside of a PDU Session. | Optional | Yes | UE context |
| Access Type preference | Indicates the preferred Access Type (3GPP or non-3GPP) when the UE establishes a PDU Session for the matching application. | Optional | Yes | UE context |

FIG. 24

WIRELESS DEVICE REQUEST FOR PROTOCOL DATA UNIT SESSION

CROSS-REFERENCE TO RELATED APPLICATIONS

This application is a continuation of U.S. patent application Ser. No. 17/727,211, filed Apr. 22, 2022, which is a continuation of U.S. patent application Ser. No. 16/743,402, filed Jan. 15, 2020, which claims the benefit of U.S. Provisional Application No. 62/792,679, filed Jan. 15, 2019, all of which are hereby incorporated by reference in their entirety.

BRIEF DESCRIPTION OF THE SEVERAL VIEWS OF THE DRAWINGS

Examples of several of the various embodiments of the present invention are described herein with reference to the drawings.

FIG. 15 is an example diagram as per an aspect of an embodiment of the present disclosure.

FIG. 22 is an example diagram as per an aspect of an embodiment of the present disclosure.

FIG. 23 is an example diagram as per an aspect of an embodiment of the present disclosure.

FIG. 24 is an example diagram as per an aspect of an embodiment of the present disclosure.

DETAILED DESCRIPTION OF EXAMPLES

Example embodiments of the present invention enable implementation of enhanced features and functionalities in 5G systems. Embodiments of the technology disclosed herein may be employed in the technical field of 5G systems and network slicing for communication systems. More particularly, the embodiments of the technology disclosed herein may relate to 5G core network and 5G systems for network slicing in communication systems. Throughout the present disclosure, UE, wireless device, and mobile device are used interchangeably.

The following acronyms are used throughout the present disclosure:

| | |
|---|---|
| 5G | 5th generation mobile networks |
| 5GC | 5G Core Network |
| 5GS | 5G System |
| 5G-AN | 5G Access Network |
| 5QI | 5G QoS Indicator |
| AF | Application Function |
| AMF | Access and Mobility Management Function |
| AN | Access Network |
| CDR | Charging Data Record |
| CCNF | Common Control Network Functions |
| CIoT | Cellular IoT |
| CN | Core Network |
| CP | Control Plane |
| DDN | Downlink Data Notification |
| DL | Downlink |
| DN | Data Network |
| DNN | Data Network Name |
| F-TEID | Fully Qualified TEID |
| GPSI | Generic Public Subscription Identifier |
| GTP | GPRS Tunneling Protocol |
| GUTI | Globally Unique Temporary Identifier |
| IMSI | International Mobile Subscriber Identity |
| LADN | Local Area Data Network |
| LI | Lawful Intercept |
| MEI | Mobile Equipment Identifier |
| MICO | Mobile Initiated Connection Only |
| MME | Mobility Management Entity |
| MO | Mobile Originated |
| MSISDN | Mobile Subscriber ISDN |
| MT | Mobile Terminating |
| N3IWF | Non-3GPP InterWorking Function |
| NAI | Network Access Identifier |
| NAS | Non- Access Stratum |
| NB-IoT | Narrow Band IoT |
| NEF | Network Exposure Function |
| NF | Network Function |
| NGAP | Next Generation Application Protocol |
| NR | New Radio |
| NRF | Network Repository Function |
| NSI | Network Slice Instance |
| NSSAI | Network Slice Selection Assistance Information |
| NSSF | Network Slice Selection Function |
| OCS | Online Charging System |

-continued

| | |
|---|---|
| OFCS | Offline Charging System |
| PCF | Policy Control Function |
| PDU | Packet/Protocol Data Unit |
| PEI | Permanent Equipment Identifier |
| PLMN | Public Land Mobile Network |
| RAN | Radio Access Network |
| QFI | QoS Flow Identity |
| RM | Registration Management |
| S1-AP | S1 Application Protocol |
| SBA | Service Based Architecture |
| SEA | Security Anchor Function |
| SCM | Security Context Management |
| SMF | Session Management Function |
| SMSF | SMS Function |
| S-NSSAI | Single Network Slice Selection Assistance information |
| SUCI | Served User Correlation ID |
| SUPI | Subscriber Permanent Identifier |
| TEID | Tunnel Endpoint Identifier |
| TSN | Time Sensitive Networking |
| UE | User Equipment |
| UL | Uplink |
| UL CL | Uplink Classifier |
| UPF | User Plane Function |

Figure 1:
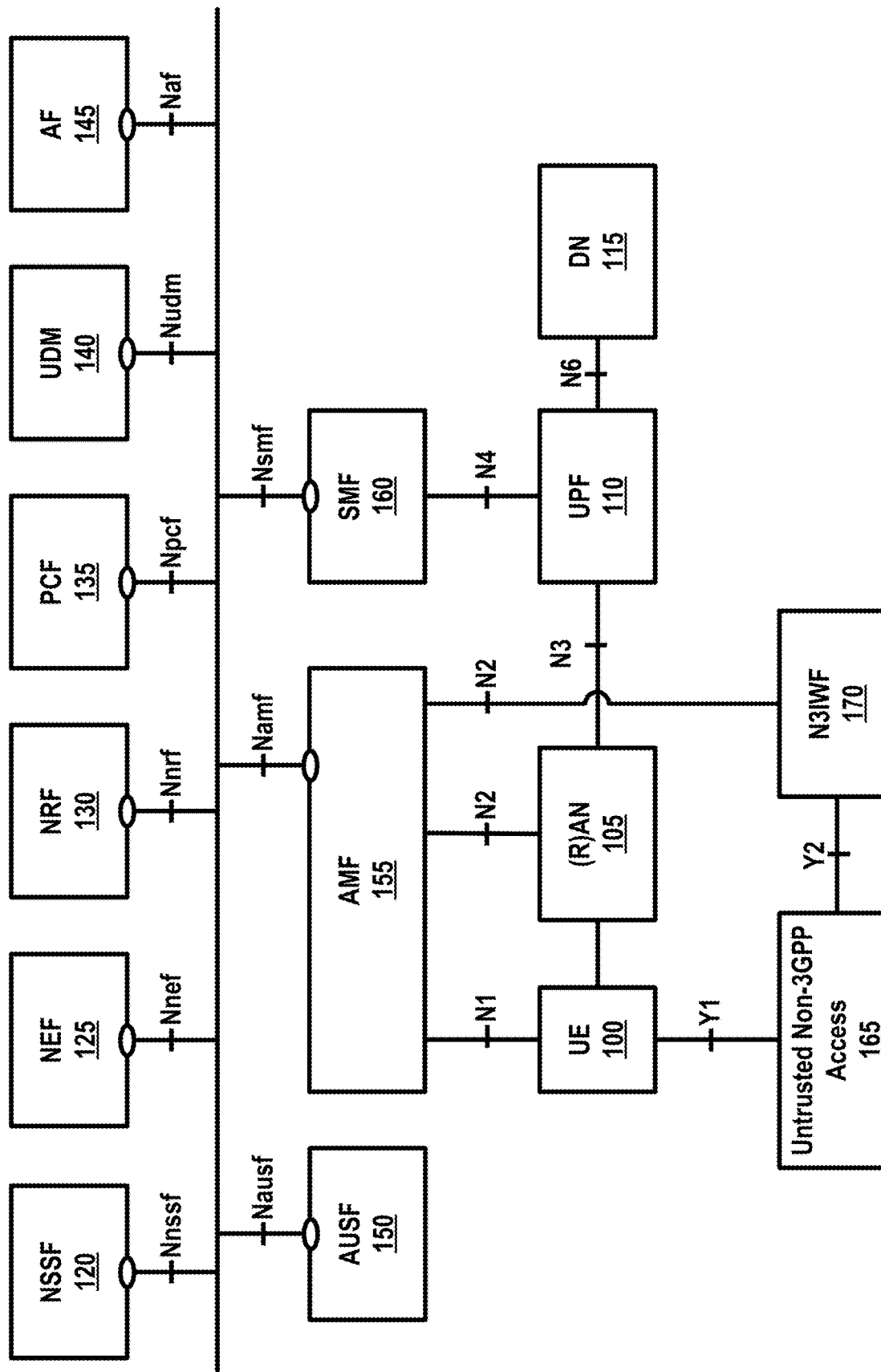
FIG. 1 is a diagram of an example 5G system architecture as per an aspect of an embodiment of the present disclosure.
Figure 2:
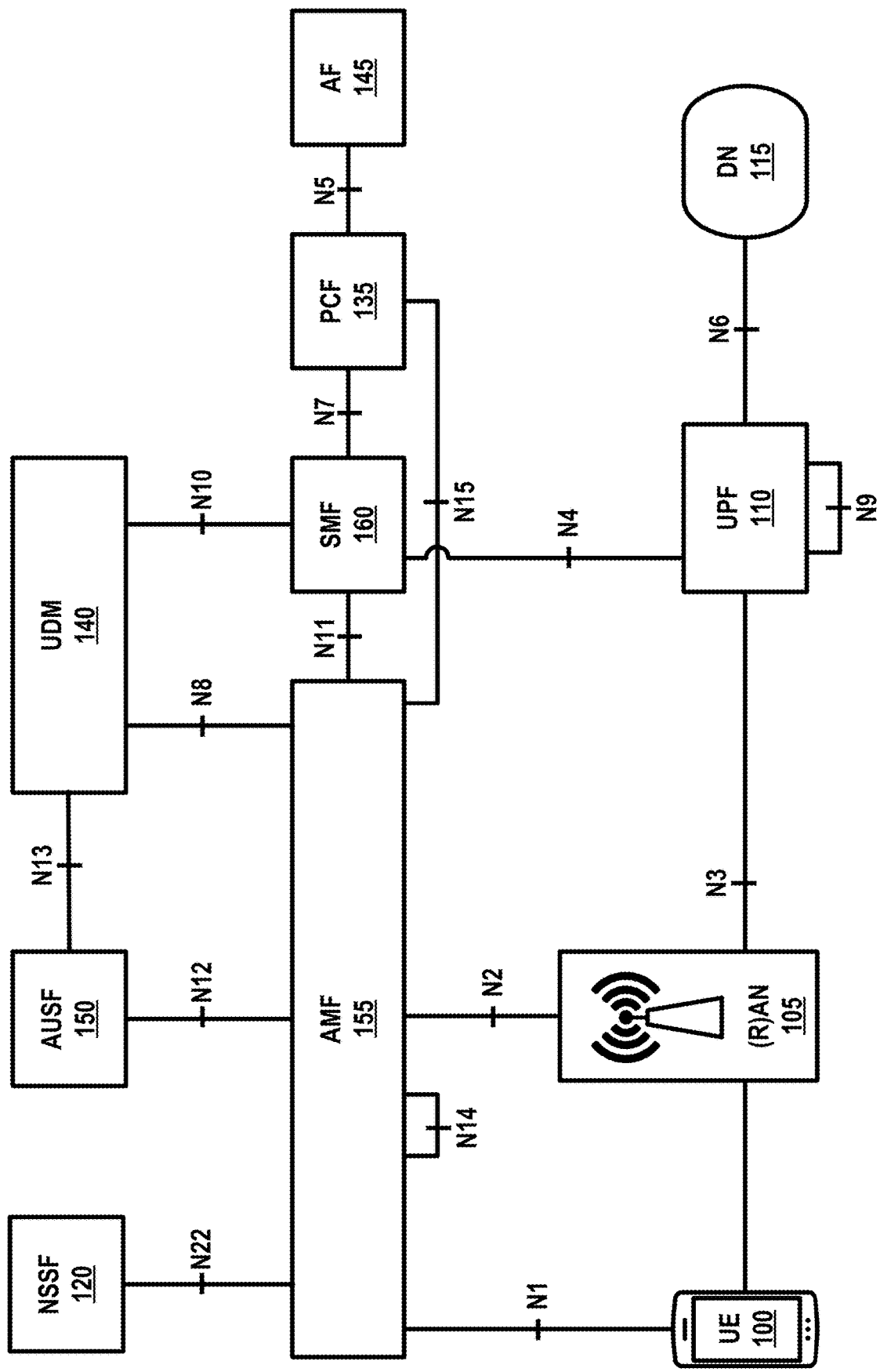
FIG. 2 is a diagram of an example 5G System architecture as per an aspect of an embodiment of the present disclosure.

Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
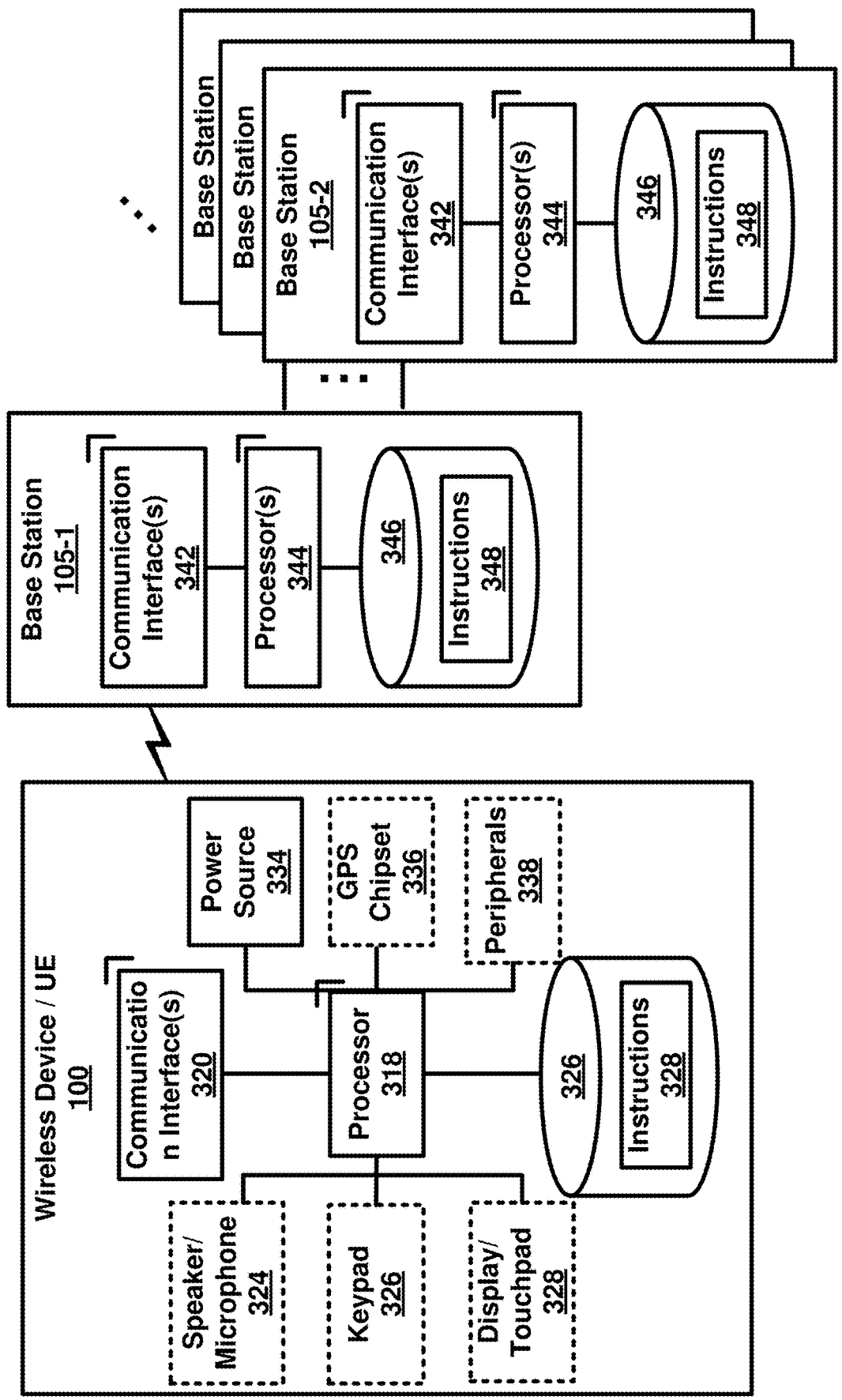
FIG. 3 is a system diagram of an example wireless device and a network node in a 5G system as per an aspect of an embodiment of the present disclosure.
Figure 4:
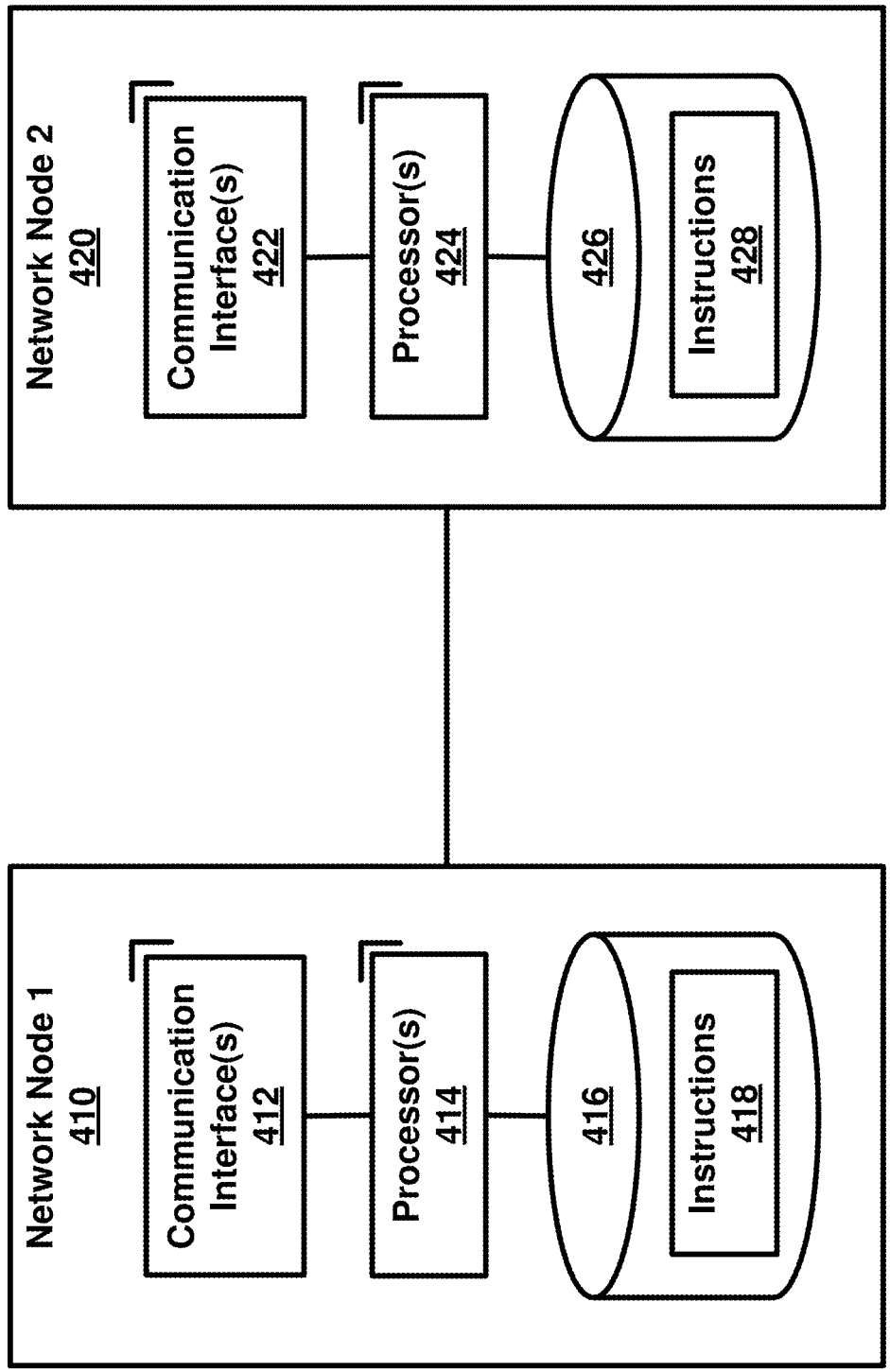
FIG. 4 is a system diagram of an example network node as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPV4 or IPV6 based on DNN configuration and/or operator policies. In an example, the SMF 160 may provide a cause value to the UE 100 to indicate whether the other IP version is supported on the DNN. In an example, if the SMF 160 receives a request for PDU type IPV4 or IPV6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPV4 address allocation and/or IPv4 parameter configuration via DHCPv4 may be employed once PDU session may be established. IPV6 prefix allocation may be supported via IPV6 stateless autoconfiguration, if IPV6 is supported. In an example, 5GC network elements may support IPV6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, a network repository function, NRF 130, may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(s) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function, AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

Figure 5A:
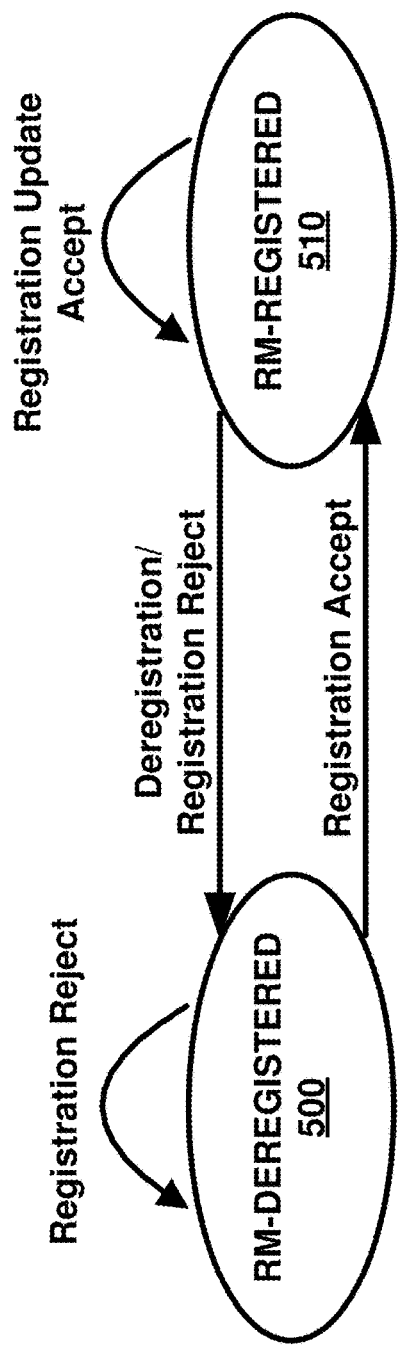
FIG. 5A and FIG. 5B depict two registration management state models in UE 100 and AMF 155 as per an aspect of embodiments of the present disclosure.
Figure 5B:
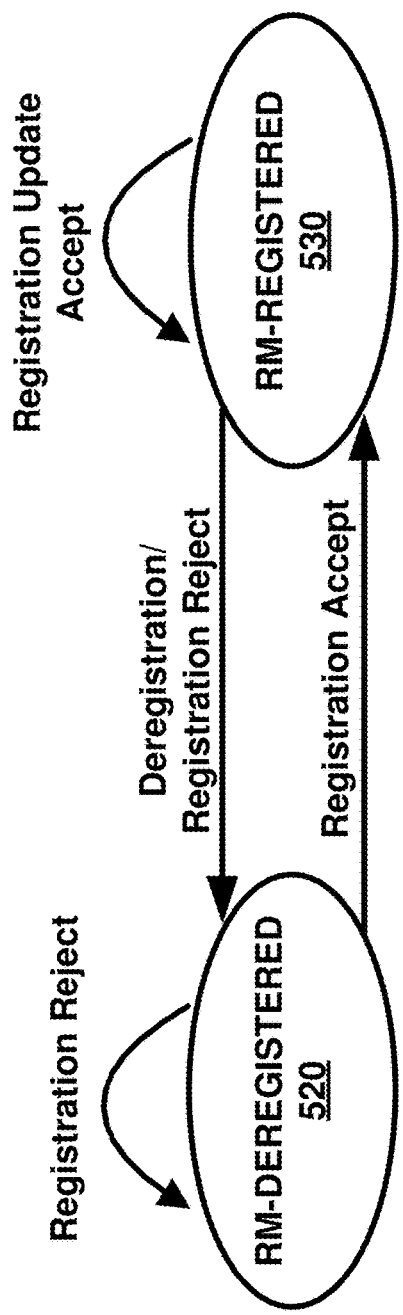

In an example, as depicted in example FIG. 5A and FIG. 5B, the registration management, RM may be employed to register or de-register a UE/user 100 with the network, and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
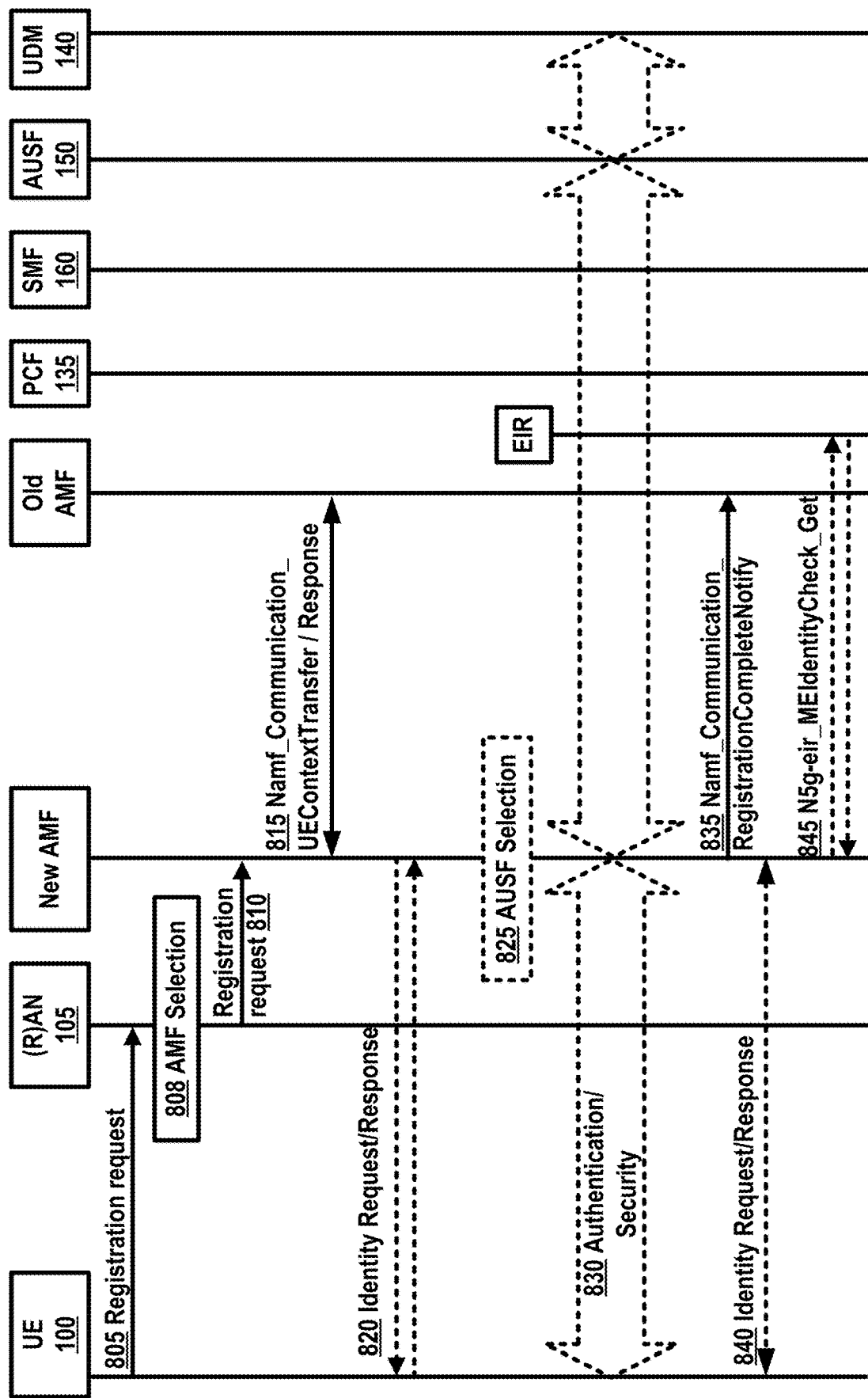
FIG. 8 is an example call flow as per an aspect of an embodiment of the present disclosure.
Figure 9:
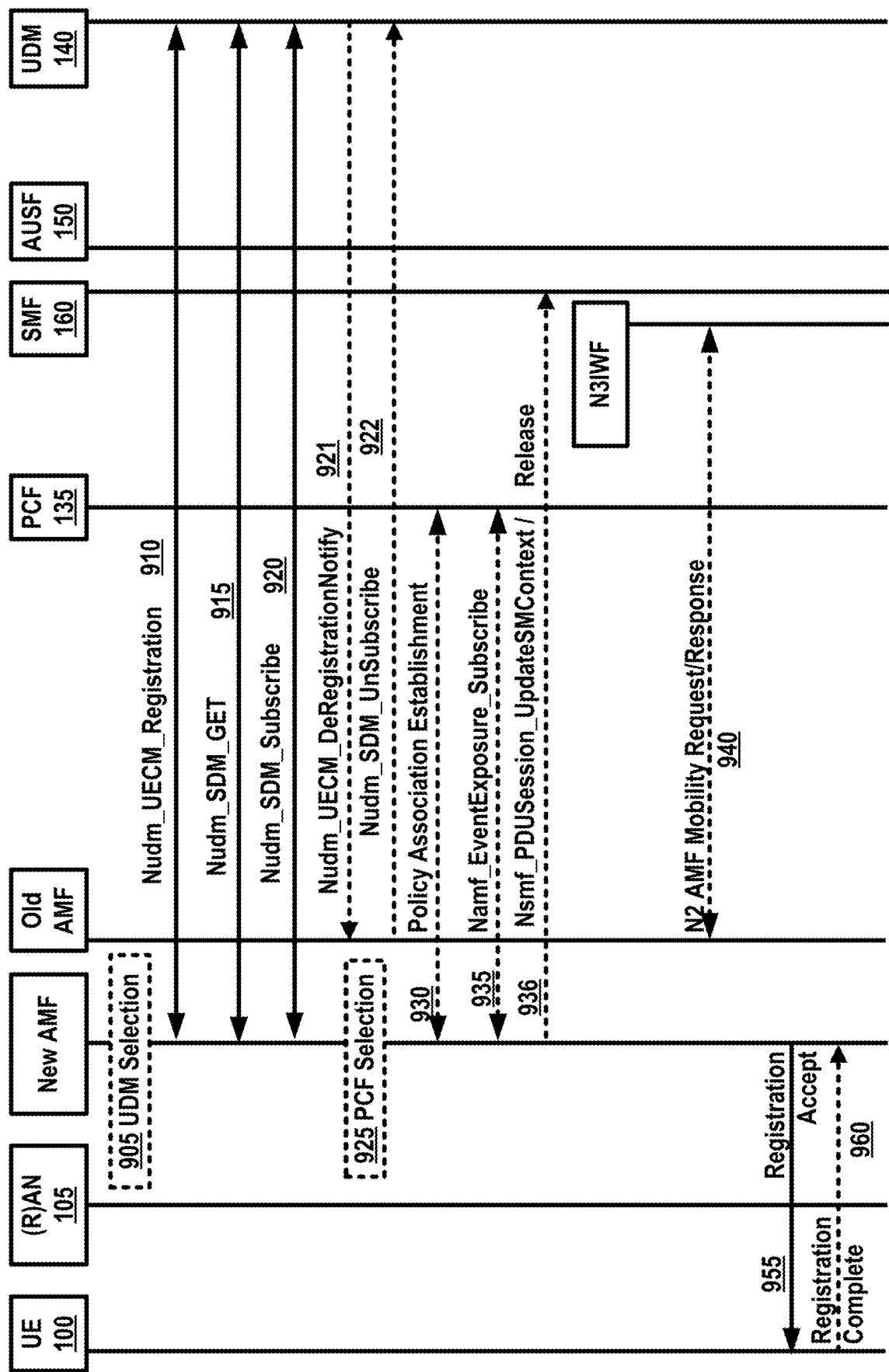
FIG. 9 is an example call flow as per an aspect of an embodiment of the present disclosure.

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

Figure 6A:
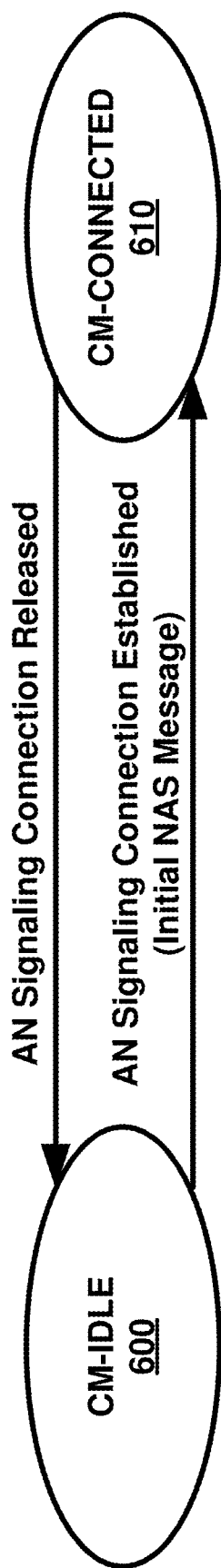
FIG. 6A and FIG. 6B depict two connection management state models in UE 100 and AMF 155 as per an aspect of embodiments of the present disclosure.
Figure 6B:
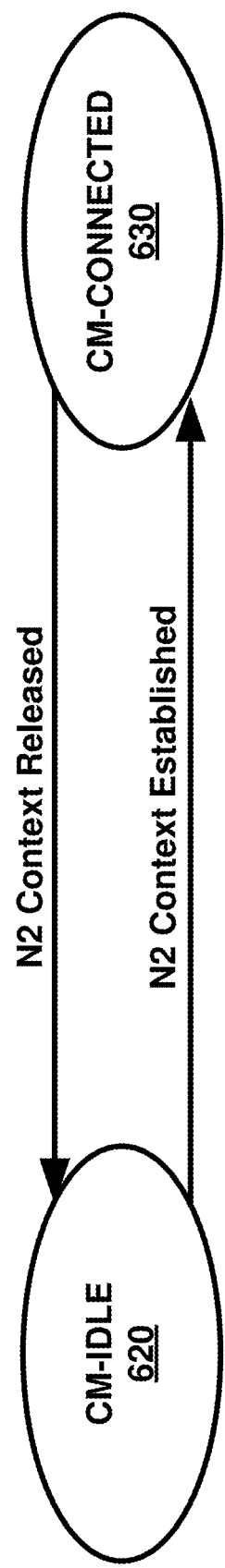

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
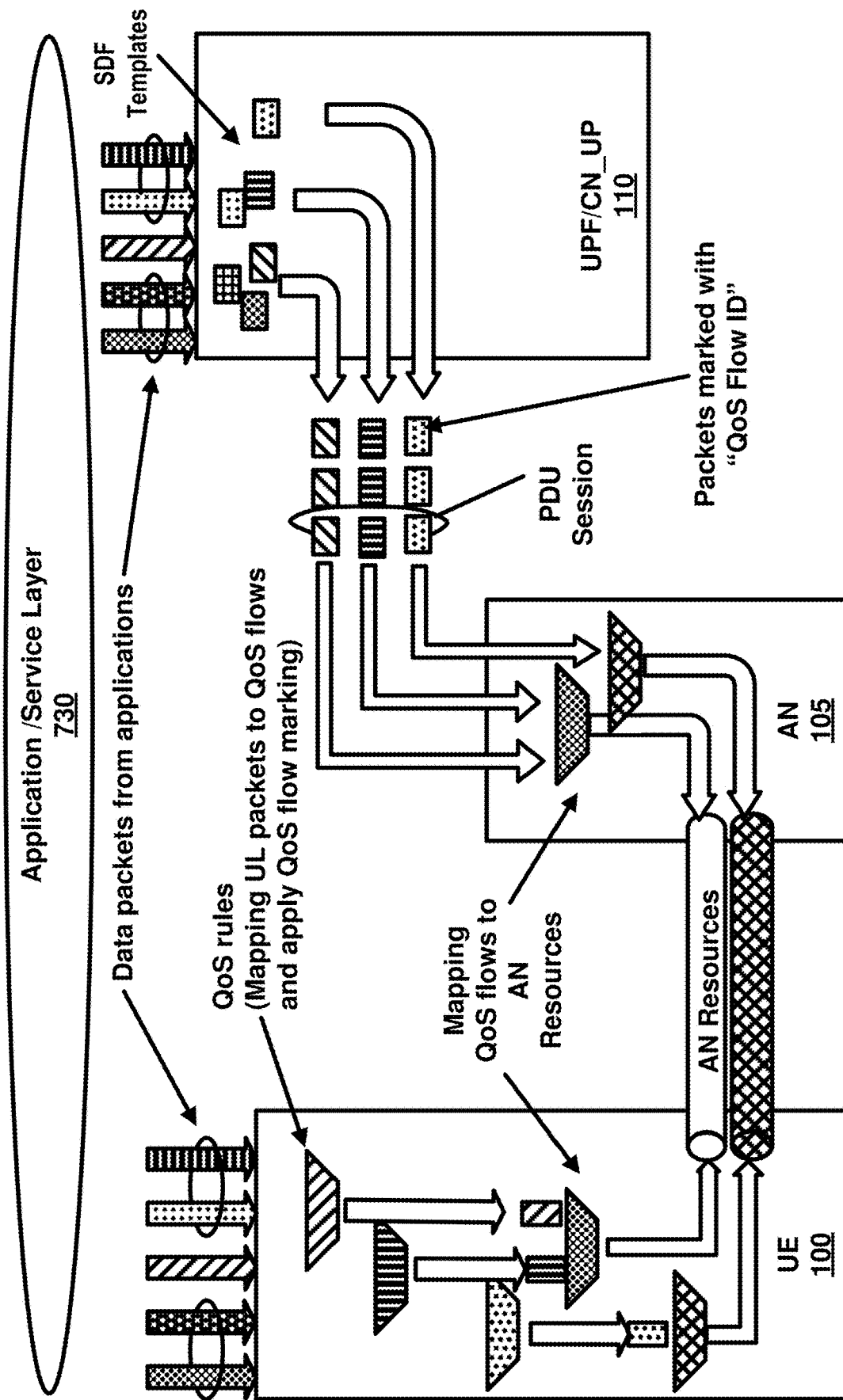
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QOS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like.).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEF 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc.) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 may be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by one or more PLMN(s) based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message 805 (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (i.e. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performs an initial registration (i.e., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (i.e. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of one or more S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects 808 an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection 808.

In an example, the (R)AN 105 may send to the new AMF 155 an N2 message 810 (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 an Namf_Communication_UEContextTransfer (complete registration request) 815. In an example, if the UE's 5G-GUTI was included in the registration request and the serving AMF 155 has changed since last registration procedure, the new AMF 155 may invoke the Namf_Communication_UEContextTransfer service operation 815 on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by one or more NF consumer, for the UE, to the new AMF 155. In an example, if the UE 100 identifies itself with PEI, the SUPI request may be skipped.

In an example, the old AMF 155 may send to new AMF 155 a response 815 to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure 820 may be initiated by the AMF 155 sending an identity request message to the UE 100 requesting the SUCI.

In an example, the UE 100 may respond with an identity response message 820 including the SUCI. The UE 100 may derive the SUCI by using the provisioned public key of the HPLMN.

In an example, the AMF 155 may decide to initiate UE 100 authentication 825 by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration the AMF 155 may skip the authentication and security setup or the AMF 155 may accept that the authentication may fail and may continue the registration procedure.

In an example, the authentication 830 may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify 835. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(*s*) to locally release the UE's SM context by invoking the Nsmf_PDUSession_ReleaseSMContext service operation.

In an example, the new AMF 155 may send to the UE 100 an identity request/response 840 (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check 845 by invoking the N5g-eir_EquipmentIdentity-Check_Get service operation 845.

In an example, the new AMF 155, based on the SUPI, may select 905 a UDM 140. The UDM 140 may select a UDR instance. In an example, the AMF 155 may selects a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration 910 and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get 915. The UDM 140 may retrieve this information from UDR by Nudr_UDM_Query (access and mobility subscription data). After a successful response is received, the AMF 155 may subscribe to be notified using Nudm_SDM_Subscribe 920 when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification 921 to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe 922.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select 925 a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select 925 a PCF 135.

In an example, the new AMF 155 may perform a policy association establishment 930 during registration procedure. If the new AMF 155 contacts the PCF 135 identified by the (V-)PCF ID received during inter-AMF 155 mobility, the new AMF 155 may include the PCF-ID in the Npcf_AM-PolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_EventExposure_Subscribe service operation 935 for UE 100 event subscription.

In an example, the AMF 155 may send to the SMF 160 an Nsmf_PDUSession_UpdateSMContext 936. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(*s*) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155155 may send to a N3IWF an N2 AMF 155 mobility request 940. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response 940.

In an example, the new AMF 155 may send to the UE 100 a registration accept 955 (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message 955. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of one or more S-NSSAI of the allowed NSSAI to the S-NSSAIs of the configured NSSAI for the HPLMN. The AMF 155 may include in the registration accept message 955 the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete 960 message. In an example, the UE 100 may send the registration complete message 960 to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
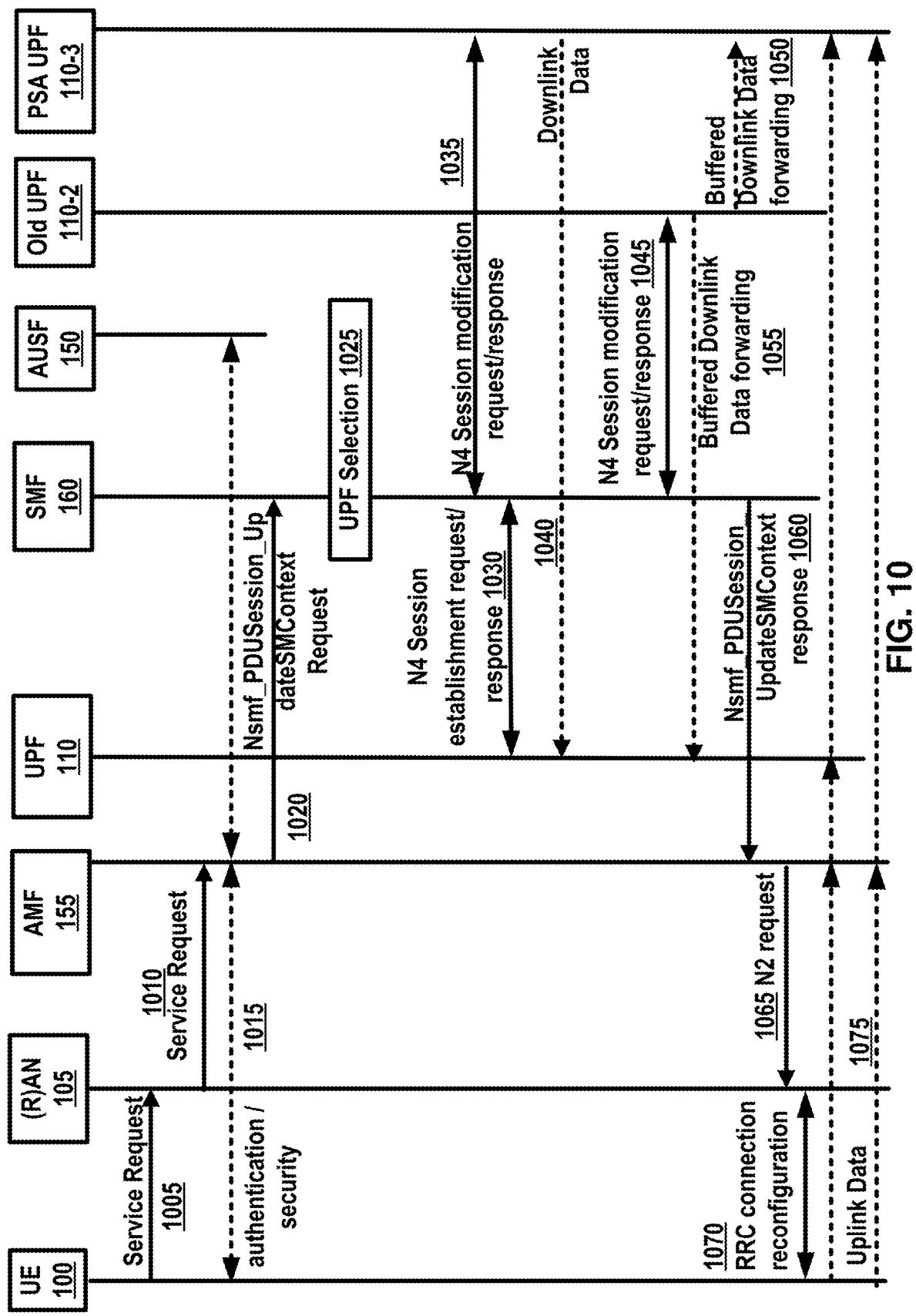
FIG. 10 is an example call flow as per an aspect of an embodiment of the present disclosure.
Figure 11:
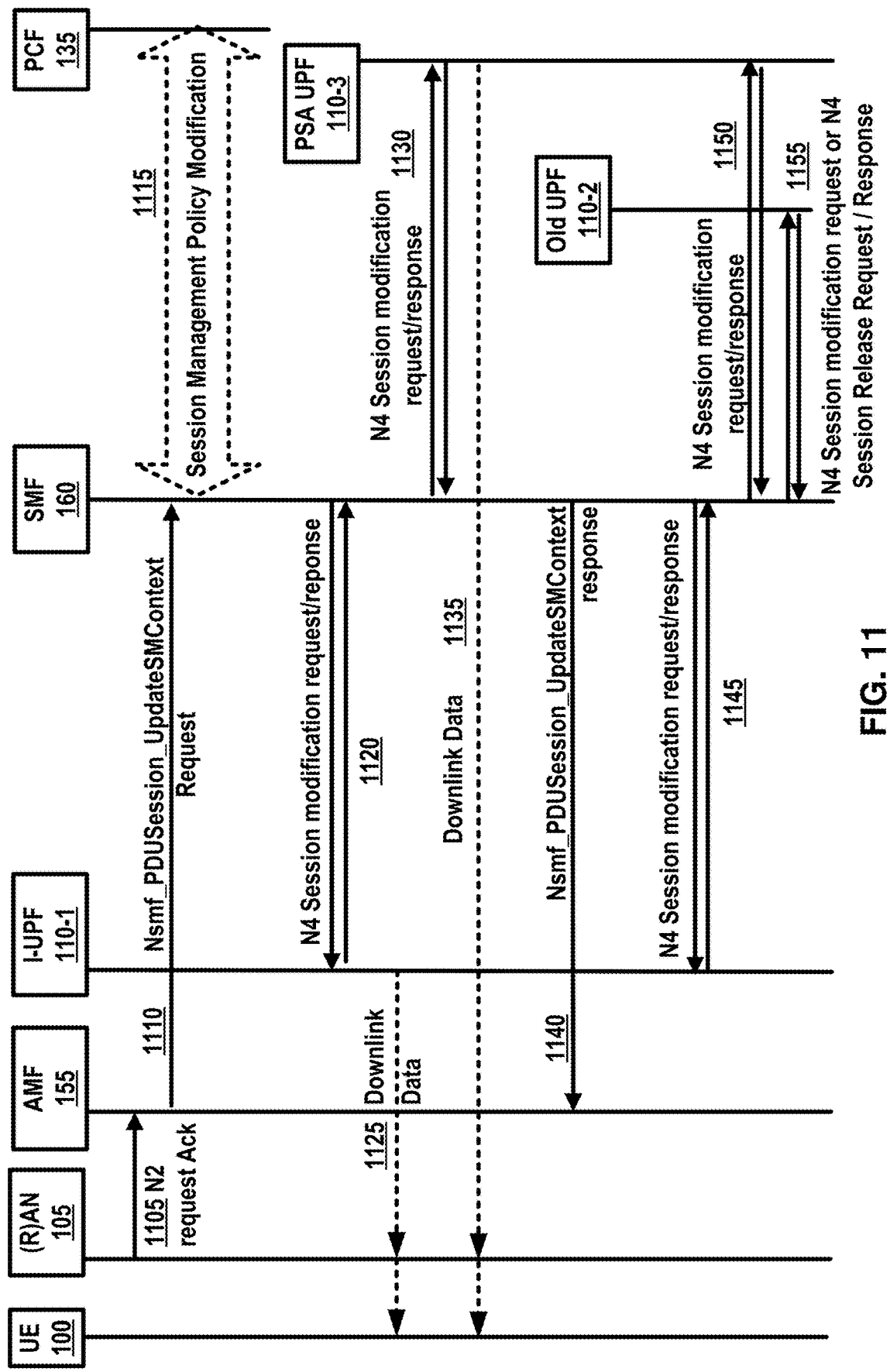
FIG. 11 is an example call flow as per an aspect of an embodiment of the present disclosure.

As depicted in example FIG. 10 and FIG. 11, a service request procedure e.g., a UE 100 triggered service request procedure may be used by a UE 100 in CM-IDLE state to request the establishment of a secure connection to an AMF 155. FIG. 11 is continuation of FIG. 10 depicting the service request procedure. The service request procedure may be used to activate a user plane connection for an established PDU session. The service request procedure may be triggered by the UE 100 or the 5GC, and may be used when the UE 100 is in CM-IDLE and/or in CM-CONNECTED and may allow selectively to activate user plane connections for some of the established PDU sessions.

In an example, a UE 100 in CM IDLE state may initiate the service request procedure to send uplink signaling messages, user data, and/or the like, as a response to a network paging request, and/or the like. In an example, after receiving the service request message, the AMF 155 may perform authentication. In an example, after the establishment of signaling connection to the AMF 155, the UE 100 or network may send signaling messages, e.g. PDU session establishment from the UE 100 to a SMF 160, via the AMF 155.

In an example, for any service request, the AMF 155 may respond with a service accept message to synchronize PDU session status between the UE 100 and network. The AMF 155 may respond with a service reject message to the UE 100, if the service request may not be accepted by the network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and PDU session Anchor PSA UPF 110-3 may be involved.

In an example, the UE 100 may send to a (R)AN 105 an AN message comprising AN parameters, mobility management, MM NAS service request 1005 (e.g., list of PDU sessions to be activated, list of allowed PDU sessions, security parameters, PDU session status, and/or the like), and/or the like. In an example, the UE 100 may provide the list of PDU sessions to be activated when the UE 100 may re-activate the PDU session(s). The list of allowed PDU sessions may be provided by the UE 100 when the service request may be a response of a paging or a NAS notification, and may identify the PDU sessions that may be transferred or associated to the access on which the service request may be sent. In an example, for the case of NG-RAN, the AN parameters may include selected PLMN ID, and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of PDU sessions to be activated, the PDU session(s) for which the UP connections are to be activated in the NAS service request message. If the service request may be triggered for signaling, the UE 100 may not identify any PDU session(s). If this procedure may be triggered for paging response, and/or the UE 100 may have at the same time user data to be transferred, the UE 100 may identify the PDU session(s) whose UP connections may be activated in MM NAS service request message, by the list of PDU sessions to be activated.

In an example, if the service request over 3GPP access may be triggered in response to a paging indicating non-3GPP access, the NAS service request message may identify in the list of allowed PDU sessions the list of PDU sessions associated with the non-3GPP access that may be re-activated over 3GPP. In an example, the PDU session status may indicate the PDU sessions available in the UE 100. In an example, the UE 100 may not trigger the service request procedure for a PDU session corresponding to a LADN when the UE 100 may be outside the area of availability of the LADN. The UE 100 may not identify such PDU session(s) in the list of PDU sessions to be activated, if the service request may be triggered for other reasons.

In an example, the (R)AN 105 may send to AMF 155 an N2 Message 1010 (e.g., a service request) comprising N2 parameters, MM NAS service request, and/or the like. The AMF 155 may reject the N2 message if it may not be able to handle the service request. In an example, if NG-RAN may be used, the N2 parameters may include the 5G-GUTI, selected PLMN ID, location information, RAT type, establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the PDU session status, the AMF 155 may initiate PDU session release procedure in the network for the PDU sessions whose PDU session ID(s) may be indicated by the UE 100 as not available.

In an example, if the service request was not sent integrity protected or integrity protection verification failed, the AMF 155 may initiate a NAS authentication/security procedure 1015.

In an example, if the UE 100 triggers the service request to establish a signaling connection, upon successful establishment of the signaling connection, the UE 100 and the network may exchange NAS signaling.

In an example the AMF 155 may send to the SMF 160 a PDU session update context request 1020 e.g., Nsmf_PDUSession_UpdateSMContext request comprising PDU session ID(s), Cause(s), UE 100 location information, access type, and/or the like.

In an example, the Nsmf_PDUSession_UpdateSMContext request may be invoked by the AMF 155 if the UE 100 may identify PDU session(s) to be activated in the NAS service request message. In an example, the Nsmf_PDUSession_UpdateSMContext request may be triggered by the SMF 160 wherein the PDU session(s) identified by the UE 100 may correlate to other PDU session ID(s) than the one triggering the procedure. In an example, the Nsmf_PDUSession_UpdateSMContext request may be triggered by the SMF 160 wherein the current UE 100 location may be outside the area of validity for the N2 information provided by the SMF 160 during a network triggered service request procedure. The AMF 155 may not send the N2 information provided by the SMF 160 during the network triggered service request procedure.

In an example, the AMF 155 may determine the PDU session(s) to be activated and may send an Nsmf_PDUSession_UpdateSMContext request to SMF 160(*s*) associated with the PDU session(s) with cause set to indicate establishment of user plane resources for the PDU session(s).

In an example, if the procedure may be triggered in response to paging indicating non-3GPP access, and the list of allowed PDU sessions provided by the UE 100 may not include the PDU session for which the UE 100 was paged, the AMF 155 may notify the SMF 160 that the user plane for the PDU session may not be re-activated. The service request procedure may succeed without re-activating the user plane of any PDU sessions, and the AMF 155 may notify the UE 100.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) keep the PDU session, may reject the activation of user plane connection for the PDU session and may inform the AMF 155. In an example, if the procedure may be triggered by a network triggered service request, the SMF 160 may notify the UPF 110 that originated the data notification to discard downlink data for the PDU sessions and/or to not provide further data notification messages. The SMF 160 may respond to the AMF 155 with an appropriate reject cause and the user plane activation of PDU session may be stopped.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) release the PDU session. The SMF 160 may locally release the PDU session and may inform the AMF 155 that the PDU session may be released. The SMF 160 may respond to the AMF 155 with an appropriate reject cause and the user plane Activation of PDU session may be stopped.

In an example, if the UP activation of the PDU session may be accepted by the SMF 160, based on the location info received from the AMF 155, the SMF 160 may check the UPF 110 Selection 1025 Criteria (e.g., slice isolation requirements, slice coexistence requirements, UPF's 110 dynamic load, UPF's 110 relative static capacity among UPFs supporting the same DNN, UPF 110 location available at the SMF 160, UE 100 location information, Capability of the UPF 110 and the functionality required for the particular UE 100 session. In an example, an appropriate UPF 110 may be selected by matching the functionality and features required for a UE 100, DNN, PDU session type (i.e. IPv4, IPV6, ethernet type or unstructured type) and if applicable, the static IP address/prefix, SSC mode selected for the PDU session, UE 100 subscription profile in UDM 140, DNAI as included in the PCC rules, local operator policies, S-NSSAI, access technology being used by the UE 100, UPF 110 logical topology, and/or the like), and may determine to perform one or more of the following: continue using the current UPF(s); may select a new intermediate UPF 110 (or add/remove an intermediate UPF 110), if the UE 100 has moved out of the service area of the UPF 110 that was previously connecting to the (R)AN 105, while maintaining the UPF(s) acting as PDU session anchor; may trigger re-establishment of the PDU session to perform relocation/reallocation of the UPF 110 acting as PDU session anchor, e.g. the UE 100 has moved out of the service area of the anchor UPF 110 which is connecting to RAN 105.

In an example, the SMF 160 may send to the UPF 110 (e.g., new intermediate UPF 110) an N4 session establishment request 1030. In an example, if the SMF 160 may select a new UPF 110 to act as intermediate UPF 110-2 for the PDU session, or if the SMF 160 may select to insert an intermediate UPF 110 for a PDU session which may not have an intermediate UPF 110-2, an N4 session establishment request 1030 message may be sent to the new UPF 110, providing packet detection, data forwarding, enforcement and reporting rules to be installed on the new intermediate UPF. The PDU session anchor addressing information (on N9) for this PDU session may be provided to the intermediate UPF 110-2.

In an example, if a new UPF 110 is selected by the SMF 160 to replace the old (intermediate) UPF 110-2, the SMF 160 may include a data forwarding indication. The data forwarding indication may indicate to the UPF 110 that a second tunnel endpoint may be reserved for buffered DL data from the old I-UPF.

In an example, the new UPF 110 (intermediate) may send to SMF 160 an N4 session establishment response message 1030. In case the UPF 110 may allocate CN tunnel info, the UPF 110 may provide DL CN tunnel info for the UPF 110 acting as PDU session anchor and UL CN tunnel info (e.g., CN N3 tunnel info) to the SMF 160. If the data forwarding indication may be received, the new (intermediate) UPF 110 acting as N3 terminating point may send DL CN tunnel info for the old (intermediate) UPF 110-2 to the SMF 160. The SMF 160 may start a timer, to release the resource in the old intermediate UPF 110-2.

In an example, if the SMF 160 may selects a new intermediate UPF 110 for the PDU session or may remove the old I-UPF 110-2, the SMF 160 may send N4 session modification request message 1035 to PDU session anchor, PSA UPF 110-3, providing the data forwarding indication and DL tunnel information from new intermediate UPF 110.

In an example, if the new intermediate UPF 110 may be added for the PDU session, the (PSA) UPF 110-3 may begin to send the DL data to the new I-UPF 110 as indicated in the DL tunnel information.

In an example, if the service request may be triggered by the network, and the SMF 160 may remove the old I-UPF 110-2 and may not replace the old I-UPF 110-2 with the new I-UPF 110, the SMF 160 may include the data forwarding indication in the request. The data forwarding indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 session modification response 1035. In an example, if the data forwarding indication may be received, the PSA UPF 110-3 may become as N3 terminating point and may send CN DL tunnel info for the old (intermediate) UPF 110-2 to the SMF 160. The SMF 160 may start a timer, to release the resource in old intermediate UPF 110-2 if there is one.

In an example, the SMF 160 may send to the old UPF 110-2 an N4 session modification request 1045 (e.g., may comprise new UPF 110 address, new UPF 110 DL tunnel ID, and/or the like). In an example, if the service request may be triggered by the network, and/or the SMF 160 may remove the old (intermediate) UPF 110-2, the SMF 160 may send the N4 session modification request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF 110 (PSA) 110-3 acting as N3 terminating point. The SMF 160 may start a timer to monitor the forwarding tunnel. In an example, the old (intermediate) UPF 110-2 may send N4 session modification response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF 110 may not be assigned for the PDU session and forwarding tunnel may be established to the UPF 110 (PSA) 110-3, the old (intermediate) UPF 110-2 may forward its buffered data to the UPF 110 (PSA) 110-3 acting as N3 terminating point.

In an example, the SMF 160 may send to the AMF 155 an N11 message 1060 e.g., a Nsmf_PDUSession_UpdateSM-Context response (comprising: N1 SM container (PDU session ID, PDU session re-establishment indication), N2 SM information (PDU session ID, QoS profile, CN N3 tunnel info, S-NSSAI), Cause), upon reception of the Nsmf_PDUSession_UpdateSMContext request with a cause including, e.g., establishment of user plane resources. The SMF 160 may determine whether UPF 110 reallocation may be performed, based on the UE 100 location information, UPF 110 service area and operator policies. In an example, for a PDU session that the SMF 160 may determine to be served by the current UPF 110, e.g., PDU session anchor or intermediate UPF, the SMF 160 may generate N2 SM information and may send an Nsmf_PDUSession_UpdateSMContext response 1060 to the AMF 155 to establish the user plane(s). The N2 SM information may contain information that the AMF 155 may provide to the RAN 105.

In an example, for a PDU session that the SMF 160 may determine as requiring a UPF 110 relocation for PDU session anchor UPF, the SMF 160 may reject the activation of UP of the PDU session by sending Nsmf_PDUSession_UpdateSMContext response that may contain N1 SM container to the UE 100 via the AMF 155. The N1 SM container may include the corresponding PDU session ID and PDU session re-establishment indication.

Upon reception of the Namf_EventExposure_Notify from the AMF 155 to the SMF 160, with an indication that the UE 100 is reachable, if the SMF 160 may have pending DL data, the SMF 160 may invoke the Namf_Communication_N1N2MessageTransfer service operation to the AMF 155 to establish the user plane(s) for the PDU sessions. In an example, the SMF 160 may resume sending DL data notifications to the AMF 155 in case of DL data.

In an example, the SMF 160 may send a message to the AMF 155 to reject the activation of UP of the PDU session by including a cause in the Nsmf_PDUSession_UpdateSMContext response if the PDU session may correspond to a LADN and the UE 100 may be outside the area of availability of the LADN, or if the AMF 155 may notify the SMF 160 that the UE 100 may be reachable for regulatory prioritized service, and the PDU session to be activated may not for a regulatory prioritized service; or if the SMF 160 may decide to perform PSA UPF 110-3 relocation for the requested PDU session.

In an example, the AMF 155 may send to the (R)AN 105 an N2 request message 1065 (e.g., N2 SM information received from SMF 160, security context, AMF 155 signaling connection ID, handover restriction list, MM NAS service accept, list of recommended cells/TAs/NG-RAN node identifiers). In an example, the RAN 105 may store the security context, AMF 155 signaling connection Id, QoS information for the QoS flows of the PDU sessions that may be activated and N3 tunnel IDs in the UE 100 RAN 105 context. In an example, the MM NAS service accept may include PDU session status in the AMF 155. If the activation of UP of a PDU session may be rejected by the SMF 160, the MM NAS service accept may include the PDU session ID and the reason why the user plane resources may not be activated (e.g. LADN not available). Local PDU session release during the session request procedure may be indicated to the UE 100 via the session Status.

In an example, if there are multiple PDU sessions that may involve multiple SMF 160s, the AMF 155 may not wait for responses from all SMF 160s before it may send N2 SM information to the UE 100. The AMF 155 may wait for all responses from the SMF 160s before it may send MM NAS service accept message to the UE 100.

In an example, the AMF 155 may include at least one N2 SM information from the SMF 160 if the procedure may be triggered for PDU session user plane activation. AMF 155 may send additional N2 SM information from SMF 160s in separate N2 message(s) (e.g. N2 tunnel setup request), if there is any. Alternatively, if multiple SMF 160s may be involved, the AMF 155 may send one N2 request message to (R)AN 105 after all the Nsmf_PDUSession_UpdateSM-Context response service operations from all the SMF 160s associated with the UE 100 may be received. In such case, the N2 request message may include the N2 SM information received in one or more of the Nsmf_PDUSession_UpdateSMContext response and PDU session ID to enable AMF 155 to associate responses to relevant SMF 160.

In an example, if the RAN 105 (e.g., NG RAN) node may provide the list of recommended cells/TAs/NG-RAN node identifiers during the AN release procedure, the AMF 155 may include the information from the list in the N2 request. The RAN 105 may use this information to allocate the RAN 105 notification area when the RAN 105 may decide to enable RRC inactive state for the UE 100.

If the AMF 155 may receive an indication, from the SMF 160 during a PDU session establishment procedure that the UE 100 may be using a PDU session related to latency sensitive services, for any of the PDU sessions established for the UE 100 and the AMF 155 has received an indication from the UE 100 that may support the CM-CONNECTED with RRC inactive state, then the AMF 155 may include the UE's RRC inactive assistance information. In an example, the AMF 155 based on network configuration, may include the UE's RRC inactive assistance information.

In an example, the (R)AN 105 may send to the UE 100 a message to perform RRC connection reconfiguration 1070 with the UE 100 depending on the QoS information for all the QoS flows of the PDU sessions whose UP connections may be activated and data radio bearers. In an example, the user plane security may be established.

In an example, if the N2 request may include a MM NAS service accept message, the RAN 105 may forward the MM NAS service accept to the UE 100. The UE 100 may locally delete context of PDU sessions that may not be available in 5GC.

In an example, if the N1 SM information may be transmitted to the UE 100 and may indicate that some PDU session(s) may be re-established, the UE 100 may initiate PDU session re-establishment for the PDU session(s) that may be re-established after the service request procedure may be complete.

In an example, after the user plane radio resources may be setup, the uplink data from the UE 100 may be forwarded to the RAN 105. The RAN 105 (e.g., NG-RAN) may send the uplink data to the UPF 110 address and tunnel ID provided.

In an example, the (R)AN 105 may send to the AMF 155 an N2 request Ack 1105 (e.g., N2 SM information (comprising: AN tunnel info, list of accepted QoS flows for the PDU sessions whose UP connections are activated, list of rejected QoS flows for the PDU sessions whose UP connections are activated). In an example, the N2 request message may include N2 SM information(s), e.g. AN tunnel info. RAN 105 may respond N2 SM information with separate N2 message (e.g. N2 tunnel setup response). In an example, if multiple N2 SM information are included in the N2 request message, the N2 request Ack may include multiple N2 SM information and information to enable the AMF 155 to associate the responses to relevant SMF 160.

In an example, the AMF 155 may send to the SMF 160 a Nsmf_PDUSession_UpdateSMContext request 1110 (N2 SM information (AN tunnel info), RAT type) per PDU session. If the AMF 155 may receive N2 SM information (one or multiple) from the RAN 105, then the AMF 155 may forward the N2 SM information to the relevant SMF 160. If the UE 100 time zone may change compared to the last reported UE 100 Time Zone then the AMF 155 may include the UE 100 time zone IE in the Nsmf_PDUSession_UpdateSMContext request message.

In an example, if dynamic PCC is deployed, the SMF 160 may initiate notification about new location information to the PCF 135 (if subscribed) by invoking an event exposure notification operation (e.g., a Nsmf_EventExposure_Notify service operation). The PCF 135 may provide updated policies by invoking a policy control update notification message 1115 (e.g., a Npcf_SMPolicyControl_UpdateNotify operation).

In an example, if the SMF 160 may select a new UPF 110 to act as intermediate UPF 110 for the PDU session, the SMF 160 may initiates an N4 session modification procedure 1120 to the new I-UPF 110 and may provide AN tunnel info. The downlink data from the new I-UPF 110 may be forwarded to RAN 105 and UE 100. In an example, the UPF 110 may send to the SMF 160, an N4 session modification response 1120. In an example, the SMF 160 may send to the AMF 155, an Nsmf_PDUSession_UpdateSMContext response 1140.

In an example, if forwarding tunnel may be established to the new I-UPF 110 and if the timer SMF 160 set for forwarding tunnel may be expired, the SMF 160 may sends N4 session modification request 1145 to new (intermediate) UPF 110 acting as N3 terminating point to release the forwarding tunnel. In an example, the new (intermediate) UPF 110 may send to the SMF 160 an N4 session modification response 1145. In an example, the SMF 160 may send to the PSA UPF 110-3 an N4 session modification request 1150, or N4 session release request. In an example, if the SMF 160 may continue using the old UPF 110-2, the SMF 160 may send an N4 session modification request 1155, providing AN tunnel info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 session release request (release cause) to the old intermediate UPF 110-2.

In an example, the old intermediate UPF 110-2 may send to the SMF 160 an N4 session modification response or N4 session release response 1155. The old UPF 110-2 may acknowledge with the N4 session modification response or N4 session release response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify towards the SMF 160 if the SMF 160 had subscribed for UE 100 moving into or out of area of interest and if the UE's current location may indicate that it may be moving into or moving outside of the area of interest subscribed, or if the SMF 160 had subscribed for LADN DNN and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

Figure 12:
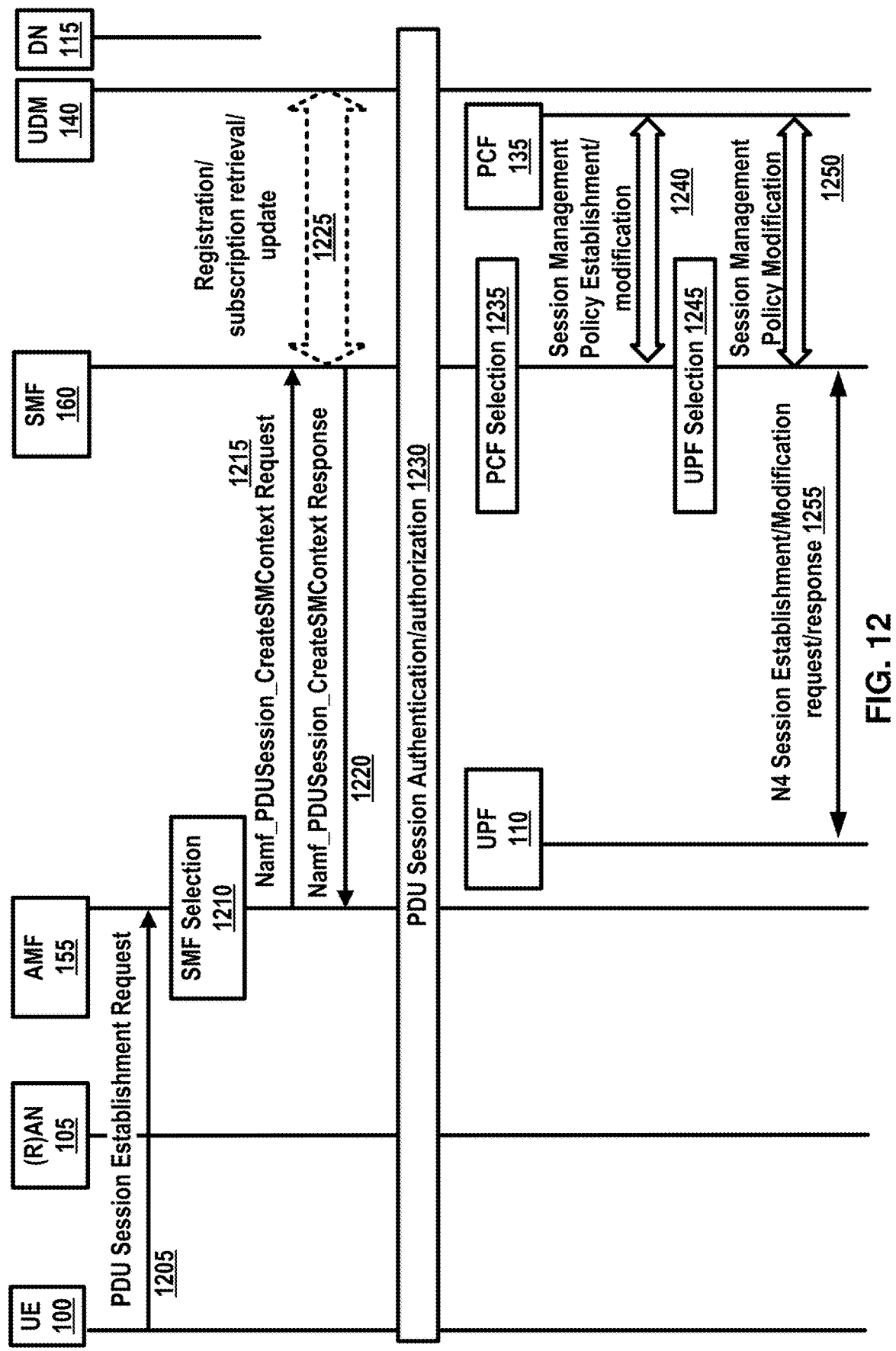
FIG. 12 is an example call flow as per an aspect of an embodiment of the present disclosure.
Figure 13:
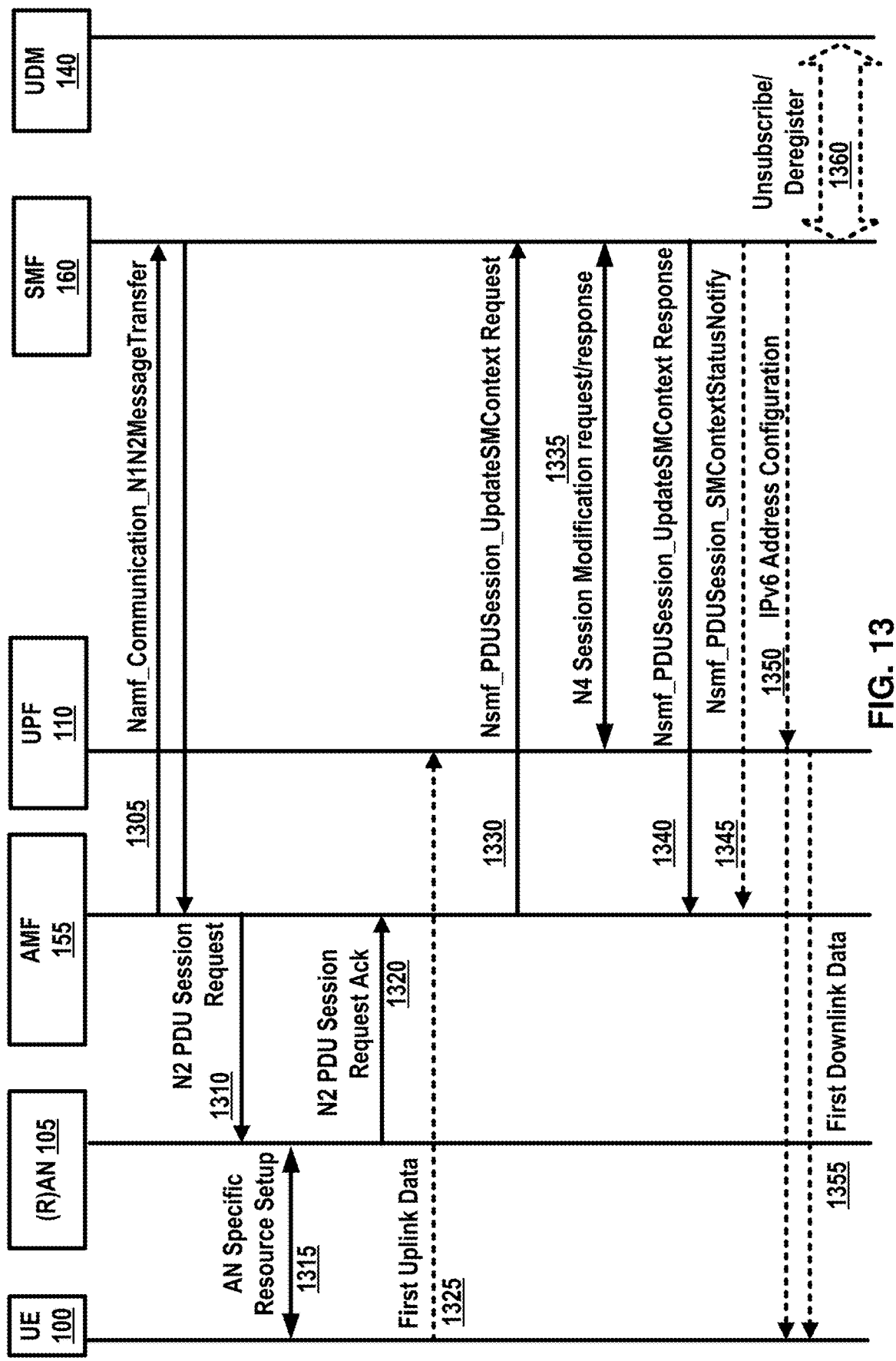
FIG. 13 is an example call flow as per an aspect of an embodiment of the present disclosure.

An example PDU session establishment procedure depicted in FIG. 12 and FIG. 13. In an example embodiment, when the PDU session establishment procedure may be employed, the UE 100 may send to the AMF 155 a NAS Message 1205 (or a SM NAS message) comprising NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like. In an example, the UE 100, in order to establish a new PDU session, may generate a new PDU session ID. In an example, when emergency service may be required and an emergency PDU session may not already be established, the UE 100 may initiate the UE 100 requested PDU session establishment procedure with a request type indicating emergency request. In an example, the UE 100 may initiate the UE 100 requested PDU session establishment procedure by the transmission of the NAS message containing a PDU session establishment request within the N1 SM container. The PDU session establishment request may include a PDU type, SSC mode, protocol configuration options, and/or the like. In an example, the request type may indicate initial request if the PDU session establishment is a request to establish the new PDU session and may indicate existing PDU session if the request refers to an existing PDU session between 3GPP access and non-3GPP access or to an existing PDN connection in EPC. In an example, the request type may indicate emergency request if the PDU session establishment may be a request to establish a PDU session for emergency services. The request type may indicate existing emergency PDU session if the request refers to an existing PDU session for emergency services between 3GPP access and non-3GPP access. In an example, the NAS message sent by the UE 100 may be encapsulated by the AN in a N2 message towards the AMF 155 that may include user location information and access technology type information. In an example, the PDU session establishment request message may contain SM PDU DN request container containing information for the PDU session authorization by the external DN. In an example, if the procedure may be triggered for SSC mode 3 operation, the UE 100 may include the old PDU session ID which may indicate the PDU session ID of the on-going PDU session to be released, in the NAS message. The old PDU session ID may be an optional parameter which may be included in this case. In an example, the AMF 155 may receive from the AN the NAS message (e.g., NAS SM message) together with user location information (e.g. cell ID in case of the RAN 105). In an example, the UE 100 may not trigger a PDU session establishment for a PDU session corresponding to a LADN when the UE 100 is outside the area of availability of the LADN.

In an example, the AMF 155 may determine that the NAS message or the SM NAS message may correspond to the request for the new PDU session based on that request type indicates initial request and that the PDU session ID may not be used for any existing PDU session(s) of the UE 100. If the NAS message does not contain an S-NSSAI, the AMF 155 may determine a default S-NSSAI for the requested PDU session either according to the UE 100 subscription, if it may contain only one default S-NSSAI, or based on operator policy. In an example, the AMF 155 may perform SMF 160 selection 1210 and select an SMF 160. If the request type may indicate initial request or the request may be due to handover from EPS, the AMF 155 may store an association of the S-NSSAI, the PDU session ID and a SMF 160 ID. In an example, if the request type is initial request and if the old PDU session ID indicating the existing PDU session may be contained in the message, the AMF 155 may select the SMF 160 and may store an association of the new PDU session ID and the selected SMF 160 ID.

In an example, the AMF 155 may send to the SMF 160, an N11 message 1215, e.g., Nsmf_PDUSession_CreateSM-Context request (comprising: SUPI or PEI, DNN, S-NSSAI, PDU session ID, AMF 155 ID, request type, N1 SM container (PDU session establishment request), user location information, access type, PEI, GPSI), or Nsmf_PDUSession_UpdateSMContext request (SUPI, DNN, S-NSSAI, PDU session ID, AMF 155 ID, request type, N1 SM container (PDU session establishment request), user location information, access type, RAT type, PEI). In an example, if the AMF 155 may not have an association with the SMF 160 for the PDU session ID provided by the UE 100 (e.g. when request type indicates initial request), the AMF 155 may invoke the Nsmf_PDUSession_CreateSMContext request, but if the AMF 155 already has an association with an SMF 160 for the PDU session ID provided by the UE 100 (e.g. when request type indicates existing PDU session), the AMF 155 may invoke the Nsmf_PDUSession_UpdateSMContext request. In an example, the AMF 155 ID may be the UE's GUAMI which uniquely identifies the AMF 155 serving the UE 100. The AMF 155 may forward the PDU session ID together with the N1 SM container containing the PDU session establishment request received from the UE 100. The AMF 155 may provide the PEI instead of the SUPI when the UE 100 has registered for emergency services without providing the SUPI. In case the UE 100 has registered for emergency services but has not been authenticated, the AMF 155 may indicate that the SUPI has not been authenticated.

In an example, if the request type may indicate neither emergency request nor existing emergency PDU session and, if the SMF 160 has not yet registered and subscription data may not be available, the SMF 160 may register with the UDM 140, and may retrieve subscription data 1225 and subscribes to be notified when subscription data may be modified. In an example, if the request type may indicate existing PDU session or existing emergency PDU session, the SMF 160 may determine that the request may be due to handover between 3GPP access and non-3GPP access or due to handover from EPS. The SMF 160 may identify the existing PDU session based on the PDU session ID. The SMF 160 may not create a new SM context but instead may update the existing SM context and may provide the representation of the updated SM context to the AMF 155 in the response. If the request type may be initial request and if the old PDU session ID may be included in Nsmf_PDUSession_CreateSMContext request, the SMF 160 may identify the existing PDU session to be released based on the old PDU session ID.

In an example, the SMF 160 may send to the AMF 155, the N11 message response 1220, e.g., either a PDU session create/update response, Nsmf_PDUSession_CreateSMContext response 1220 (cause, SM context ID or N1 SM container (PDU session reject(cause) or an Nsmf_PDUSession_UpdateSMContext response.

In an example, if the SMF 160 may perform secondary authorization/authentication 1230 during the establishment of the PDU session by a DN-AAA server, the SMF 160 may select a UPF 110 and may trigger a PDU session establishment authentication/authorization.

In an example, if the request type may indicate initial request, the SMF 160 may select an SSC mode for the PDU session. The SMF 160 may select one or more UPFs as needed. In case of PDU type IPV4 or IPV6, the SMF 160 may allocate an IP address/prefix for the PDU session. In case of PDU type IPV6, the SMF 160 may allocate an interface identifier to the UE 100 for the UE 100 to build its link-local address. For Unstructured PDU type the SMF 160 may allocate an IPV6 prefix for the PDU session and N6 point-to-point tunneling (based on UDP/IPV6).

In an example, if dynamic PCC is deployed, the may SMF 160 performs PCF 135 selection 1235. If the request type indicates existing PDU session or existing emergency PDU session, the SMF 160 may use the PCF 135 already selected for the PDU session. If dynamic PCC is not deployed, the SMF 160 may apply local policy.

In an example, the SMF 160 may perform a session management policy establishment procedure 1240 to establish a PDU session with the PCF 135 and may get the default PCC Rules for the PDU session. The GPSI may be included if available at the SMF 160. If the request type in 1215 indicates existing PDU session, the SMF 160 may notify an event previously subscribed by the PCF 135 by a session management policy modification procedure and the PCF 135 may update policy information in the SMF 160. The PCF 135 may provide authorized session-AMBR and the authorized 5QI and ARP to SMF 160. The PCF 135 may subscribe to the IP allocation/release event in the SMF 160 (and may subscribe other events).

In an example, the PCF 135, based on the emergency DNN, may set the ARP of the PCC rules to a value that may be reserved for emergency services.

In an example, if the request type in 1215 indicates initial request, the SMF 160 may select an SSC mode for the PDU session. The SMF 160 may select 1245 one or more UPFs as needed. In case of PDU type IPV4 or IPV6, the SMF 160 may allocate an IP address/prefix for the PDU session. In case of PDU type IPV6, the SMF 160 may allocate an interface identifier to the UE 100 for the UE 100 to build its link-local address. For unstructured PDU type the SMF 160 may allocate an IPV6 prefix for the PDU session and N6 point-to-point tunneling (e.g., based on UDP/IPV6). In an example, for Ethernet PDU type PDU session, neither a MAC nor an IP address may be allocated by the SMF 160 to the UE 100 for this PDU session.

In an example, if the request type in 1215 is existing PDU session, the SMF 160 may maintain the same IP address/prefix that may be allocated to the UE 100 in the source network.

In an example, if the request type in 1215 indicates existing PDU session referring to an existing PDU session moved between 3GPP access and non-3GPP access, the SMF 160 may maintain the SSC mode of the PDU session, e.g., the current PDU session Anchor and IP address. In an example, the SMF 160 may trigger e.g. new intermediate UPF 110 insertion or allocation of a new UPF 110. In an example, if the request type indicates emergency request, the SMF 160 may select 1245 the UPF 110 and may select SSC mode 1.

In an example, the SMF 160 may perform a session management policy modification 1250 procedure to report some event to the PCF 135 that has previously subscribed. If request type is initial request and dynamic PCC is deployed and PDU type is IPV4 or IPV6, the SMF 160 may notify the PCF 135 (that has previously subscribed) with the allocated UE 100 IP address/prefix.

In an example, the PCF 135 may provide updated policies to the SMF 160. The PCF 135 may provide authorized session-AMBR and the authorized 5QI and ARP to the SMF 160.

In an example, if request type indicates initial request, the SMF 160 may initiate an N4 session establishment procedure 1255 with the selected UPF 110. The SMF 160 may initiate an N4 session modification procedure with the selected UPF 110. In an example, the SMF 160 may send an N4 session establishment/modification request 1255 to the UPF 110 and may provide packet detection, enforcement, reporting rules, and/or the like to be installed on the UPF 110 for this PDU session. If CN tunnel info is allocated by the SMF 160, the CN tunnel info may be provided to the UPF 110. If the selective user plane deactivation is required for this PDU session, the SMF 160 may determine the Inactivity Timer and may provide it to the UPF 110. In an example, the UPF 110 may acknowledges by sending an N4 session establishment/modification response 1255. If CN tunnel info is allocated by the UPF, the CN tunnel info may be provided to SMF 160. In an example, if multiple UPFs are selected for the PDU session, the SMF 160 may initiate N4 session establishment/modification procedure 1255 with one or more UPF 110 of the PDU session.

In an example, the SMF 160 may send to the AMF 155 an Namf_Communication_N1N2MessageTransfer 1305 message (comprising PDU session ID, access type, N2 SM information (PDU session ID, QFI(s), QoS profile(s), CN tunnel info, S-NSSAI, session-AMBR, PDU session type, and/or the like), N1 SM container (PDU session establishment accept (QOS Rule(s), selected SSC mode, S-NSSAI, allocated IPv4 address, interface identifier, session-AMBR, selected PDU session type, and/or the like))). In case of multiple UPFs are used for the PDU session, the CN tunnel info may comprise tunnel information related to the UPF 110 that terminates N3. In an example, the N2 SM information may carry information that the AMF 155 may forward to the (R)AN 105 (e.g., the CN tunnel info corresponding to the core network address of the N3 tunnel corresponding to the PDU session, one or multiple QoS profiles and the corresponding QFIs may be provided to the (R)AN 105, the PDU session ID may be used by AN signaling with the UE 100 to indicate to the UE 100 the association between AN resources and a PDU session for the UE100, and/or the like). In an example, a PDU session may be associated to an S-NSSAI and a DNN. In an example, the N1 SM container may contain the PDU session establishment accept that the AMF 155 may provide to the UE 100. In an example, multiple QoS rules and QoS profiles may be included in the PDU session establishment accept within the N1 SM and in the N2 SM information. In an example, the Namf_Communication_N1N2MessageTransfer 1305 may further comprise the PDU session ID and information allowing the AMF 155 to know which access towards the UE 100 to use.

In an example, the AMF 155 may send to the (R)AN105 an N2 PDU session request 1310 (comprising N2 SM information, NAS message (PDU session ID, N1 SM container (PDU session establishment accept, and/or the like). In an example, the AMF 155 may send the NAS message 1310 that may comprise PDU session ID and PDU session establishment accept targeted to the UE 100 and the N2 SM information received from the SMF 160 within the N2 PDU session request 1310 to the (R)AN 105.

In an example, the (R)AN 105 may issue AN specific signaling exchange 1315 with the UE 100 that may be related with the information received from SMF 160. In an example, in case of a 3GPP RAN 105, an RRC connection reconfiguration procedure may take place with the UE 100 to establish the necessary RAN 105 resources related to the QOS Rules for the PDU session request 1310. In an example, (R)AN 105 may allocate (R)AN 105 N3 tunnel information for the PDU session. In case of dual connectivity, the master RAN 105 node may assign some (zero or more) QFIs to be setup to a master RAN 105 node and others to the secondary RAN 105 node. The AN tunnel info may comprise a tunnel endpoint for one or more involved RAN 105 nodes, and the QFIs assigned to one or more tunnel endpoints. A QFI may be assigned to either the master RAN 105 node or the secondary RAN 105 node. In an example, (R)AN 105 may forward the NAS message 1310 (PDU session ID, N1 SM container (PDU session establishment accept) to the UE 100. The (R)AN 105 may provide the NAS message to the UE 100 if the necessary RAN 105 resources are established and the allocation of (R)AN 105 tunnel information are successful.

In an example, the N2 PDU session response 1320 may comprise a PDU session ID, cause, N2 SM information (PDU session ID, AN tunnel info, list of accepted/rejected QFI(s)), and/or the like. In an example, the AN tunnel info may correspond to the access network address of the N3 tunnel corresponding to the PDU session.

In an example, the AMF 155 may forward the N2 SM information received from (R)AN 105 to the SMF 160 via a Nsmf_PDUSession_UpdateSMContext request 1330 (comprising: N2 SM information, request type, and/or the like). In an example, if the list of rejected QFI(s) is included in N2 SM information, the SMF 160 may release the rejected QFI(s) associated QoS profiles.

In an example, the SMF 160 may initiate an N4 session modification procedure 1335 with the UPF110. The SMF 160 may provide AN tunnel info to the UPF 110 as well as the corresponding forwarding rules. In an example, the UPF 110 may provide an N4 session modification response 1335 to the SMF 160160.

In an example, the SMF 160 may send to the AMF 155 an Nsmf_PDUSession_UpdateSMContext response 1340 (Cause). In an example, the SMF 160 may subscribe to the UE 100 mobility event notification from the AMF 155 (e.g. location reporting, UE 100 moving into or out of area of interest), after this step by invoking Namf_EventExposure_Subscribe service operation. For LADN, the SMF 160 may subscribe to the UE 100 moving into or out of LADN service area event notification by providing the LADN DNN as an indicator for the area of interest. The AMF 155 may forward relevant events subscribed by the SMF 160.

In an example, the SMF 160 may send to the AMF 155, a Nsmf_PDUSession_SMContextStatusNotify (release) 1345. In an example, if during the procedure, any time the PDU session establishment is not successful, the SMF 160 may inform the AMF 155 by invoking Nsmf_PDUSession_SMContextStatusNotify(release) 1345. The SMF 160 may releases any N4 session(s) created, any PDU session address if allocated (e.g. IP address) and may release the association with the PCF 135.

In an example, in case of PDU type IPV6, the SMF 160 may generate an IPV6 Router Advertisement 1350 and may send it to the UE 100 via N4 and the UPF 110.

In an example, if the PDU session may not be established, the SMF 160 may unsubscribe 1360 to the modifications of session management subscription data for the corresponding (SUPI, DNN, S-NSSAI), using Nudm_SDM_Unsubscribe (SUPI, DNN, S-NSSAI), if the SMF 160 is no more handling a PDU session of the UE 100 for this (DNN, S-NSSAI). In an example, if the PDU session may not be established, the SMF 160 may deregister 1360 for the given PDU session using Nudm_UECM_Deregistration (SUPI, DNN, PDU session ID).

Figure 14:
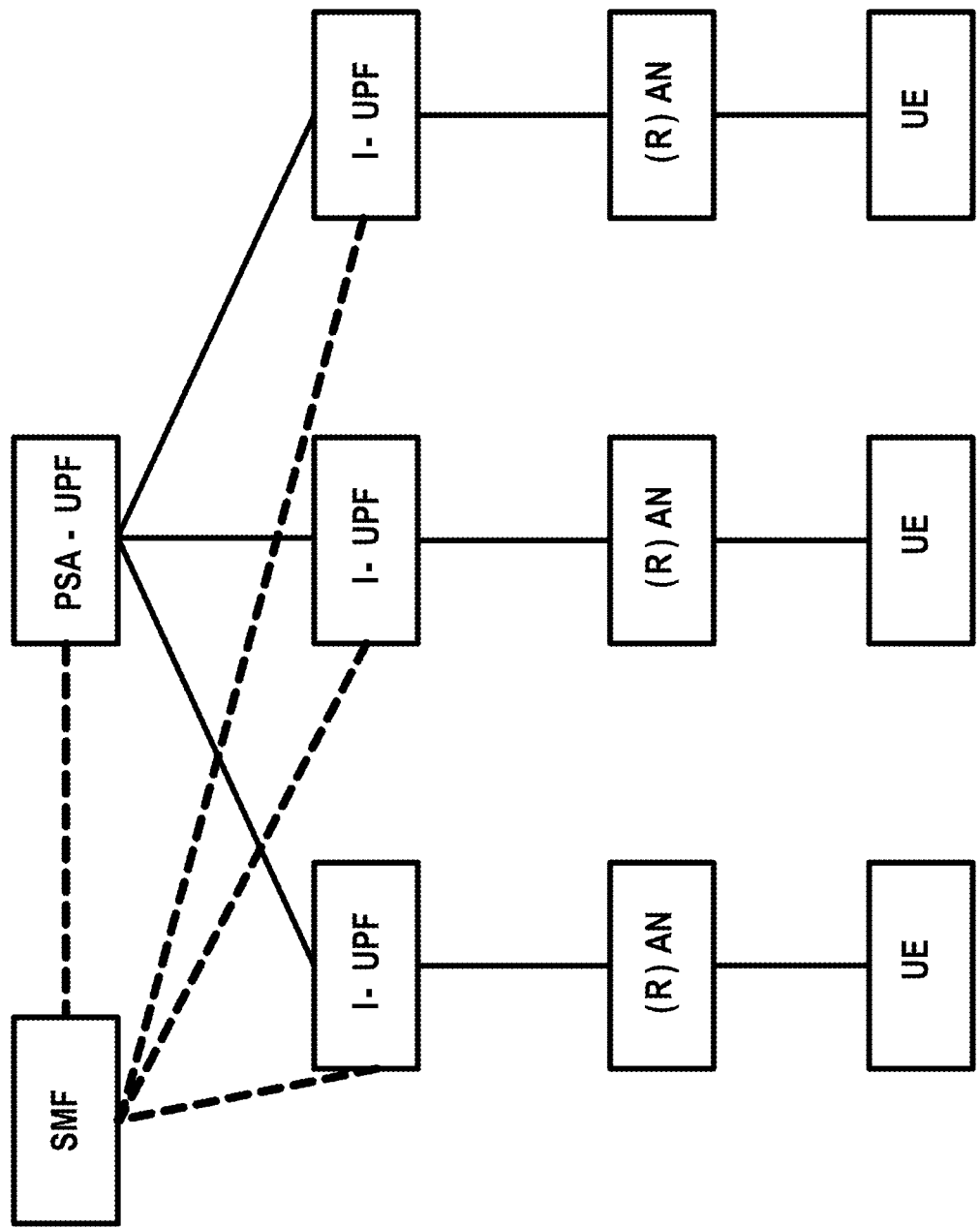
FIG. 14 is an example diagram as per an aspect of an embodiment of the present disclosure.

In an example, a wireless communication system (e.g., 5GS, 3GPP system, 3GPP communication system, 4G, LTE, and/or the like) may support 5G LAN communication. A 5GLAN group communication session may be identified by a tuple of S-NSSAI and DNN. In case of supporting VLAN tags for 5G LAN communications, the 5G LAN group communication session may be identified by a tuple of S-NSSAI, DNN and VLAN Tag. In an example, the 5G LAN group, 5G LAN group communication session, and/or the like may be identified by an identifier of a group (e.g., a group id, internal group id, external group id, a group index, group information, and/or the like). In an example, a PDU session, a PDU session establishment, and/or the like may be employed for the 5G LAN group communication session. The PDU session establishment may be for the tuple of S-NSSAI, DNN, a group id, and/or the like. In an example, area restriction of the 5G LAN service may be done by configuring a DNN as the LADN DNN with LADN service area (e.g., a list of tracking areas, and/or the like). In an example, a UE may connect to a virtual network that may connect one or more UEs within the group as depicted in example FIG. 14. As depicted in Example FIG. 14, same SMF is employed for the group communication session. In an example, a data network may be employed for group communication. In an example, a PDU session anchor UPF (PSA-UPF) may be employed to transmission/sending/receiving/forwarding of 5G LAN communication packets. The PSA-UPF may enforce group AMBR, group quota, individual UE's AMBR or QoS enforcement, and/or the like. The PSA-UPF may be functionally/logically/physically collocated with an intermediate UPF (I-UPF). The SMF may manage/check/determine one or more established and/or activated PDU sessions.

In an example as depicted in FIG. 15, an admin user (e.g., administrator, a UE which belongs to a 5GLAN admin group, and/or the like) may request addition/deletion of a 5GLAN user group and add (or delete) a member to the 5GLAN user group. A UE may belong to one or more groups and the subscription data for the UE in a UDR may associate the subscriber with groups. In an example, an internal group identifier in the UDR may identify a group. A group management may be a management functionality on manipulating the UDR records. For example, creating a group with list of group members may be implemented as creating a record of group subscription data. In an example, addition, adding or deleting a member in the group may be defined as adding or deleting a SUPI in the group subscription data. A domain may be a logical administrative area within which a member of the admin group may manage the user groups and their membership. A domain may be employed to refer a tenant (e.g., a customer of 5G LAN service provided by an operator). A domain may comprise a domain identifier, an admin group identifier, one or more group identifiers, and/or the like.

An example FIG. 15, depicts the relationship of domain, admin group and user group for 5G LAN group. A domain may comprise an admin group and one or more user groups. A user in the admin group may manage the user group and membership of the admin/user group in the domain and manage (e.g., provision, activate, deactivate, and/or the like) the 5GLAN communication session. A user may belong to one or more groups (e.g., a user 2 may be a member of admin group, a member of user group A.1 and a member of user group A.2 as depicted in example FIG. 15.

Figure 16:
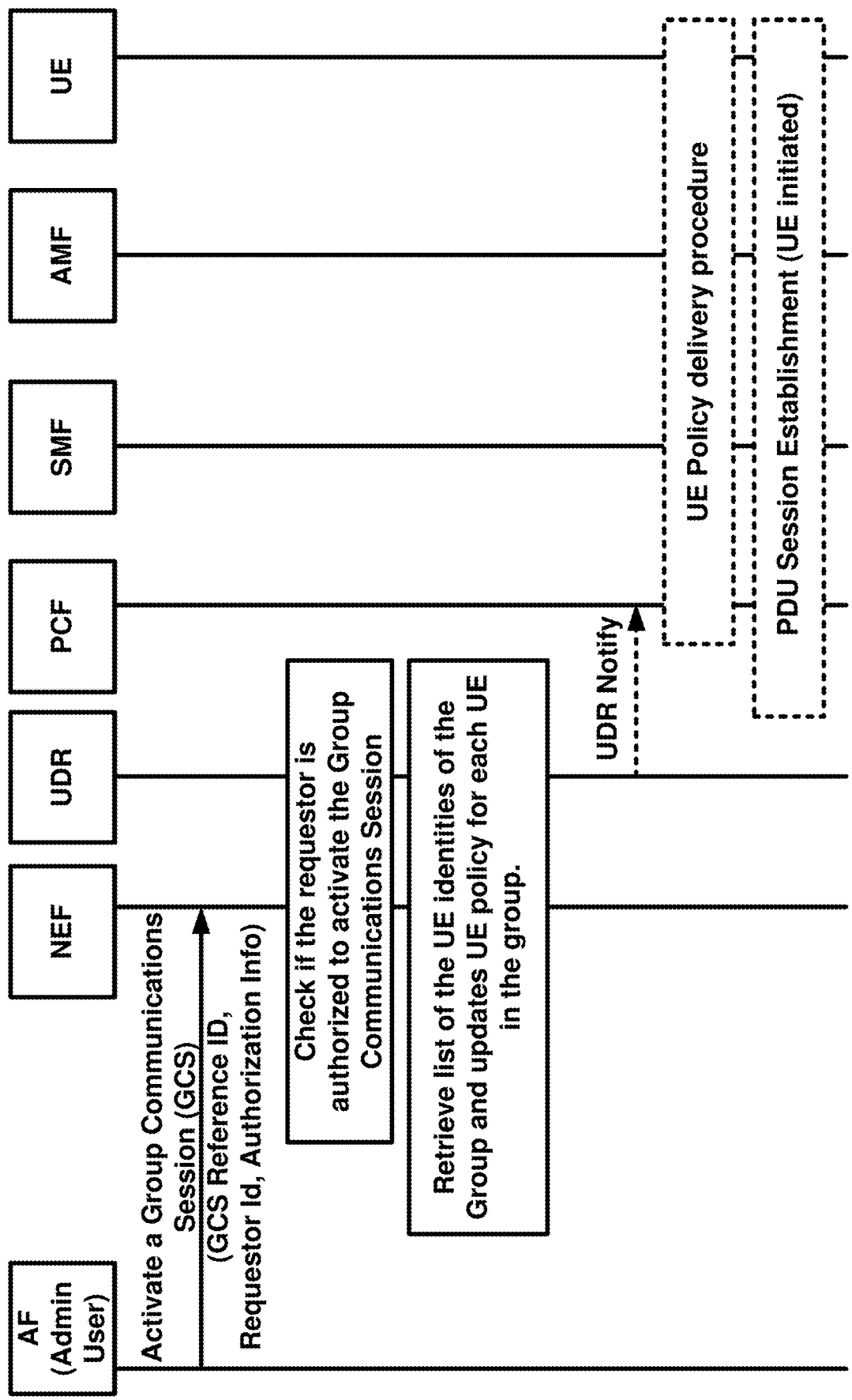
FIG. 16 is an example call flow as per an aspect of an embodiment of the present disclosure.

In an example embodiment as depicted in FIG. 16, an AF (e.g., an admin subscriber, and/or the like) may request an NEF to activate a group communication session. The request may comprise a UE identifier of the requestor, a requestor id, and/or the like with an authorization information. The NEF may check if the requestor is authorized to activate the group communication session. The NEF may retrieve a list of the UE identifiers of the group and may update the UE policy for one or more UE(s) in the group. A UDR may notify a PCF for updating the policy data since the PCF subscribed the UDR on the change of the policy data. The PCF may initiate a UE policy delivery procedure e.g., delivery of a UE route selection policy (URSP). In order for the UE to establish the PDU session after the UE policy is delivered, the URSP may comprise a policy enforcement parameter that may indicate a request for establishment of the PDU session. The UE may receive the UE policy and if the UE policy includes the establishment request of the PDU session, the UE may perform a PDU session establishment procedure with the configured parameters as encoded as route selection components in the URSP rules.

Figure 17:
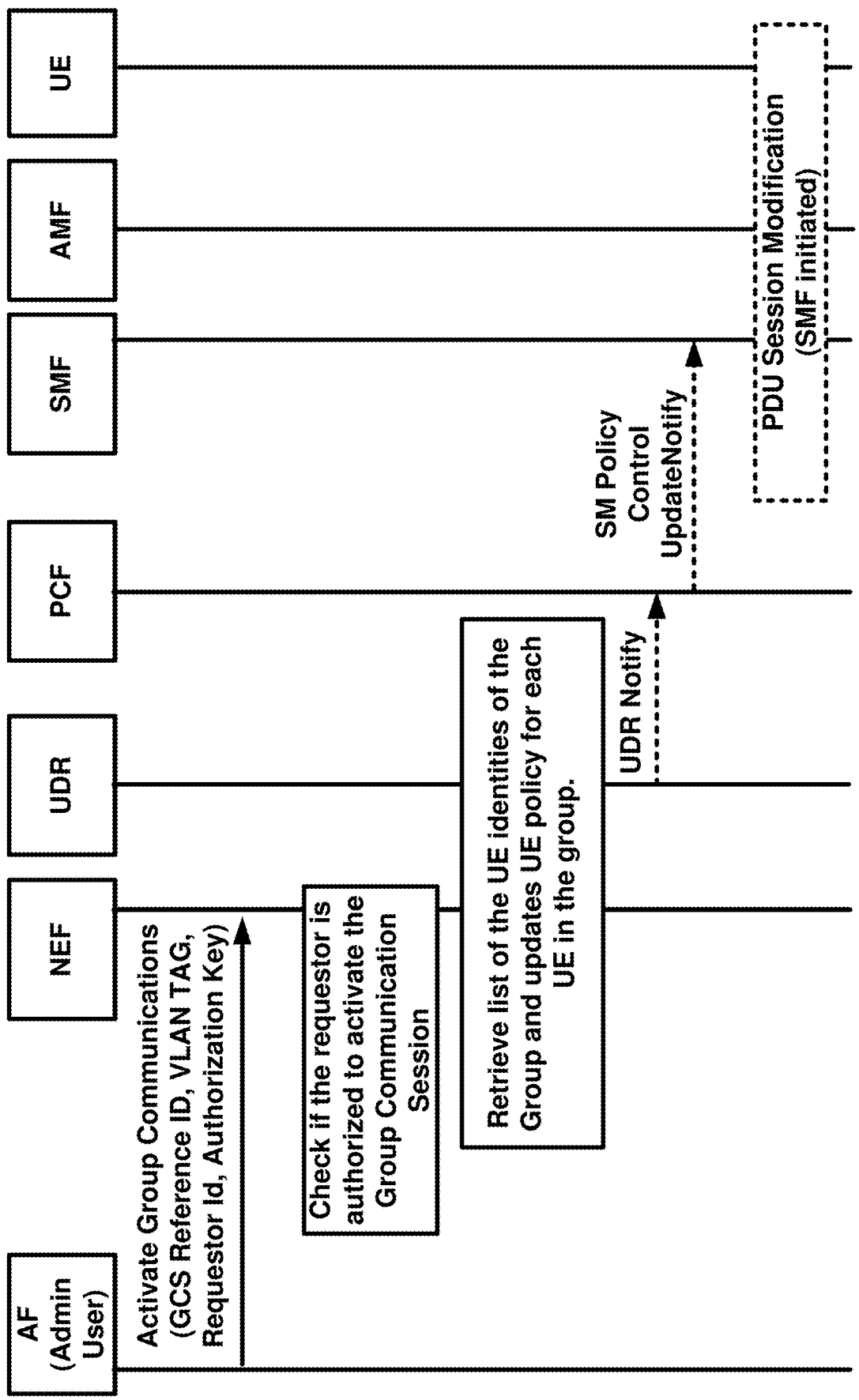
FIG. 17 is an example call flow as per an aspect of an embodiment of the present disclosure.

In an example embodiment as depicted in FIG. 17, the AF (e.g., admin user) may request the NEF to activate a group communication. The procedure may be based on a PDU session modification procedure. The request may comprise the UE identifier of the requestor with the authorization information. The NEF may check if the requestor is authorized to activate the group communication session. The NEF may retrieve the list of the UE identifiers of the group and may update the UE policy for one or more UE(s) in the group. The UDR may notify the PCF for updating the policy data since the PCF subscribed the UDR on the change of the policy data. The PCF may perform the SM policy control update notification procedure to deliver the update policy information for the established session for example, the addition of a VLAG TAG, and/or the like. The SMF may initiate the PDU session modification procedure to send the VLAN TAG, and/or the like to the UE.

Figure 25:
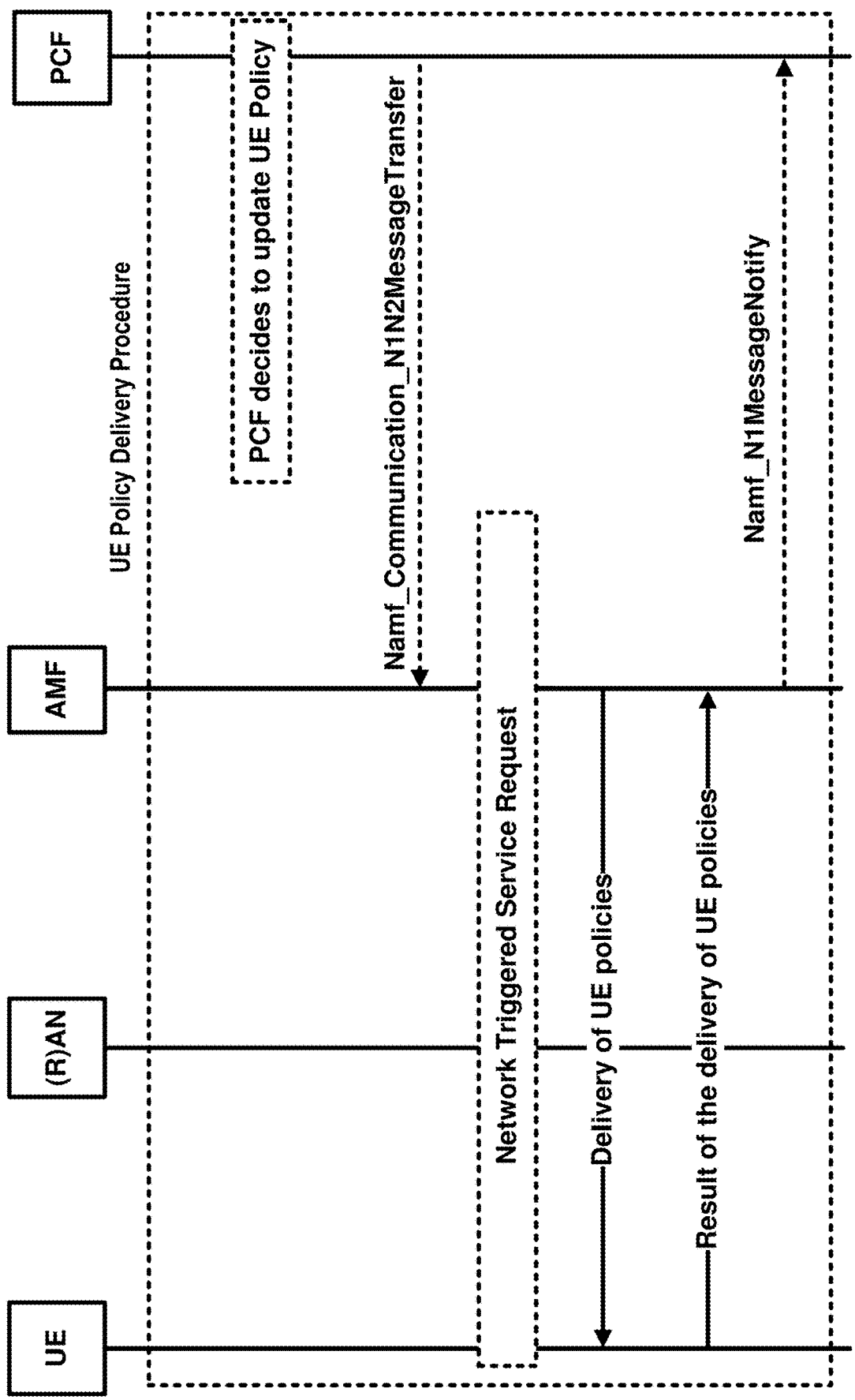
FIG. 25 is an example diagram as per an aspect of an embodiment of the present disclosure.

In an example, as depicted in FIG. 25, a policy delivery procedure may be employed. The policy delivery procedure may be employed to transmit the URSP to the UE. In an example the PCF may determine to update UE policy procedures based on triggering conditions such as an initial registration, need for updating UE policy, and/or the like. In an example, for initial registration case, the PCF may compare the list of PSIs included in the UE access selection and PDU session selection related policy information in Npcf_UEPolicyControl_Create request and may determine whether UE access selection and PDU session selection related policy information have to be updated and be included in the response to the AMF. In an example, for the network triggered UE policy update case (e.g. the change of UE location, the change of Subscribed S-NSSAIs, activation of a group, and/or the like), the PCF may check the latest list of PSIs to decide which UE access selection and/or PDU Session selection related policies have to be sent to the UE. The PCF may check if the size of the resulting UE access selection and PDU Session selection related policy information exceeds a predefined limit. If the size is under the limit, then UE access selection and PDU Session selection related policy information may be included in a single Namf_Communication_N1N2MessageTransfer service operation. If the size exceeds the predefined limit, the PCF may split the UE access selection and PDU Session selection related policy information in smaller, logically independent UE access selection and PDU Session selection related policy information ensuring the size of each is under the predefined limit. One or more UE access selection and PDU Session selection related policy information may be sent in one or more Namf_Communication_N1N2MessageTransfer service operations.

In an example, the PCF may invoke Namf_Communication_N1N2MessageTransfer service operation provided by the AMF. The message may comprise a SUPI, UE Policy Container, and/or the like. If the UE is registered and reachable by AMF in either 3GPP access or non-3GPP access, the AMF may transfer transparently the UE policy container to the UE via the registered and reachable access. If the UE is registered in both 3GPP and non-3GPP accesses and reachable on both access and served by the same AMF, the AMF may transfer transparently the UE Policy container to the UE via one of the accesses based on the AMF local policy. If the UE is not reachable by AMF over both 3GPP access and non-3GPP access, the AMF may report to the PCF that the UE Policy container may not be delivered to the UE using Namf_Communication_N1N2TransferFailureNotification.

If AMF determines/decides to transfer transparently the UE Policy container to the UE via 3GPP access, e.g. the UE is registered and reachable by AMF in 3GPP access only, or if the UE is registered and reachable by AMF in both 3GPP and non-3GPP accesses served by the same AMF and the AMF decides/determines to transfer transparently the UE Policy container to the UE via 3GPP access based on local policy, and the UE is in CM-IDLE and reachable by AMF in 3GPP access, the AMF may start a paging procedure by sending a paging message to the UE. Upon reception of paging request, the UE may initiate the UE triggered service request procedure. If the UE is in CM-CONNECTED over 3GPP access or non-3GPP access, the AMF may send/transfer transparently the UE Policy container (e.g., UE access selection and PDU Session selection related policy information) received from the PCF to the UE. The UE Policy container may comprise URSP, and/or the like. The UE may update the UE policy provided by the PCF and may send the result to the AMF. If the AMF received the UE Policy container and the PCF subscribed to be notified of the reception of the UE Policy container, the AMF may forward the response of the UE to the PCF employing a Namf_N1MessageNotify, and/or the like. The PCF may maintain the list of PSIs delivered to the UE and may update the latest list of PSIs in the UDR by invoking Nudr_DM_Update (e.g., comprising SUPI, Policy Data, Policy Set Entry, updated PSI data) service operation, and/or the like.

A 5GLAN Group may be managed (e.g., created, modified, and removed) based on AF request or UE request. A UE that belongs to the 5GLAN Group may access the 5G LAN-type service corresponding to the 5GLAN Group.

The UE may access the 5G LAN-type service by establishing a PDU session. During establishment of the PDU Session, the UE may be authenticated/authorized for accessing the 5G LAN-type service. The 5G LAN-type service may support 5GLAN communication within the 5GLAN group by coordinating PDU sessions of the UEs, e.g., traffic routing between PDU sessions may take place within the 5GS.

The 5GS may support the 5G LAN-type service by establishing a user plane composed of one UPF or multiple interconnected UPFs. When the UEs within the 5GLAN group communicate with a physical LAN in the DN for one or more data services, an Ethernet transport service may be associated with the DN and may support connecting the UEs to the physical LAN in the DN.

The user plane of a 5G LAN-type service may comprise an access UP and a backbone UP. The access UP may comprise the UP path of a PDU Session, of which UP paths terminates at an anchor UPF (e.g., not to a DN). The backbone UP may comprise one anchor UPF or multiple anchor UPFs with one or multiple connections (e.g., Nx connections, tunnels, and/or the like) which may bridge the UP paths in the access UP with each other. The Nx connections in the backbone UP may be managed by the 5GC. Traffic routing over Nx in the backbone UP may be configured at the 5G LAN-type service level. The UPF(s) in the backbone UP may function as a router or a switch (Ethernet switch) and may treat the user plane path of the PDU session as the cable connecting the UE to one port/interface on the router or switch.

In an example, depending on implement and operator's configuration, the backbone UP (e.g., comprising UPFs and Nx connections in between) may be pre-established before the UE requests PDU session for access to the 5G LAN-type service and updated/modified afterward. The Nx connections in the backbone UP may support IP traffic and/or Ethernet traffic and may be managed by the 5GC. An Nx connection may belong to a PDU session. The connection may be a per 5GLAN Group connection, shared by multiple PDU Sessions for support of traffic routing between those Sessions. Private communication (of 5G LAN-type service) is achieved by shared anchor UPF or by interconnecting two anchor UPFs via an Nx interface. The combination of two anchor UPFs and the Nx interface in between may be an Nx connection. One or more Nx connections may be further interconnected for the private communication in the same 5GLAN group (e.g., depending how many group member UEs are involved).

Figure 26:
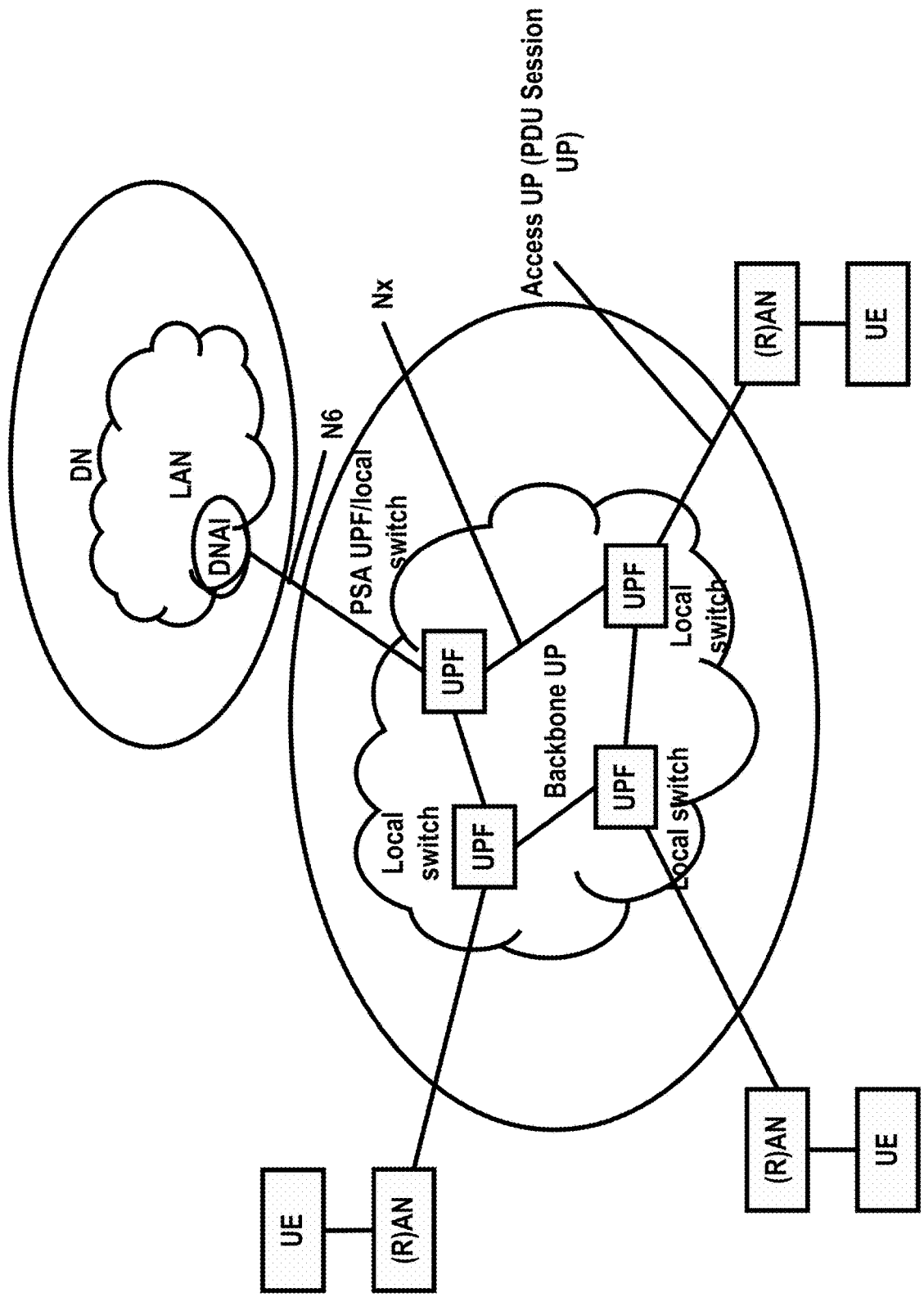
FIG. 26 is an example call flow as per an aspect of an embodiment of the present disclosure.
Figure 27:
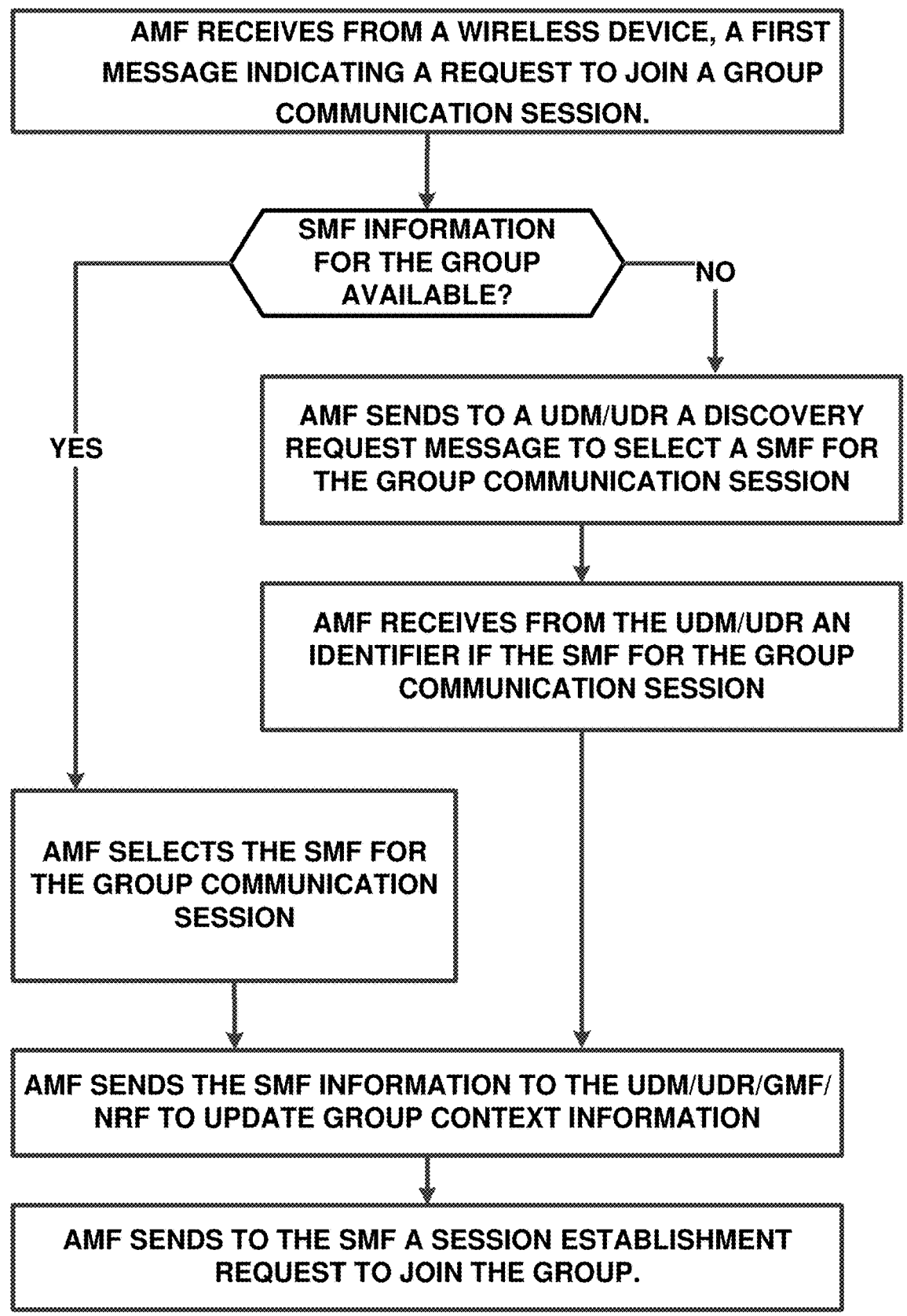
FIG. 27 is an example call flow as per an aspect of an embodiment of the present disclosure.
Figure 28:
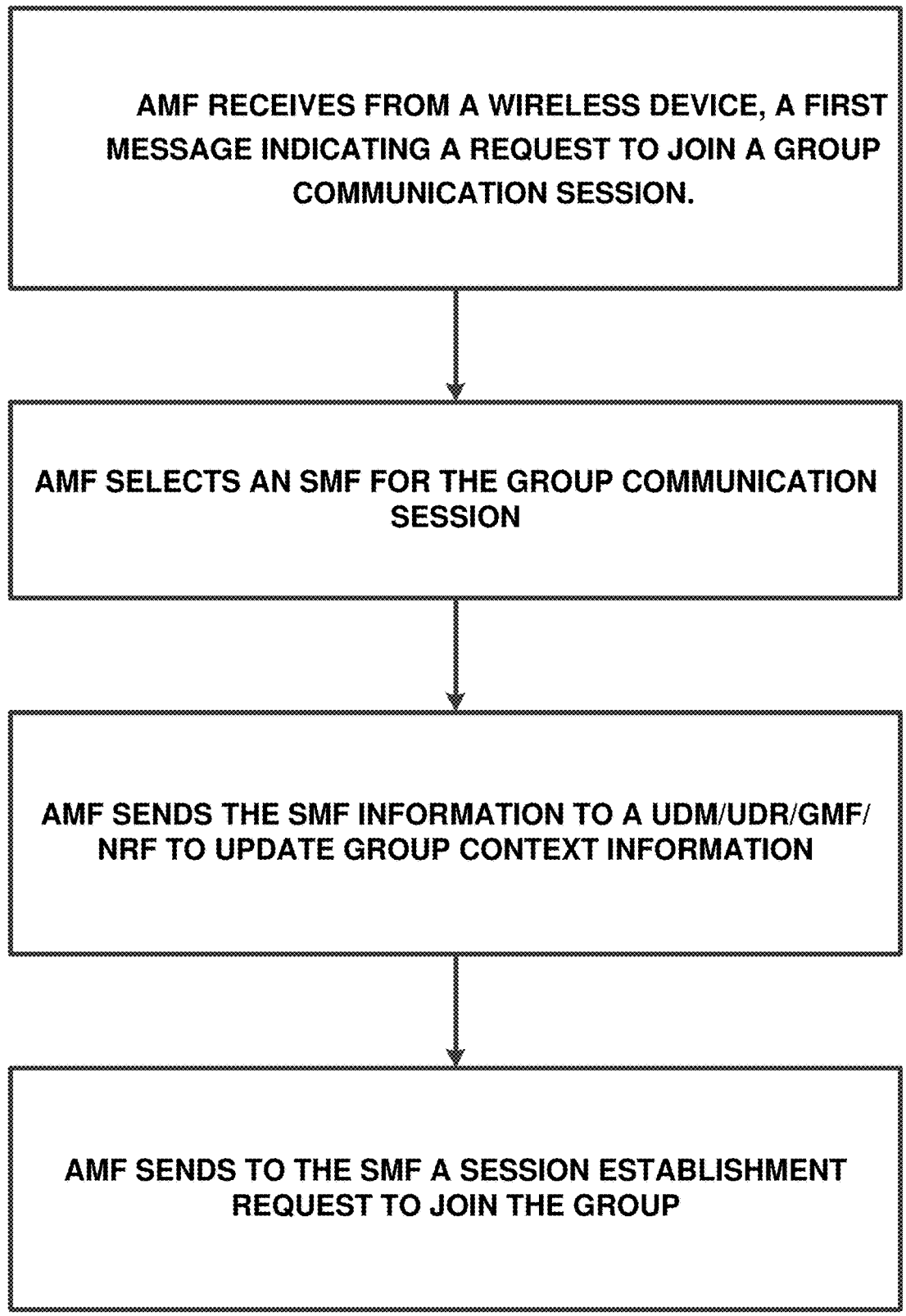
FIG. 28 is an example call flow as per an aspect of an embodiment of the present disclosure.

The access UP and the backbone UP may intersect at UPFs, which may be PSA UPFs from the access part point of view and BUAP (Backbone UP Access Point) UPFs from the backbone part point of view. Example FIG. 26 depicts the user plane architecture of 5GLAN communication framework.

In an example, an authorized entity, e.g., a UE or an AF, may interact with a GMF, UDM, UDR, NRF, and/or the like to manage a 5GLAN group. This may include to create, modify or remove a 5GLAN group, or to query information related to a 5GLAN group, for example, information such as IP address of a member UE in the 5GLAN group. In an example, when a UE interacts with the GMF, UDM, UDR, NRF, and/or the like, the UE may send a request for 5GLAN group management to the GMF, UDM, UDR, NRF, and/or the like, via the AMF, and the UE request may be authorized by the GMF according to subscription information, e.g. whether the UE is authorized to create a 5GLAN group. In an example, when an AF interacts with the GMF, the AF may send a request for 5GLAN group management to the GMF directly or via the NEF, depending on whether operator allows the AF to access the network directly. When the NEF is involved, the NEF may authorize the AF request if the AF request is not yet authorized. The request may comprise GPSI if the requesting entity is a UE, or AF-service-ID if the requesting entity is an AF, and 5G LAN-VN DNN. Depending on the management purpose, the request may further comprise type of traffic (e.g. IP type or Ethernet type) to be supported during 5GLAN communication, metadata of the 5GLAN group (e.g. describing the purpose of the 5GLAN group), identity information (e.g. GPSIs of the UEs to be added in or removed from the 5GLAN group), service restrictions (e.g., allowed area), information identifying the 5GLAN group (e.g., in the form of Internal group ID or External group ID), the types of information (e.g., information of member UEs) being queried, and/or the like. The GMF may validate the information provided by the entity, e.g., whether a member UE identified in the information is allowed to access the 5G LAN-type service, and manages the 5GLAN group according to the information. As a result of the 5GLAN group management operations, the context of the 5GLAN group is created, modified, or removed in the GMF, UDM, UDR, and/or the like or information being queried by the entity is identified from local storage of the GMF, UDM, UDR, and/or the like and sent back to the requesting entity. The GMF may update the 5GLAN group membership information to the UDM. The GMF may provide policy requirements (e.g., service restrictions) to the PCF. When creating a 5GLAN group, the GMF may allocate an ID to the 5GLAN group and may include the 5GLAN group ID in the response sent to the requesting entity. When a UE is added into the 5GLAN group, the GMF may allocate group credential for the UE, which is to be provided by the UE to the network as authentication and authorization information for accessing 5G LAN-type service for the 5GLAN group.

In an example, the wireless communication system, e.g., the 3GPP system, 5GS, 4G, LTE, and/or the like may be employed for group communication, UE to UE communication session, one UE to/from one or more UE(s) communication session(s), and/or the like. The group communication session may employ one or more AMFs, one or more UPF(s), and/or the like. The group communication session may employ a SMF. The SMF may be a common SMF for the PDU sessions of the group communication session. Based on the existing technologies, when UEs request to join a group communication session, or a group, the AMF may select more than one SMF or different SMF(s) for one or more UEs. Selection of different SMFs may result in a failure or inefficient usage of network resources, and may cause inefficient usage of resources and delay in establishment, management, and/or the like of the group communication. The present disclosure provides enhancements to support a group communication session to provide/select a common SMF for the group to enhance the performance of the system. An association between a group information/identification and a common SMF is established in a group context information. The group context may be stored in a GMF, UDM, UDR, NRF, and/or the like. The AMF may retrieve the SMF information for the group from the GMF, UDM, UDR, NRF, and/or the like.

Figure 18:
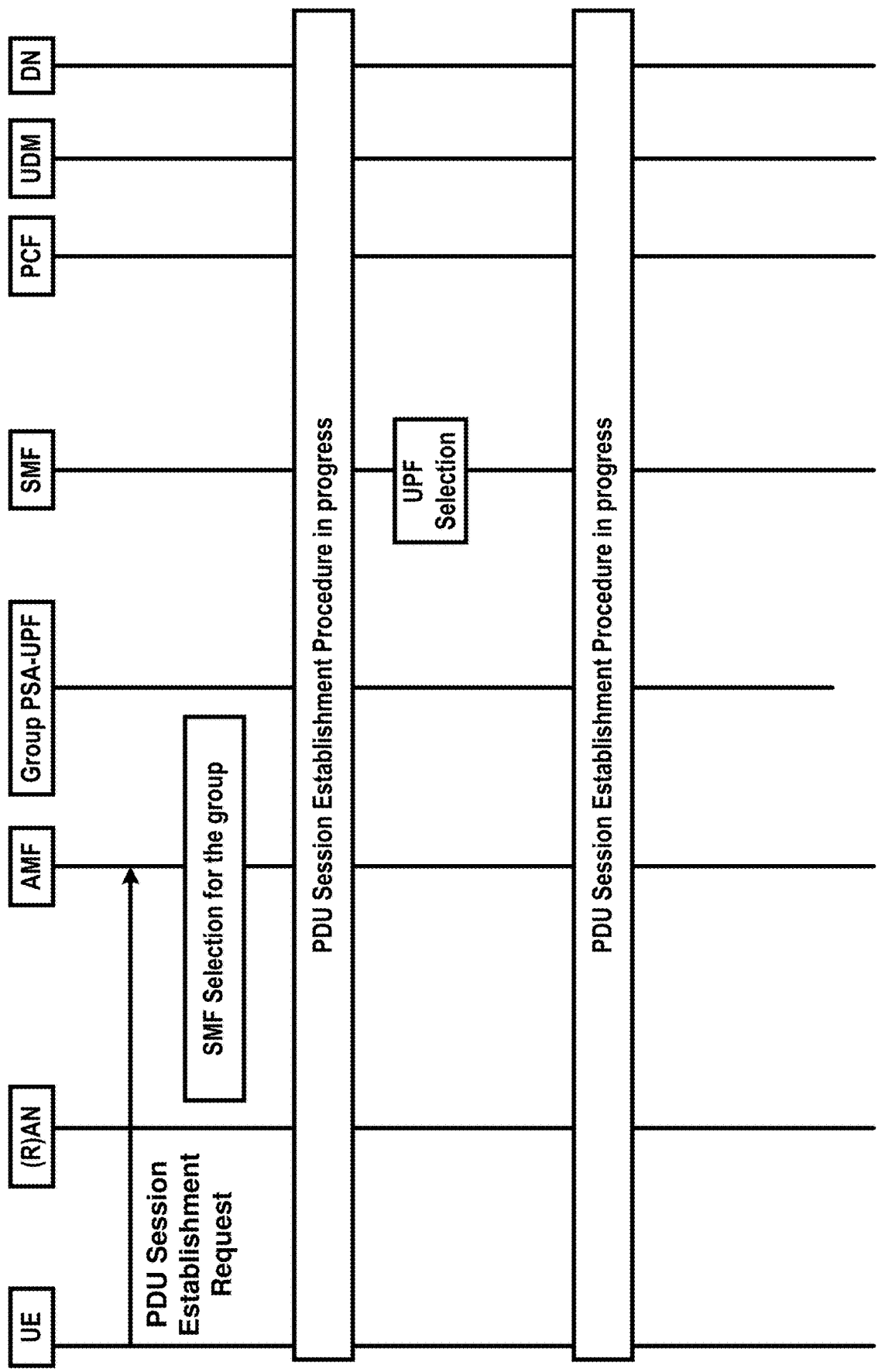
FIG. 18 is an example call flow as per an aspect of an embodiment of the present disclosure.
Figure 19:
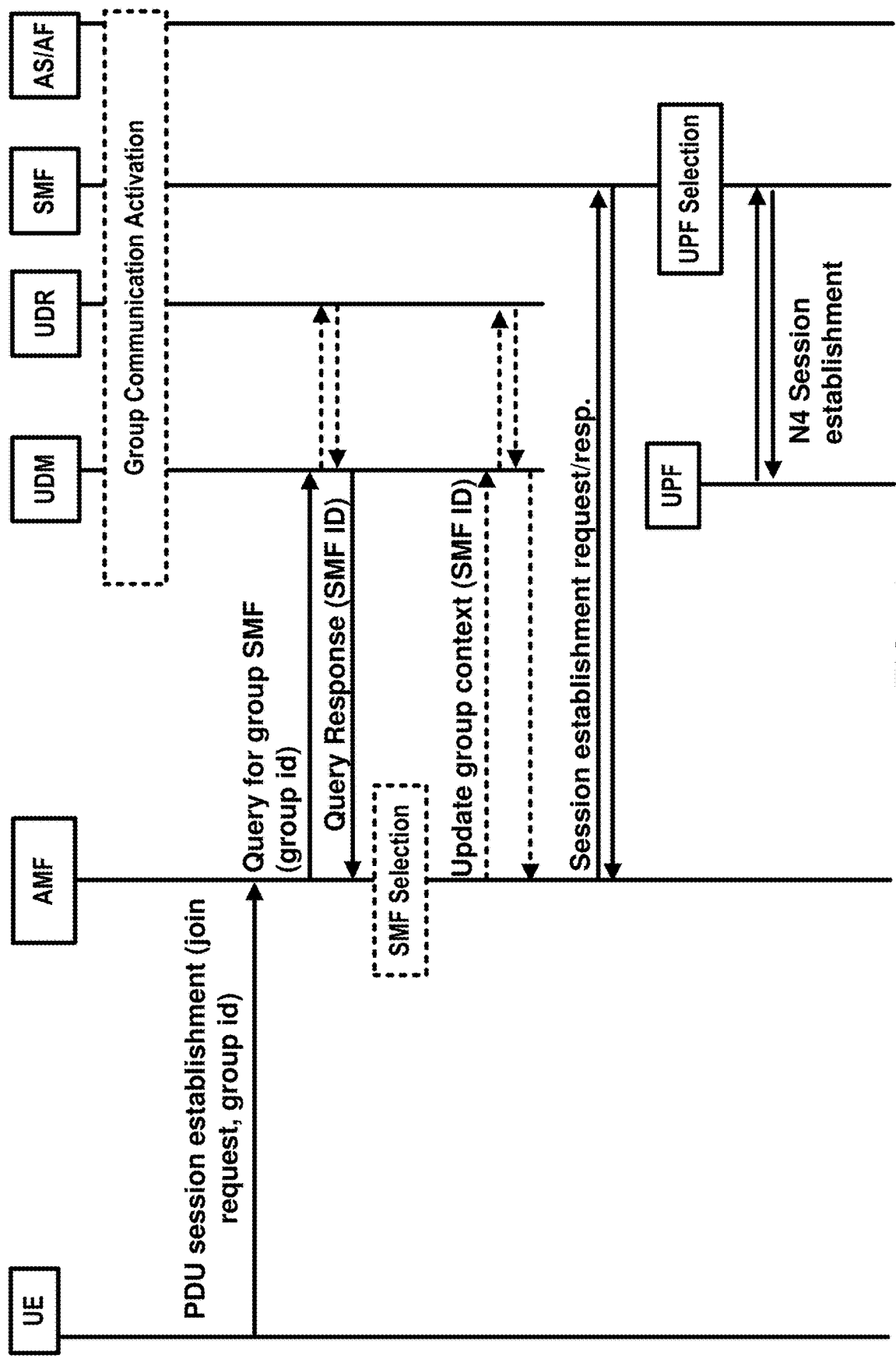
FIG. 19 is an example call flow as per an aspect of an embodiment of the present disclosure.

In an example embodiment as depicted in FIG. 18 and FIG. 19, one or more UE(s) may send a request to establish a PDU session to join a group. The request may be a joining procedure to an activated group communication session (as depicted in FIG. 16 and FIG. 17) employing the PDU session establishment procedure as depicted in FIG. 12, FIG. 13, FIG. 18, FIG. 19, FIG. 20, FIG. 21.

As depicted in example FIG. 18 and FIG. 19, the UE may initiate the PDU session establishment procedure to join the group communication session with the group session identification information (e.g. comprising an identifier of the group, group id, group index, a tuple of S-NSSAI, and DNN, and/or the like). The AMF may select a SMF using the group session identification information, group communication identification information, and/or the like. The SMF may retrieve the policy information of the group communication session that may comprise the group AMBR and group quota information. The SMF may select a group PSA-UPF and may provide the group policy data to the UPF. The SMF may add an I-UPF to connect the (R)AN and the Group PSA-UPF if the (R)AN is not able to connect the N3 tunnel directly to the PSA-UPF based on the topology. In an example, the SMF may send a VLAN-TAG to the UE.

In an example, the AMF may select the SMF based on the group session identification information, group information, and/or the like. In an example, the AMF may retrieve a SMF associated with the group session identification information from a UDM, UDR, a group management function (GMF), NRF, and/or the like. The SMF associated with the group may be retrieved from a group context information stored in a repository network element, the UDM, UDR, GMF, NRF, and/or the like. An example group context information is depicted in FIG. 22. The group context may comprise identification information of the group, a description of the group, traffic type supported by the group, an address of the group, SMF information of the group, UPF information of the group determining one or more UPF(s) that may employed for the group communication session, service restrictions, information of member UE(s) of the group, and/or the like.

In an example, an access and mobility management function (AMF) may receive from a wireless device (the UE), a first message indicating a request to join a group communication session. The first message may comprise an identifier of a group, an identifier of the group communication session, an identifier of the wireless device, and/or the like. The identifier or the group/group communication session may comprise an identifier of a VLAN associated with the group (e.g., VLAN ID, port id of the UE associated with the VLAN, and/or the like). In an example, the first message may be a PDU session establishment request. In an example, the AMF may receive from the UE, the PDU session establishment request indicating a request to join the group, the group communication session, and/or the like. The AMF may check/determine whether a SMF associated with the group (e.g., the group communication session, and/or the like) is available. The AMF may send a query request to the UDM, UDR, NRF, GMF, and/or the like to discover/select the SMF associated with the group. In an example, the AMF may select the SMF based on a S-NSSAI, DNN, GPSI, location information, group information, VLAN ID, group id, internal/external group id, a tuple of port id, and VLAN ID, and/or the like. The AMF may update the group context information. The AMF may update group context information by adding an association to the SMF for the group with one or more group information, group identification, and/or the like.

In an example, the first message may be the PDU session establishment request message. The first message may comprise a NAS Message (S-NSSAI(s), DNN, PDU Session ID, Request type, Old PDU Session ID, N1 SM container (PDU Session Establishment Request), and/or the like). In order to establish a PDU Session, the UE may generate a new PDU Session ID. The UE may initiate the UE requested PDU session establishment procedure by the transmission of a NAS message. The NAS message may comprise a PDU session establishment request within an N1 SM container. The PDU session establishment request may comprise a PDU session ID, requested PDU session type, a requested SSC mode, 5GSM Capability PCO, SM PDU DN Request Container, Number Of Packet Filters, and/or the like.

In an example, the PDU session type may be Ethernet, IP, IPV4, IPV6, non-IP, unstructured, and/or the like. In an example the PDU session may be established for the Ethernet VLAN group of one or more UEs. The PDU session type for the group communication session may be Ethernet, IP, and/or the like.

In an example, the AMF may receive the first message, the PDU session establishment request message, and/or the like from the UE. The AMF may send a query request, discovery request, and/or the like to the UDM. The query request, discovery request, and/or the like may comprise an indication that selection/discovery of a SMF for the group is required, the identifier of the group, group information, VLAN ID, and/or the like. The AMF may employ a Nudm_SDM_Get service operation, and/or the like to send the query request to the UDM. The Nudm_SDM_Get service operation may comprise a Nudm_SDM_Get message, Nudm_SDM_subscribe message, Nudm_SDM_notification message, Nudm_SDM_info message, and/or the like. The AMF may employ the Nudm_SDM_Get service operation to get a subscriber data, group subscription data, and/or the like indicated by the subscription data type input from the UDM. The UDM may check if the requested consumer is authorized to get the specific subscription data requested. In an example, the query request may comprise the group information, group id, type of request indicating that the SMF id for the group is required, an identifier of the AMF, subscription data type(s), key for one or more subscription data type(s), data sub key(s), and/or the like. In an example, the UDM may send a query response message comprising the requested subscription data, e.g., SMF id for the group, SMF address for the group, S-NSSAI associated with the group, DNN associated with the group, and/or the like. The AMF may employ the received information from the UDM to select the SMF. The AMF may receive the SMF id for the group from the UDM.

In an example, the AMF may select the SMF if the SMF id for the group is not available locally, via UDM, UDR, GMF, and/or the like. In an example, the AMF may be configured with the NRF to be used to select NFs/services within the corresponding network slice instance based on configuration or based on the Network Slice selection information received during the registration procedure. In an example, the AMF may not be configured with the NRF to be used to select NFs/services within the corresponding Network Slice instance. The AMF may invoke a Nnssf_NS-Selection_Get service operation from a NSSF in serving PLMN with the S-NSSAI from the allowed NSSAI requested by the UE, PLMN ID of the SUPI, TAI of the UE and the indication that the request is within a procedure of PDU session establishment. The NSSF in serving PLMN may select the network slice instance, may determine and return the NRF to be used to select NFs/services within the selected network slice instance, and may return a NSI ID corresponding to the network slice instance. The AMF may query the NRF in serving PLMN by issuing the Nnrf_NF-Discovery_Request that may comprise S-NSSAI from the Allowed NSSAI, PLMN ID of the SUPI, DNN, NSI ID, and/or the like. The NRF in serving PLMN may provide to the AMF, e.g. FQDN or IP address, of a set of the discovered SMF instance(s) or endpoint address(es) of SMF service instance(s) in Nnrf_NFDiscovery_Request response message.

In an example, the SMF for the group (e.g., a default SMF for the group, and/or the like) may be selected by the AMF based on one or more of a selected data network name (DNN), S-NSSAI, NSI-ID, subscription information from UDM, (e.g., per DNN: whether LBO roaming is allowed, per S-NSSAI: the subscribed DNN(s), per (S-NSSAI, subscribed DNN): whether LBO roaming is allowed, per (S-NSSAI, subscribed DNN): whether EPC interworking is supported, and/or the like), local operator policies, load conditions of the candidate SMFs, access technology being used by the UE, and/or the like.

In an example, the AMF may select the SMF and may determine to update the UE subscription data, group subscription data, group context information, and/or the like in the UDM, UDR, GMF, and/or the like.

In an example, when the AMF selects the SMF and determined to update the group context information in the UDM, the AMF may employ a context management service operation, UE context management service operation, and/or the like of the UDM. In an example, the AMF may employ a parameter provision operation of the UDM to update the group context information. The AMF may employ a Nudm_UECM_Update/register service operation, and/or the like. The AMF may send a second message to the UDM to update the group context information, a UE context information associated with the group communication session, and/or the like. The second message may be the Nudm_UECM_Update/register service operation message, and/or the like. The second message may comprise the identifier of the group, group information, the identifier of the SMF associated with the group (SMF ID, SMF address, and/or the like), a SUPI, one or more context information of the UE, one or more context information of the group, and/or the like.

In an example, the UDM in response to receiving update information, may send a create, update, and/or the like message to the UDR to update group context information e.g., the SMF id, and/or the like. The UDM may employ a data management service operation of the UDR.

In an example, the AMF may send a data management create, update, and/or the like message to the UDR to update the group context, the UE context associated with the group, and/or the like. The association may comprise a mapping between group information and SMF ID. The group information may be group id, VLAN ID, and/or the like.

In an example, the AMF may send an update message to the GMF to update the group context. The GMF may receive group information e.g., the group index, group id, tuple of S-NSSAI, DNN, and/or the like and the SMF information (e.g., SMF ID, SMF address, and/or the like) associated with the group.

In an example, an identifier of a virtual LAN, e.g., VLAN ID, and/or the like may be employed to identify a group. The group context may comprise the VLAN ID associated with the group. In an example, the first message, the PDU session establishment request, and/or the like may comprise a VLAN information e.g., the VLAN ID. The AMF may receive the first message and may select the SMF based on the VLAN information. The AMF may send the query to the UDM, UDR, GMF, NRF, and/or the like and the query may comprise a request for discovery/selection of the SMF. The query may comprise the VLAN information associated with the group.

In an example, the AMF may send the second message to the NRF to update/register a SMF that support the group communication session. The NRF may maintain an association of the SMF with the group information e.g., SMF id, group information/id, and/or the like. The AMF may employ a Nnrf_NFManagement service operation/procedure. The Nnrf_NFManagement service operation may comprise register, update, and/or the like procedures (e.g., Nnrf_NFManagement_NFRegister service operation, Nnrf_NFManagement_NFUpdate service operation, and/or the like). The Nnrf_NFManagement service operation/procedure may comprise sending a register/update message that may comprise group information/id, VLAN information/id, NF type (e.g., SMF), SMF ID, PLMN ID, SUPI, GPSI, and/or the like.

In an example, the AMF may select/discover the SMF for the group communication session based on a query from the NRF. In an example, the AMF may employ a discovery service procedure of the NRF, e.g., Nnrf_NFDiscovery service operation, and/or the like. The AMF may send a Nnrf_NF Discovery_Request service operation message e.g., a discovery request, Nnrf_NFDiscovery_Request, and/or the like. The discovery request may comprise group information/id, VLAN information/id, NF type (e.g., SMF), SMF ID, PLMN ID, SUPI, GPSI, and/or the like. The NRF may select the SMF for the group and send a discovery response message to the AMF. The discovery response message may comprise the SMF ID, SMF address/FQDN, and/or the like.

In an example, upon selection/discovery/determining of the SMF by the AMF, the AMF may send a session creation request, a PDU session create request, and/or the like to the SMF. In an example, the session creation request may be a Nsmf_PDUSession_CreateSMContext Request (e.g., that may comprise SUPI, DNN, S-NSSAI(s), PDU Session ID, AMF ID, Request Type, PCF ID, Priority Access, N1 SM container (PDU Session Establishment Request), User location information, Access Type, PEI, GPSI, UE presence in LADN service area, subscription for PDU session status notification, DNN selection mode, trace requirements, and/or the like). In an example, the session creation request may be a Nsmf_PDUSession_UpdateSMContext Request (SUPI, DNN, S-NSSAI(s), PDU Session ID, AMF ID, Request Type, N1 SM container (PDU session establishment request), user location information, access type, RAT type, PEI, and/or the like). In an example, the session creation request may comprise the group information/id, the VLAN information/id, an indication that the request is for joining the group communication session, and/or the like.

In an example, if session management subscription data for corresponding group, SUPI, DNN, S-NSSAI, and/or the like is not available, the SMF may retrieve the session management subscription data. The SMF may employ a Nudm_SDM_Get (e.g., comprising SUPI, session management subscription data, DNN, S-NSSAI, and/or the like) and may subscribe to be notified when this subscription data is modified using Nudm_SDM_Subscribe (SUPI, Session Management Subscription data, DNN, S-NSSAI). In an example, the UDM may receive this information from the UDR by Nudr_DM_Query (SUPI, Subscription Data, Session Management Subscription data, DNN, S-NSSAI) and may subscribe to notifications from UDR for the same data by Nudr_DM_subscribe.

In an example, the SMF may send to the AMF a Nsmf_PDUSession_CreateSMContext Response (Cause, SM Context ID or N1 SM container (PDU Session Reject (Cause))) or an Nsmf_PDUSession_UpdateSMContext Response.

In an example, dynamic PCC may be employed for the PDU Session. The SMF may perform PCF selection. The SMF may employ the PCF already selected for the PDU Session. The SMF may perform an SM policy association establishment procedure to establish an SM policy association with the PCF and get the default PCC rules for the PDU session. The GPSI may be included if available at SMF. In an example, the SMF may perform an SMF initiated SM policy association modification procedure to provide information on the policy control request trigger condition(s) that have been met.

In an example, the SMF may initiate an N4 session establishment procedure with a UPF. The SMF may initiate an N4 session modification procedure with the UPF. The SMF may send an N4 session establishment/modification request to the UPF and may provide packet detection, enforcement and reporting rules to be installed on the UPF for the PDU Session. If CN tunnel info is allocated by the SMF, the CN tunnel info may be provided to the UPF. If a selective user plane deactivation is required for the PDU session, the SMF may determine the inactivity timer and may provide it to the UPF. The UPF may acknowledge by sending an N4 session establishment/modification response. If CN tunnel info is allocated by the UPF, the CN tunnel info may be provided to the SMF.

In an example, the SMF may send to the AMF, a Namf_Communication_N1N2MessageTransfer (e.g., comprising PDU session ID, N2 SM information (PDU Session ID, QFI(s), QOS Profile(s), CN tunnel info, S-NSSAI from the Allowed NSSAI, Session-AMBR, PDU session type, user plane security enforcement information, UE integrity protection maximum data rate, and/or the like), N1 SM container (PDU Session Establishment Accept (QOS Rule(s) and QoS Flow level QoS parameters if needed for the QoS Flow(s) associated with the QoS rule(s), selected SSC mode, S-NSSAI(s), DNN, allocated IPV4 address, interface identifier, Session-AMBR, selected PDU Session Type, Reflective QoS Timer (if available), P-CSCF address(es), [Always-on PDU Session])), and/or the like). If one or more UPFs are employed for the PDU Session, the CN Tunnel Info may comprise tunnel information related with the UPF that terminates N3. The N2 SM information may comprise information that the AMF may forward to the (R)AN which may comprise: the CN tunnel info corresponds to the core network address of the N3 tunnel corresponding to the PDU Session, one or more QoS profiles and the corresponding QFIs may be provided to the (R)AN, the PDU session ID may be used by AN signaling with the UE to indicate to the UE the association between (R)AN resources and a PDU Session for the UE, a PDU session is associated to an S-NSSAI and a DNN. The S-NSSAI may be provided to the (R)AN, is the S-NSSAI with the value for the serving PLMN, user plane security enforcement information may be determined by the SMF, and/or the like.

The N1 SM container may comprise the PDU session establishment accept that the AMF may provide to the UE. If the UE requested P-CSCF discovery then the message may comprise the P-CSCF IP address(es) as determined by the SMF. The PDU session establishment accept may comprise S-NSSAI from the allowed NSSAI. If the PDU session being established was requested to be an always-on PDU Session, the SMF may indicate whether the request is accepted by including an Always-on PDU session Granted indication in the PDU session establishment accept message. If the PDU Session being established was not requested to be an always-on PDU Session but the SMF determines that the PDU session may require to be established as an always-on PDU session, the SMF may include an Always-on PDU session granted indication in the PDU session establishment accept message indicating that the PDU session is an always-on PDU Session.

In an example, the PDU session establishment accept may comprise one or more QoS rules, QoS flow level QoS parameters, and/or the like if needed for the QoS Flow(s) associated with those QoS rule(s) and QoS Profiles may be included in within the N1 SM and in the N2 SM information. The Namf_Communication_N1N2MessageTransfer may comprise the PDU session ID. The AMF may send to a base station e.g., a (R)AN, NG-RAN, and/or the like an N2 PDU session request (e.g., comprising N2 SM information, NAS message (PDU Session ID, N1 SM container (PDU Session Establishment Accept)), and/or the like). The AMF may send a NAS message comprising the PDU Session ID and PDU session establishment accept targeted to the UE and the N2 SM information received from the SMF within the N2 PDU session request to the (R)AN. The base station may send to the UE, AN specific signaling. The (R)AN may issue AN specific signaling exchange with the UE that is related with the information received from the SMF. For example, in case of a NG-RAN, an RRC connection reconfiguration may take place with the UE establishing the necessary NG-RAN resources related to the QoS rules for the PDU session request. The (R)AN may allocate (R)AN N3 tunnel Info for the PDU session. In case of dual connectivity, the master RAN node may assign zero or more QFIs to be setup to a master RAN node and others to the secondary RAN node. The AN tunnel info may comprise a tunnel endpoint for one or more involved (R)AN node(s), and the QFIs assigned to one or more tunnel endpoint(s). A QFI may be assigned to the master RAN node or the secondary RAN node.

In an example, the (R)AN may forwards the NAS message (PDU Session ID, N1 SM container (PDU Session Establishment Accept) to the UE. The (R)AN may provide the NAS message to the UE if the necessary (R)AN resources are established and the allocation of (R)AN tunnel info are successful. The (R)AN may send to the AMF an N2 PDU session response (e.g., comprising PDU Session ID, Cause, N2 SM information (PDU Session ID, AN Tunnel Info, List of accepted/rejected QFI(s), User Plane Enforcement Policy Notification), and/or the like). The AN tunnel info may correspond to the access network address of the N3 tunnel corresponding to the PDU Session. The AMF may send to the SMF a Nsmf_PDUSession_UpdateSMContext Request (e.g., comprising N2 SM information, Request Type, and/or the like). The AMF may forward the N2 SM information received from (R)AN to the SMF. If the user plane enforcement policy notification in the N2 SM information indicates that no user plane resources could be established, and the user plane enforcement policy indicated a to be required, the SMF may release the PDU session. The SMF may initiate an N4 session modification procedure with the UPF. The SMF provides AN tunnel info to the UPF, and the corresponding forwarding rules. The UPF may provide an N4 session modification response to the SMF. The SMF may send to the AMF, a Nsmf_PDUSession_UpdateSMContext Response (e.g., comprising a cause).

Figure 20:
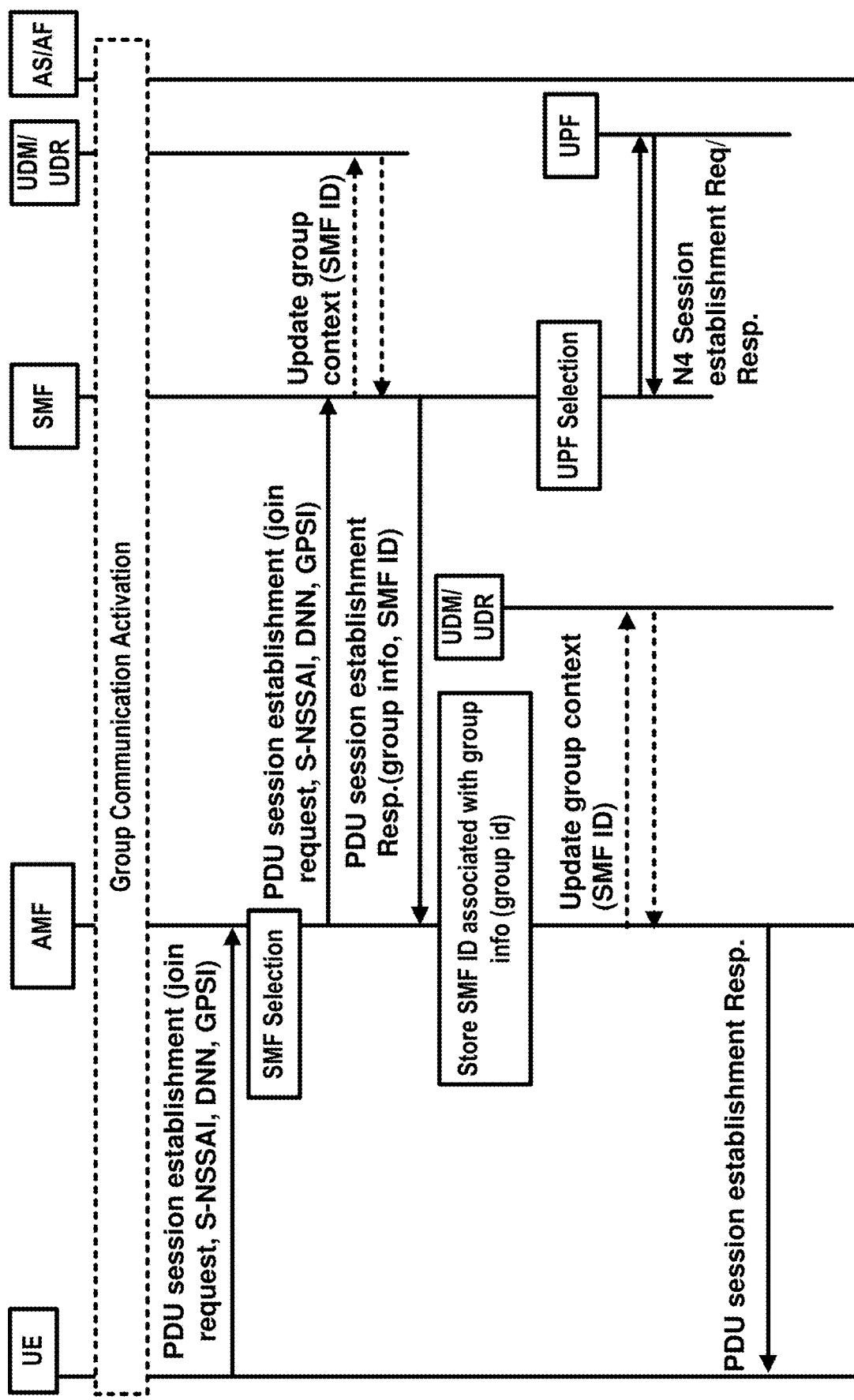
FIG. 20 is an example call flow as per an aspect of an embodiment of the present disclosure.
Figure 21:
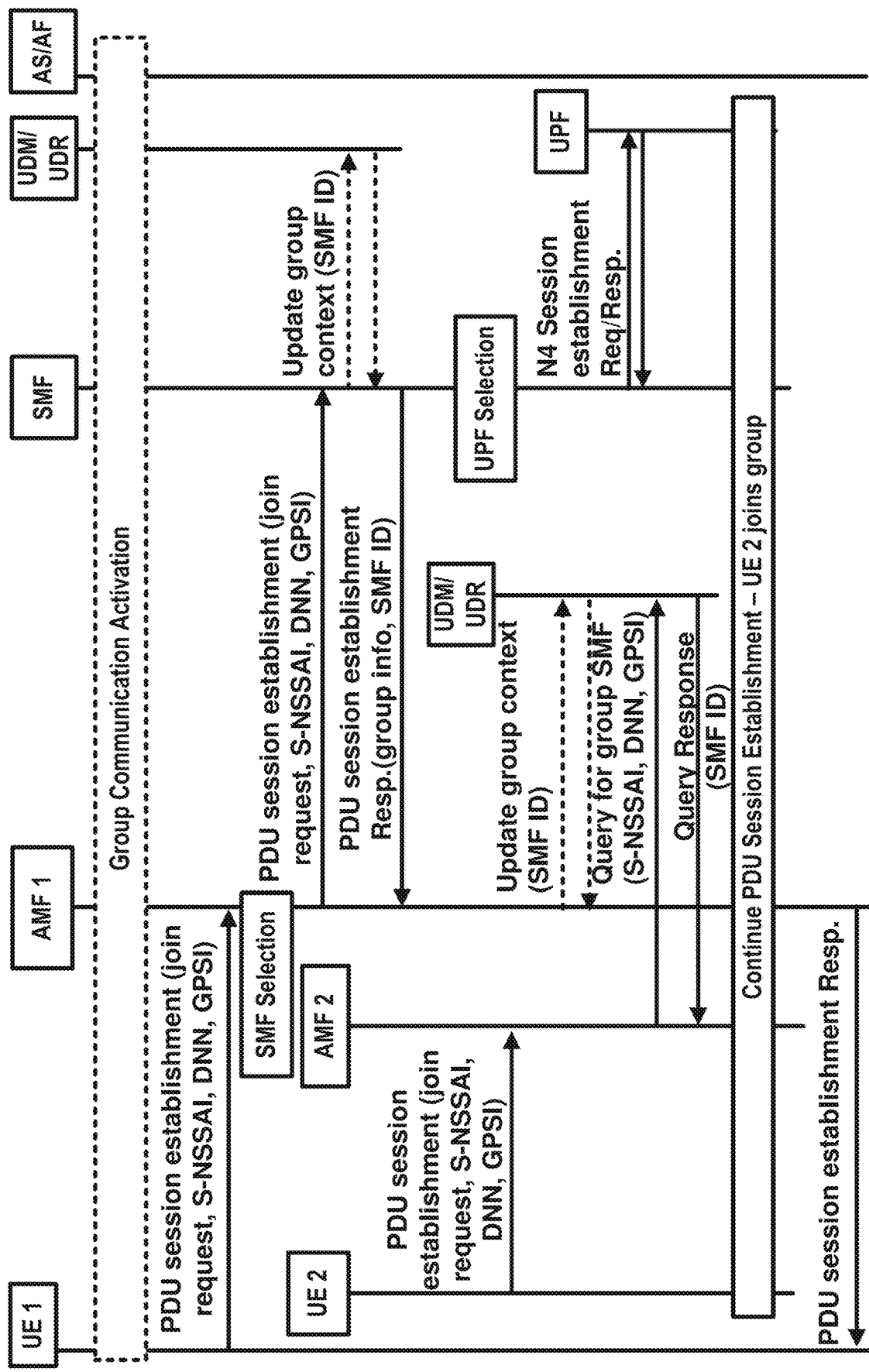
FIG. 21 is an example diagram as per an aspect of an embodiment of the present disclosure.

In an example embodiment as depicted in FIG. 20 and FIG. 21, the AMF may receive a PDU session establishment request from the UE, UE 1, or UE 2. The PDU session establishment request may comprise a join request indication, S-NSSAI, DNN, GPSI, and/or the like. In an example, the PDU session establishment request may comprise a VLAN information/id. The AMF may select an SMF and send the session creation request message to the SMF. The SMF may send a query to the UDM, UDR, NRF, GMF, and/or the like. The SMF may determine that the session creation request or the PDU session establishment is for joining a group communication session. In an example, the determination may be based on the GPSI, UE subscription/context information at the UDM/UDR, and/or the like. The UDM/UDR may determine that the UE is a member of the group communication session. The determination may be based on the UE subscription data, S-NSSAI, DNN, GPSI, and/or the like. In an example, the SMF may send a response message to the AMF indicating an association of the group information with the SMF ID. The AMF may store the association. In an example, when one or more UEs may employ the same AMF, the AMF may determine the SMF associate with the group based on the association. In an example, the AMF may update the UDM, UDR, GMF, and/or the like with the SMF ID associated with the group. The AMF may update/modify the group context information in a repository NF, UDM, UDR, GMF, and/or the like.

In an example, as depicted in FIG. 21, when AMF 1 and AMF 2 are employed for the UE 1 and UE 2, when UE 2 sends a PDU session establishment request to AMF 2, the AMF 2 may send a query to the GMF/UDM/UDR to determine/discover/select the SMF. As depicted in FIG. 20, when a common AMF is employed, the AMF may store the association of the group with the SMF locally.

In an example embodiment, 5G LAN group may be for 5G LAN-type service for Ethernet communication. When Ethernet communication is employed, the configuration information may comprise a DNN, S-NSSAI for access to the 5G LAN for Ethernet communication, group information/id, and/or the like. In an example, a PDU Session may provide simultaneous access to one or more 5G LANs for Ethernet communication. In an example, when Ethernet communication is employed, the configuration information may comprise credentials for secondary (PDU Session-level) authentication with a AAA server in the 5G LAN, indication of support of IEEE 802.1Q operation providing access to multiple virtual networks and QoS tagging support, 5GLAN identifiers for 5GLANs associated with the DNN e.g., IEEE 802.1Q VID tags for virtual 802.1Q networks associated with the DNN, list of GPSIs (or SUPIs) associated with one or more IEEE 802.1Q tag(s), authorized QoS (e.g., in terms of 5QIs or IEEE 802.1Q PCP values), indication of ARP (Address Resolution Protocol) support in the 5G LAN, indication of Spanning tree protocol support in the 5G LAN, maximum number of Ethernet addresses reachable via the UE (e.g., a configuration parameter may be employed to limit the volume of reporting from the PSA to the PCF on per MAC address), time of service activation indicating to the UE when it may start using the configured information for access to the 5G LAN-type service, and/or the like.

In an example, embodiment, the UE may operate as an Ethernet switch. The SMF may configure the UE to operate as an Ethernet switch with configuration parameters provided during the establishment of a PDU Session. The PDU session may provide access to the 5G LAN-type service (e.g., 5GLAN Group communication, and/or the like). The UE operating as an Ethernet switch may be part of multiple 5G LAN groups. One or more backend devices may be connected to the UE operating as an Ethernet switch. In an example, the SMF may provide configuration parameters to the UE in switch mode. The configuration parameters may comprise an indicator whether the UE in Ethernet switch mode may turn on or off the Spanning Tree Algorithm, a periodic timer of sending BDPU messages, a bridge identifier of the UE in Ethernet switch mode, an indicator whether the UE in Ethernet switch mode may notify the change of port's status, an indicator whether the UE in Ethernet switch mode may report the list of MAC address(es) of the backend devices connected in the backend networks.

In an example, if the SMF indicates to the UE to report the list of MAC address(es) of the backend devices, the UE in switch mode may obtain the list of MAC address(es) of the backend devices connected or changed in the backend networks. In an example, when one PDU session provides 5GLAN communication for more than one 5GLAN groups, the UE may obtain/determine the mapping relationship of MAC address(es) and the 5GLAN group. The UE may inform the SMF of the list of MAC address(es) and the mapping relationship during the PDU session establishment/modification procedure when the UE receives the indicator or detects the changes on the backend devices. The SMF may provide to the UPF Ethernet packet filter set and forwarding rule(s) based on the MAC address(es) and the mapping relationship. The UPF may detect and forward Ethernet frames based on the Ethernet packet filter set and forwarding rule(s) received from the SMF.

In an example, the UE in Ethernet switch mode may report its port states that may result from the execution of the spanning tree algorithm, and/or the like so that the SMF may control the UPF's port states based on the report to prevent the waste of network resources.

In an example, the UPF may support S-tag (IEEE 802.1ad), C-tag (IEEE 802.1q). In an example, a PDU session may provide access to one or more 5GLAN group(s). S-tag and/or C-tag for the 5GLAN group may be pre-configured on the UE or provided to the UE by the network e.g., SMF, and/or the like. In an example, a 5GLAN group identifier may be employed to identify the 5GLAN group. In an example, the operator may assign the list of 5GLAN group identifiers for the UEs. 5GLAN group identifier may be configured in the UDR. The SMF may be configured by the operator to have the mapping tables for 5GLAN group identifiers, C-tag, S-tag, and/or the like. The SMF may map the list of the 5GLAN group identifiers of the UE, which is notified through the procedures of PDU Session establishment, into the S-tag and C-tag, and packet filter for the uplink traffic to identify one or more 5GLAN group(s). The UPF may insert S-tag and C-tag onto the traffic which is sent to N6 based on the packet filter for the uplink traffic.

In an example, the UE may send a PDU session establishment request to connect to the 5G LAN. The UE may send the PDU session establishment request to a configured DNN. The DNN may be employed to identify whether the PDU session is to access to an Ethernet type 5GLAN communication. During PDU Session establishment the network may select the PSA that is the ingress point to the preconfigured Ethernet type 5GLAN communication. During the PDU session establishment procedure, the UDM nay notify/send the list of 5GLAN group identifiers for the UE to the SMF. The SMF may map the list of the 5GLAN group identifiers into the value of S-tag, C-tag and the packet filter(s) for the Ethernet communication, used by the UPF to handle the uplink traffic. The UPF may detect the packets based on the packet filter. The UPF may insert S-tag and C-tag onto the traffic to N6.

In an example embodiment, an access and mobility management function (AMF) may receive from a wireless device, a first message indicating a request to join a group communication session. The first message may comprise an identifier of the group communication session, an identifier of the wireless device, and/or the like. The AMF may select a session management function (SMF) for the group communication session. The AMF may send to a unified data management function (UDM), a second message to update a group context information for selecting the SMF for the group communication session. The second message may comprise the identifier of the group communication session, an identifier of the SMF associated with the identifier of the group, and/or the like. The AMF may send to the SMF, a third message to establish a session to join the group communication session. The third message may comprise the identifier of the group communication session, the identifier of the wireless device, and/or the like.

In an example, the identifier of the group communication session may comprise an S-NSSAI, a DNN, and/or the like. In an example, the identifier of the group communication session may comprise a private DNN. In an example, the AMF may determine that selection of the SMF for the group communication session may be required. The determining may be based on the AMF to determine that the group communication session does not have a SMF id/information assigned. The determining may be based on the absence of the SMF information for the group communication session in the group context information.

In an example, the first message may further comprise an identifier of a VLAN (e.g., VLAN ID, VID, V-TAG, C-TAG, and/or the like) associated with the group communication session. In an example, the identifier of the wireless device may be a generic public subscription identifier (GPSI). The identifier of the wireless device may be a subscriber permanent identifier (SUPI).

In an example, the SMF may select a user plane function (UPF) for the group communication session. The selection may be based on the group identifier (e.g., group ID, VLAN ID, and/or the like). The SMF may send to the UPF, a session establishment request message (e.g., N4 session establishment request, PFCP session establishment request, PFCP procedure, and/or the like). The SMF may receive from the UPF, a session establishment response message.

In an example, the UDM may send to a UDR, a request to update the group context information. In an example, the group context information may comprise the identifier of the SMF associated with the group communication session. In an example, the group context information may comprise an identifier of at least one UPF (e.g., PSA-UPF, and/or the like) for the group communication session. In an example, the group context information may be stored in a network repository element. The network repository element may comprise a network repository function (NRF), a group management function (GMF), a unified data repository (UDR), a unified data management (UDM), and/or the like.

In an example, a base station may select the AMF based on the identifier of the group communication session.

In an example, the AMF may receive from the SMF, a response message indicating that joining the group communication session is successful. In an example, the response message may indicate a cause, result, and/or the like. The cause, result, and/or the like may be an error message, failure indication, successful indication, and/or the like.

In an example, the AMF may send to the UDM and based on the request to join the group communication session, a discovery request message to determine the session management function (SMF) associated with the group communication session. The discovery request message may comprise the identifier of the group communication session. In an example, the UDM may send to a UDR, a request to discover the SMF. The request to discover the SMF may comprise the identifier of the group, and/or the like. The UDM may receive from the UDR an identifier of the SMF associated with the group communication session.

In an example, the UDM may send to a GMF a request to discover the SMF. The request may comprise the identifier of the group, and/or the like. The UDM may receive from the GMF an identifier of the SMF associated with the group communication session.

In an example embodiment, an access and mobility management function (AMF) may receive from a wireless device, a first message indicating a request to join a group communication session. The first message may comprise an identifier of the group, an identifier of the wireless device, and/or the like. The AMF may send to a unified data management function (UDM) based on the request to join the group communication session, a second message to determine a session management function (SMF). The second message may comprise the identifier of the group, and/or the like. The AMF may receive from the UDM, an identifier of the SMF associated with the identifier of the group communication session. The AMF may send to the SMF, a third message to establish a session to join the group communication session. The third message may comprise the identifier of the group communication session, the identifier of the wireless device, and/or the like.

In an example embodiment, an access and mobility management function (AMF) may receive from a wireless device, a first message indicating a request to join a group communication session. The first message may comprise an identifier of the group communication session, an identifier of the wireless device, and/or the like. The AMF may determine based on the identifier of the group, a session management function (SMF) associated with the group. The AMF may send to the SMF, a second message to establish a session to join the group communication session. The second message may comprise the identifier of the group, the identifier of the group communication session, the identifier of the wireless device, and/or the like.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 29:
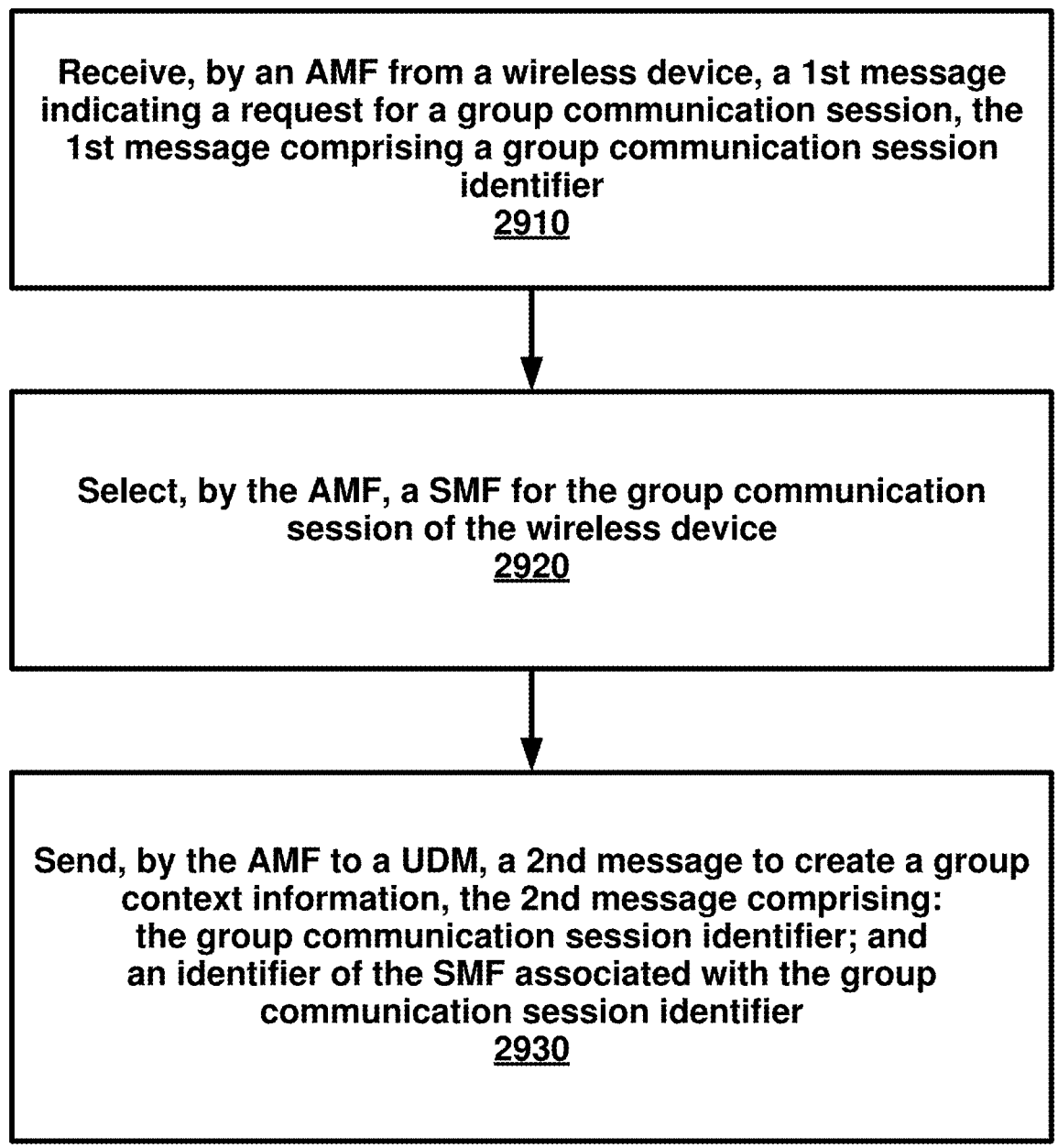
FIG. 29 is an example call flow as per an aspect of an embodiment of the present disclosure.

FIG. 29 is a flow diagram as per an aspect of an example embodiment of the present disclosure. At 2910, an access and mobility management function (AMF) may receive from a wireless device, a first message indicating a request for a group communication session, the first message comprising a group communication session identifier. At 2920, the AMF may select a session management function (SMF) for the group communication session of the wireless device. At 2930, the AMF may send to a unified data management function (UDM), a second message to create a group context information, the second message comprising the group communication session identifier, and an identifier of the SMF associated with the group communication session identifier.

In an example embodiment, an access and mobility management function (AMF) may receive from a wireless device, a first message indicating a request for a group communication session, the first message comprising a group communication session identifier. The AMF may select a session management function (SMF) for the group communication session of the wireless device. The AMF may send to a unified data management function (UDM), a second message to create a group context information, the second message comprising the group communication session identifier, and an identifier of the SMF associated with the group communication session identifier. In an example, the first message may further comprise a wireless device identifier. The AMF may send to the SMF, a third message to establish a session to join the group communication session, the third message may comprise the group communication session identifier, and the wireless device identifier. The identifier of the group communication session may comprise an S-NSSAI, and a DNN. The identifier of the group communication session may comprise a private DNN. The AMF may determine that selection of the SMF for the group is required. The first message may further comprise an identifier of a VLAN associated with the group communication session. The identifier of the wireless device may be a generic public subscription identifier (GPSI). The identifier of the group communication session may comprise a generic public subscription identifier (GPSI). The identifier of the wireless device may be a subscriber permanent identifier (SUPI). The SMF may select a user plane function (UPF) for the group communication session. The SMF may send to the UPF, a session establishment request message. The SMF may receive from the UPF, a session establishment response message. A UDM may send to a UDR, a request to update the group context information. The group context information may comprise an identifier of the SMF associated with the group communication session. The group context information may further comprise an identifier of at least one UPF for the group communication session. The group context information may be stored in a network repository element. The network repository element may comprise a network repository function (NRF), a group management function (GMF), a unified data repository (UDR), a unified data management (UDM), and/or the like. A base station may select the AMF based on the identifier of the group communication session. The AMF may receive from the SMF, a response message indicating that joining the group communication session is successful. The AMF may send to the UDM and based on the request to join the group communication session, a discovery request message to determine the session management function (SMF) associated with the group communication session. The discovery request message may comprise the identifier of the group communication session. The UDM may send to a UDR a request to discover the SMF, the request comprising the identifier of the group. The UDM may receive from the UDR an identifier of the SMF associated with the group communication session. The UDM may send to a GMF a request to discover the SMF, the request may comprise the identifier of the group. The UDM may receive from the GMF an identifier of the SMF associated with the group communication session. An access and mobility management function (AMF) may receive from a wireless device, a request to join the group communication session. The request may comprise the group communication session identifier, an identifier of the wireless device, and/or the like. The AMF may send to the unified data management function (UDM) based on the request to join the group communication session, a message to determine a session management function (SMF). The message may comprise the group communication session identifier. The AMF may receive from the UDM, the identifier of the SMF associated with the group communication session identifier. The AMF may send to the SMF, a session establishment request to join the group communication session. The session establishment request may comprise the group communication session identifier, the identifier of the wireless device.

In an example embodiment, an access and mobility management function (AMF) may receive from a wireless device, a first message indicating a request to join a group communication session. The first message may comprise an identifier of the group, an identifier of the wireless device, and/or the like. The AMF may send to a unified data management function (UDM) based on the request to join the group communication session, a second message to determine a session management function (SMF). The second message may comprise the identifier of the group. The AMF may receive from the UDM, an identifier of the SMF associated with the identifier of the group. The AMF may send to the SMF, a third message to establish a session to join the group communication session. The third message may comprise the identifier of the group, the identifier of the wireless device, and/or the like.

In an example embodiment, an access and mobility management function (AMF) may receive from a wireless device, a first message indicating a request to join a group communication session. The first message may comprise an identifier of the group, and an identifier of the wireless device. The AMF may determine based on the identifier of the group, a session management function (SMF) associated with the group. The AMF may send to the SMF, a second message to establish a session to join the group communication session. The second message may comprise the identifier of the group, and the identifier of the wireless device.

In this specification, a and an and similar phrases are to be interpreted as at least one and one or more. In this specification, the term may is to be interpreted as may, for example. In other words, the term may is indicative that the phrase following the term may is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, which may be behaviorally equivalent. For example, modules may be implemented as a software routine written in a computer language configured to be executed by a hardware machine (such as C, C++, Fortran, Java, Basic, MATLAB or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often employed in combination to achieve the result of a functional module.

Example embodiments of the invention may be implemented using various physical and/or virtual network elements, software defined networking, virtual network functions.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using 5G AN. However, one skilled in the art will recognize that embodiments of the invention may also be implemented in a system comprising one or more legacy systems or LTE. The disclosed methods and systems may be implemented in wireless or wireline systems. The features of various embodiments presented in this invention may be combined. One or many features (method or system) of one embodiment may be implemented in other embodiments. A limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language means for or step for be interpreted under 35 U.S.C. 112. Claims that do not expressly include the phrase means for or step for are not to be interpreted under 35 U.S.C. 112.

The invention claimed is:

1. A method comprising:
    sending, by a wireless device to an access and mobility management function (AMF) a non-access stratum (NAS) message indicating a request to establish a packet data unit (PDU) session to join a group communication session, wherein the group communication session is an activated group communication session, the NAS message comprising:
        an identifier of the group communication session, wherein the AMF is configured to select a session management function (SMF) for the group communication session based on a query to a network repository function (NRF), wherein the query comprises the identifier of the group communication session;
        an identifier of a network slice; and
        a protocol configuration option information; and
    receiving, by the wireless device from the AMF, a response message indicating acceptance of the request.

2. The method of claim 1, wherein the identifier of the group communication session comprises a data network name.

3. The method of claim 1, wherein the identifier of the group communication session comprises a single network slice selection assistance information (S-NSSAI).

4. The method of claim 1, wherein the NAS message further comprises an identifier of the wireless device.

5. The method of claim 4, wherein the identifier of the wireless device comprises a subscriber permanent identifier.

6. The method of claim 4, wherein the identifier of the wireless device comprises a generic public subscription identifier.

7. The method of claim 1, wherein the network repository function (NRF) maintains an association of the SMF with the identifier associated with the group communication session.

8. A wireless device, comprising:
    one or more processors; and
    memory storing instructions that, when executed by the one or more processors, cause the wireless device to perform:
    sending, to an access and mobility management function (AMF) a non-access stratum (NAS) message indicating a request to establish a packet data unit (PDU) session to join a group communication session, wherein the group communication session is an activated group communication session, the NAS message comprising:
        an identifier of the group communication session, wherein the AMF is configured to select a session management function (SMF) for the group communication session based on a query to a network repository function (NRF), wherein the query comprises the identifier of the group communication session;
        an identifier of a network slice; and
        a protocol configuration option information; and
    receiving, from the AMF, a response message indicating acceptance of the request.

9. The wireless device of claim 8, wherein the identifier of the group communication session comprises a data network name.

10. The wireless device of claim 8, wherein the identifier of the group communication session comprises a single network slice selection assistance information (S-NSSAI).

11. The wireless device of claim 8, wherein the NAS message further comprises an identifier of the wireless device.

12. The wireless device of claim 11, wherein the identifier of the wireless device comprises a subscriber permanent identifier.

13. The wireless device of claim 11, wherein the identifier of the wireless device comprises a generic public subscription identifier.

14. The wireless device of claim 8, wherein the network repository function (NRF) maintains an association of the SMF with the identifier associated with the group communication session.

15. A non-transitory computer-readable medium comprising instructions that, when executed by one or more processors of a wireless device, cause the wireless device to perform:
  sending, to an access and mobility management function (AMF) a non-access stratum (NAS) message indicating a request to establish a packet data unit (PDU) session to join a group communication session, wherein the group communication session is an activated group communication session, the NAS message comprising:
    an identifier of the group communication session, wherein the AMF is configured to select a session management function (SMF) for the group communication session based on a query to a network repository function (NRF), wherein the query comprises the identifier of the group communication session;
    an identifier of a network slice; and
    a protocol configuration option information; and
  receiving, from the AMF, a response message indicating acceptance of the request.

16. The non-transitory computer-readable medium of claim 15, wherein the identifier of the group communication session comprises a data network name.

17. The non-transitory computer-readable medium of claim 15, wherein the identifier of the group communication session comprises a single network slice selection assistance information (S-NSSAI).

18. The non-transitory computer-readable medium of claim 15, wherein the NAS message further comprises an identifier of the wireless device.

19. The non-transitory computer-readable medium of claim 18, wherein the identifier of the wireless device comprises a subscriber permanent identifier.

20. The non-transitory computer-readable medium of claim 18, wherein the identifier of the wireless device comprises a generic public subscription identifier.

* * * * *